US008401268B1

(12) United States Patent
Yacoubian et al.

(10) Patent No.: US 8,401,268 B1
(45) Date of Patent: Mar. 19, 2013

(54) OPTICAL IMAGING SENSOR FOR A DOCUMENT PROCESSING DEVICE

(75) Inventors: Araz Yacoubian, Carlsbad, CA (US); Frank M. Csulits, Gurnee, IL (US); Danny D. Yang, San Diego, CA (US); Douglas U. Mennie, Barrington, IL (US); Tomasz M. Jagielinski, Carlsbad, CA (US)

(73) Assignee: Cummins-Allison Corp., Mt. Prospect, IL (US)

( * ) Notice: Subject to any disclaimer, the term of this patent is extended or adjusted under 35 U.S.C. 154(b) by 814 days.

(21) Appl. No.: 12/553,296

(22) Filed: Sep. 3, 2009

Related U.S. Application Data

(63) Continuation-in-part of application No. 12/175,307, filed on Jul. 17, 2008, and a continuation-in-part of application No. 12/044,720, filed on Mar. 7, 2008, now Pat. No. 8,204,293.

(60) Provisional application No. 61/095,544, filed on Sep. 9, 2008, provisional application No. 60/950,263, filed on Jul. 17, 2007, provisional application No. 60/905,965, filed on Mar. 9, 2007, provisional application No. 61/022,752, filed on Jan. 22, 2008.

(51) Int. Cl.
*G06K 9/00* (2006.01)
*G06Q 40/00* (2006.01)

(52) U.S. Cl. ........................................ 382/135; 235/379

(58) Field of Classification Search ................... 382/135
See application file for complete search history.

(56) References Cited

U.S. PATENT DOCUMENTS 3,208,974 A 9/1965 Roberts ........................... 260/67
3,480,785 A 11/1969 Aufderheide ................. 250/219
(Continued)

FOREIGN PATENT DOCUMENTS

DE 28 24 849 A1 12/1979
EP 0 030 413 A2 6/1981
(Continued)

OTHER PUBLICATIONS

International Search Report mailed Jun. 10, 2008 Application No. PCT/US2008/003009.

(Continued)

*Primary Examiner* — David Zarka
(74) *Attorney, Agent, or Firm* — Nixon Peabody LLP

(57) ABSTRACT

A document processing device includes a controller and a sensor arrangement. The sensor arrangement illuminates a surface of documents. The gradient index lens array collects light reflected from the documents and transmits at least a portion of the collected reflected light onto a photodetector array. The photodetector array generates one or more electrical signals in response to a gradient index lens transmitting light thereon. The controller derives data including image data from the one or more electrical signals. The image data is reproducible as a visually readable image of the surface of the documents. The visually readable image has a resolution such that alphanumeric characters can be extracted from the visually readable image in response to the document remaining within a depth of field of the gradient index lens array while being transported via the transport mechanism. The depth of field is at least about 0.03 inches.

22 Claims, 13 Drawing Sheets

U.S. PATENT DOCUMENTS

| | | | | |
|---|---|---|---|---|
| 3,496,370 | A | 2/1970 | Haville et al. | 250/219 |
| 3,976,198 | A | 8/1976 | Carnes, Jr. et al. | 209/111.7 |
| 4,023,011 | A | 5/1977 | Nakajima et al. | 235/61.11 |
| 4,027,142 | A | 5/1977 | Paup et al. | 235/61.9 |
| 4,187,498 | A | 2/1980 | Creekmore | 340/5.8 |
| 4,201,978 | A | 5/1980 | Nally | 340/146.3 |
| 4,205,780 | A | 6/1980 | Burns et al. | 235/454 |
| 4,264,808 | A | 4/1981 | Owens et al. | 235/379 |
| 4,334,619 | A | 6/1982 | Horino et al. | 209/551 |
| 4,435,834 | A | 3/1984 | Pauli et al. | 382/7 |
| 4,442,541 | A | 4/1984 | Finkel et al. | 382/7 |
| 4,482,058 | A | 11/1984 | Steiner | 209/534 |
| 4,542,829 | A | 9/1985 | Emery et al. | 209/534 |
| 4,544,266 | A | 10/1985 | Antes | 356/71 |
| 4,559,451 | A | 12/1985 | Curl | 250/560 |
| 4,563,771 | A | 1/1986 | Gorgone et al. | 382/7 |
| 4,585,928 | A | 4/1986 | Watanabe | 235/379 |
| 4,587,434 | A | 5/1986 | Roes et al. | 250/556 |
| 4,617,457 | A | 10/1986 | Granzow et al. | 235/379 |
| 4,650,320 | A | 3/1987 | Chapman et al. | 356/71 |
| 4,658,289 | A | 4/1987 | Nagano et al. | 358/75 |
| 4,672,186 | A | 6/1987 | Van Tyne | 235/470 |
| 4,716,456 | A | 12/1987 | Hosaka | 358/75 |
| 4,823,393 | A | 4/1989 | Kawakami | 382/7 |
| 4,825,246 | A | 4/1989 | Fukuchi et al. | 355/4 |
| 4,841,358 | A | 6/1989 | Kammoto et al. | 358/75 |
| 4,881,268 | A | 11/1989 | Uchida et al. | 382/7 |
| 4,888,812 | A | 12/1989 | Dinan et al. | |
| 4,908,516 | A | 3/1990 | West | 250/556 |
| 4,958,235 | A | 9/1990 | Sims et al. | 358/402 |
| 4,980,543 | A | 12/1990 | Hara et al. | 235/379 |
| 5,023,782 | A | 6/1991 | Lutz et al. | 364/405 |
| 5,040,226 | A | 8/1991 | Elischer et al. | 382/7 |
| 5,076,441 | A | 12/1991 | Gerlier | 209/534 |
| 5,119,433 | A | 6/1992 | Will | 382/7 |
| 5,163,672 | A | 11/1992 | Mennie | 271/187 |
| 5,170,466 | A | 12/1992 | Rogan et al. | 395/145 |
| 5,187,750 | A | 2/1993 | Behera | 382/7 |
| 5,191,525 | A | 3/1993 | LeBrun et al. | 715/500 |
| 5,199,543 | A | 4/1993 | Kamagami et al. | 194/207 |
| 5,207,788 | A | 5/1993 | Geib et al. | 271/122 |
| 5,237,158 | A | 8/1993 | Kern et al. | 235/379 |
| 5,252,811 | A | 10/1993 | Henochowicz et al. | 235/379 |
| 5,295,196 | A | 3/1994 | Raterman et al. | 382/135 |
| 5,301,350 | A | 4/1994 | Rogan et al. | 395/800 |
| 5,335,292 | A | 8/1994 | Lovelady et al. | 382/17 |
| 5,373,550 | A | 12/1994 | Campbell et al. | 379/100 |
| 5,383,754 | A | 1/1995 | Sumida et al. | 412/11 |
| 5,416,307 | A | 5/1995 | Danek et al. | 235/449 |
| 5,467,405 | A | 11/1995 | Raterman et al. | 382/135 |
| 5,467,406 | A | 11/1995 | Graves et al. | 382/135 |
| 5,469,241 | A | 11/1995 | Takahashi et al. | 355/64 |
| 5,488,671 | A | 1/1996 | Kern | 382/138 |
| 5,506,691 | A | 4/1996 | Bednar et al. | 358/402 |
| D369,984 | S | 5/1996 | Larsen | D10/97 |
| 5,523,575 | A | 6/1996 | Machida et al. | 250/208.1 |
| 5,544,043 | A | 8/1996 | Miki et al. | 364/406 |
| 5,592,561 | A | 1/1997 | Moore | 382/103 |
| 5,602,933 | A | 2/1997 | Blackwell et al. | 382/116 |
| 5,602,936 | A | 2/1997 | Green et al. | 382/140 |
| 5,607,040 | A | 3/1997 | Mathurin, Sr. | 194/207 |
| 5,615,280 | A | 3/1997 | Izawa et al. | 382/135 |
| 5,633,949 | A | 5/1997 | Graves et al. | 382/135 |
| 5,640,463 | A | 6/1997 | Csulits | 382/135 |
| 5,652,802 | A | 7/1997 | Graves et al. | 382/135 |
| 5,671,282 | A | 9/1997 | Wolff et al. | 713/179 |
| 5,687,963 | A | 11/1997 | Mennie | 271/119 |
| 5,692,067 | A | 11/1997 | Raterman et al. | 382/135 |
| 5,704,491 | A | 1/1998 | Graves | 209/534 |
| 5,724,438 | A | 3/1998 | Graves | 382/135 |
| 5,751,840 | A | 5/1998 | Raterman et al. | 382/135 |
| 5,790,693 | A | 8/1998 | Graves et al. | 382/135 |
| 5,790,697 | A | 8/1998 | Munro et al. | 382/135 |
| 5,806,650 | A | 9/1998 | Mennie et al. | 194/206 |
| 5,815,592 | A | 9/1998 | Mennie et al. | 382/135 |
| 5,822,448 | A | 10/1998 | Graves et al. | 382/135 |
| 5,832,104 | A | 11/1998 | Graves et al. | 382/135 |
| 5,867,589 | A | 2/1999 | Graves et al. | 382/135 |

| | | | | |
|---|---|---|---|---|
| 5,870,487 | A | 2/1999 | Graves et al. | 382/135 |
| 5,875,259 | A | 2/1999 | Mennie et al. | 382/135 |
| 5,905,810 | A | 5/1999 | Jones et al. | 382/135 |
| 5,909,502 | A | 6/1999 | Mazur | 382/135 |
| 5,909,503 | A | 6/1999 | Graves et al. | 382/135 |
| 5,912,982 | A | 6/1999 | Munro et al. | 382/135 |
| 5,923,413 | A | 7/1999 | Laskowski | 356/71 |
| 5,926,392 | A | 7/1999 | York et al. | 700/223 |
| 5,930,778 | A | 7/1999 | Geer | 705/45 |
| 5,938,044 | A | 8/1999 | Weggesser | 209/534 |
| 5,940,844 | A | 8/1999 | Cahill | 715/526 |
| 5,943,655 | A | 8/1999 | Jacobson | 705/30 |
| 5,960,103 | A | 9/1999 | Graves et al. | 382/135 |
| 5,966,456 | A | 10/1999 | Jones et al. | 382/135 |
| 5,982,918 | A | 11/1999 | Mennie et al. | 382/135 |
| 5,992,601 | A | 11/1999 | Mennie et al. | 194/207 |
| 6,012,565 | A | 1/2000 | Mazur | 194/207 |
| 6,021,883 | A | 2/2000 | Casanova et al. | 194/217 |
| 6,026,175 | A | 2/2000 | Munro et al. | 382/135 |
| 6,028,951 | A | 2/2000 | Raterman et al. | 382/135 |
| 6,038,553 | A | 3/2000 | Hyde, Jr. | 705/45 |
| 6,068,194 | A | 5/2000 | Mazur | 235/492 |
| 6,072,896 | A | 6/2000 | Graves et al. | 382/135 |
| 6,073,744 | A | 6/2000 | Raterman et al. | 194/207 |
| 6,074,334 | A | 6/2000 | Mennie et al. | 493/438 |
| 6,076,826 | A | 6/2000 | Gerlier et al. | 715/526 |
| 6,105,007 | A | 8/2000 | Norris | 705/38 |
| 6,128,402 | A | 10/2000 | Jones et al. | 382/135 |
| 6,131,718 | A | 10/2000 | Witschorik | 194/206 |
| 6,220,419 | B1 | 4/2001 | Mennie | 194/207 |
| 6,237,739 | B1 | 5/2001 | Mazur et al. | 194/207 |
| 6,241,069 | B1 * | 6/2001 | Mazur et al. | 194/207 |
| 6,256,407 | B1 * | 7/2001 | Mennie et al. | 382/135 |
| 6,278,795 | B1 | 8/2001 | Anderson et al. | 382/135 |
| 6,311,819 | B1 | 11/2001 | Stromme et al. | 194/207 |
| 6,318,537 | B1 | 11/2001 | Jones et al. | 194/346 |
| 6,351,551 | B1 | 2/2002 | Munro et al. | 382/135 |
| 6,363,164 | B1 | 3/2002 | Jones et al. | 382/135 |
| 6,371,303 | B1 | 4/2002 | Klein et al. | 209/534 |
| 6,378,683 | B2 | 4/2002 | Mennie | 194/207 |
| 6,381,354 | B1 | 4/2002 | Mennie et al. | 382/135 |
| 6,398,000 | B1 | 6/2002 | Jenrick et al. | 194/200 |
| 6,459,806 | B1 | 10/2002 | Raterman et al. | 382/135 |
| 6,460,705 | B1 | 10/2002 | Hallowell | 209/534 |
| 6,493,461 | B1 * | 12/2002 | Mennie et al. | 382/135 |
| 6,539,104 | B1 | 3/2003 | Raterman et al. | 382/135 |
| 6,550,671 | B1 | 4/2003 | Brown et al. | 235/379 |
| 6,560,355 | B2 | 5/2003 | Graves et al. | 382/135 |
| 6,573,983 | B1 | 6/2003 | Laskowski | 356/71 |
| 6,588,569 | B1 | 7/2003 | Jenrick et al. | 194/206 |
| 6,601,687 | B1 | 8/2003 | Jenrick et al. | 194/206 |
| 6,603,872 | B2 | 8/2003 | Jones et al. | 382/135 |
| 6,621,919 | B2 * | 9/2003 | Mennie et al. | 382/135 |
| 6,628,816 | B2 | 9/2003 | Mennie et al. | 382/135 |
| 6,636,624 | B2 | 10/2003 | Raterman et al. | 382/135 |
| 6,647,136 | B2 | 11/2003 | Jones et al. | 382/137 |
| 6,650,767 | B2 | 11/2003 | Jones et al. | 382/135 |
| 6,654,486 | B2 | 11/2003 | Jones et al. | 382/135 |
| 6,661,910 | B2 | 12/2003 | Jones et al. | 382/135 |
| 6,665,431 | B2 | 12/2003 | Jones et al. | 382/135 |
| 6,678,401 | B2 | 1/2004 | Jones et al. | 382/135 |
| 6,678,402 | B2 | 1/2004 | Jones et al. | 382/135 |
| 6,705,470 | B2 | 3/2004 | Klein et al. | 209/534 |
| 6,721,442 | B1 * | 4/2004 | Mennie et al. | 382/135 |
| 6,724,926 | B2 | 4/2004 | Jones et al. | 382/135 |
| 6,724,927 | B2 | 4/2004 | Jones et al. | 382/135 |
| 6,731,785 | B1 * | 5/2004 | Mennie et al. | 382/135 |
| 6,731,786 | B2 | 5/2004 | Jones et al. | 382/135 |
| 6,748,101 | B1 | 6/2004 | Jones et al. | 382/135 |
| 6,778,693 | B2 | 8/2004 | Jones et al. | 382/135 |
| 6,798,899 | B2 | 9/2004 | Mennie et al. | 382/135 |
| 6,810,137 | B2 | 10/2004 | Jones et al. | 382/135 |
| 6,843,418 | B2 | 1/2005 | Jones et al. | 235/462.01 |
| 6,860,375 | B2 | 3/2005 | Hallowell et al. | 194/328 |
| 6,866,134 | B2 | 3/2005 | Stromme et al. | 194/207 |
| 6,868,954 | B2 | 3/2005 | Stromme et al. | 194/207 |
| 6,880,692 | B1 | 4/2005 | Mazur et al. | 194/207 |
| 6,913,130 | B1 | 7/2005 | Mazur et al. | 194/207 |
| 6,913,260 | B2 | 7/2005 | Maier et al. | 271/265.04 |

| | | | | |
|---|---|---|---|---|
| 6,915,893 | B2 | 7/2005 | Mennie | 194/207 |
| 6,929,109 | B1 | 8/2005 | Klein et al. | 194/206 |
| 6,955,253 | B1 | 10/2005 | Mazur et al. | 194/207 |
| 6,957,733 | B2 | 10/2005 | Mazur et al. | 194/215 |
| 6,959,800 | B1 | 11/2005 | Mazur et al. | 194/207 |
| 6,962,247 | B2 | 11/2005 | Maier et al. | 194/207 |
| 6,980,684 | B1 | 12/2005 | Munro et al. | 382/135 |
| 6,994,200 | B2 | 2/2006 | Jenrick et al. | 194/206 |
| 6,996,263 | B2 | 2/2006 | Jones et al. | 382/135 |
| 7,000,828 | B2 | 2/2006 | Jones | 235/379 |
| 7,006,664 | B2 | 2/2006 | Paraskevakos | 382/135 |
| 7,016,767 | B2 | 3/2006 | Jones et al. | 700/224 |
| 7,082,216 | B2 | 7/2006 | Jones et al. | 382/137 |
| 7,092,560 | B2 | 8/2006 | Jones et al. | 382/135 |
| 7,103,206 | B2 | 9/2006 | Graves et al. | 382/135 |
| 7,103,438 | B2 | 9/2006 | Hallowell et al. | 700/116 |
| 7,146,245 | B2 | 12/2006 | Jones et al. | 700/224 |
| 7,149,336 | B2 | 12/2006 | Jones et al. | 382/135 |
| 7,158,662 | B2 | 1/2007 | Chiles | 382/135 |
| 7,171,032 | B2 | 1/2007 | Jones et al. | 382/135 |
| 7,187,795 | B2 | 3/2007 | Jones et al. | 382/135 |
| 7,191,657 | B2 | 3/2007 | Maier et al. | 73/587 |
| 7,197,173 | B2 | 3/2007 | Jones et al. | 382/135 |
| 7,200,255 | B2 | 4/2007 | Jones et al. | 382/135 |
| 7,201,320 | B2 | 4/2007 | Csulits et al. | 235/462.01 |
| 7,216,106 | B1 | 5/2007 | Buchanan et al. | 705/45 |
| 7,232,024 | B2 | 6/2007 | Mazur et al. | 194/207 |
| 7,248,731 | B2 | 7/2007 | Raterman et al. | 382/135 |
| 7,256,874 | B2 | 8/2007 | Csulits et al. | 356/71 |
| 7,269,279 | B2 | 9/2007 | Chiles | 382/135 |
| 7,349,566 | B2 | 3/2008 | Jones et al. | 382/139 |
| 7,362,891 | B2 | 4/2008 | Jones et al. | 382/135 |
| 7,366,338 | B2 | 4/2008 | Jones et al. | 382/135 |
| 7,391,897 | B2 | 6/2008 | Jones et al. | 382/135 |
| 7,427,230 | B2 | 9/2008 | Blake et al. | 453/63 |
| 7,438,172 | B2 | 10/2008 | Long et al. | 194/347 |
| 7,505,831 | B2 | 3/2009 | Jones et al. | 700/224 |
| 7,536,046 | B2 | 5/2009 | Raterman et al. | 382/135 |
| 7,542,598 | B2 | 6/2009 | Jones et al. | 382/135 |
| 7,551,764 | B2 | 6/2009 | Chiles et al. | 382/135 |
| 7,552,810 | B2 | 6/2009 | Mecklenburg | 317/194 |
| 7,590,274 | B2 | 9/2009 | Raterman et al. | 382/135 |
| 7,591,428 | B2 | 9/2009 | Freeman et al. | 235/449 |
| 7,599,543 | B2 | 10/2009 | Jones et al. | 382/137 |
| 7,600,626 | B2 | 10/2009 | Hallowell et al. | 194/206 |
| 7,602,956 | B2 | 10/2009 | Jones et al. | 382/135 |
| 7,619,721 | B2 | 11/2009 | Jones et al. | 356/71 |
| 7,620,231 | B2 | 11/2009 | Jones et al. | 382/137 |
| 7,628,326 | B2 | 12/2009 | Freeman et al. | 235/450 |
| 7,635,082 | B2 * | 12/2009 | Jones | 235/379 |
| 7,650,980 | B2 | 1/2010 | Jenrick et al. | 194/206 |
| 2001/0006557 | A1 | 7/2001 | Mennie et al. | 382/135 |
| 2001/0015311 | A1 | 8/2001 | Mennie | 194/207 |
| 2001/0018739 | A1 | 8/2001 | Anderson et al. | 713/176 |
| 2001/0019624 | A1 | 9/2001 | Raterman et al. | 382/135 |
| 2001/0035603 | A1 | 11/2001 | Graves et al. | 271/265.01 |
| 2002/0001393 | A1 | 1/2002 | Jones et al. | 382/100 |
| 2002/0020603 | A1 | 2/2002 | Jones et al. | 194/346 |
| 2002/0056605 | A1 | 5/2002 | Mazur et al. | 194/207 |
| 2002/0085245 | A1 | 7/2002 | Mennie et al. | 358/498 |
| 2002/0085745 | A1 | 7/2002 | Jones et al. | 382/135 |
| 2002/0103757 | A1 | 8/2002 | Jones et al. | 705/45 |
| 2002/0104785 | A1 | 8/2002 | Klein et al. | 209/534 |
| 2002/0107801 | A1 | 8/2002 | Jones et al. | 705/45 |
| 2002/0118871 | A1 | 8/2002 | Jones et al. | 382/137 |
| 2002/0122580 | A1 | 9/2002 | Jones et al. | 382/137 |
| 2002/0126885 | A1 | 9/2002 | Mennie et al. | 382/135 |
| 2002/0126886 | A1 | 9/2002 | Jones et al. | 382/135 |
| 2002/0131630 | A1 | 9/2002 | Jones et al. | 382/137 |
| 2002/0136442 | A1 | 9/2002 | Jones et al. | 382/135 |
| 2002/0145035 | A1 | 10/2002 | Jones | 235/379 |
| 2002/0154804 | A1 | 10/2002 | Jones et al. | 382/135 |
| 2002/0154805 | A1 | 10/2002 | Jones et al. | 382/135 |
| 2002/0154806 | A1 | 10/2002 | Jones et al. | 382/135 |
| 2002/0154807 | A1 | 10/2002 | Jones et al. | 382/135 |
| 2002/0154808 | A1 | 10/2002 | Jones et al. | 382/135 |
| 2002/0186876 | A1 | 12/2002 | Jones et al. | 382/135 |
| 2003/0006277 | A1 | 1/2003 | Maskatiya et al. | 235/379 |
| 2003/0009420 | A1 | 1/2003 | Jones | 705/39 |
| 2003/0015395 | A1 | 1/2003 | Hallowell et al. | 194/206 |
| 2003/0015396 | A1 | 1/2003 | Mennie | 194/206 |
| 2003/0059098 | A1 | 3/2003 | Jones et al. | 382/135 |
| 2003/0062242 | A1 | 4/2003 | Hallowell et al. | 194/302 |
| 2003/0080032 | A1 | 5/2003 | Heidel et al. | 209/534 |
| 2003/0081824 | A1 | 5/2003 | Mennie et al. | 382/135 |
| 2003/0108233 | A1 | 6/2003 | Raterman et al. | 382/135 |
| 2003/0121752 | A1 | 7/2003 | Stromme et al. | 194/207 |
| 2003/0121753 | A1 | 7/2003 | Stromme et al. | 194/207 |
| 2003/0132281 | A1 * | 7/2003 | Jones et al. | 235/379 |
| 2003/0139994 | A1 | 7/2003 | Jones | 705/36 |
| 2003/0168308 | A1 | 9/2003 | Maier et al. | 194/207 |
| 2003/0174874 | A1 | 9/2003 | Raterman et al. | 382/135 |
| 2003/0182217 | A1 | 9/2003 | Chiles | 705/35 |
| 2003/0198373 | A1 | 10/2003 | Raterman et al. | 382/135 |
| 2004/0003980 | A1 | 1/2004 | Hallowell et al. | 194/206 |
| 2004/0016621 | A1 | 1/2004 | Jenrick et al. | 194/206 |
| 2004/0016797 | A1 | 1/2004 | Jones et al. | 235/379 |
| 2004/0028266 | A1 | 2/2004 | Jones et al. | 382/135 |
| 2004/0083149 | A1 | 4/2004 | Jones | 705/35 |
| 2004/0131230 | A1 | 7/2004 | Paraskevakos | 382/100 |
| 2004/0145726 | A1 | 7/2004 | Csulits et al. | 356/71 |
| 2004/0149538 | A1 | 8/2004 | Sakowski | 194/207 |
| 2004/0153408 | A1 | 8/2004 | Jones et al. | 705/43 |
| 2004/0154964 | A1 | 8/2004 | Jones | 209/534 |
| 2004/0173432 | A1 | 9/2004 | Jones | 194/216 |
| 2004/0182675 | A1 | 9/2004 | Long et al. | 194/206 |
| 2004/0251110 | A1 | 12/2004 | Jenrick et al. | 194/207 |
| 2005/0029168 | A1 | 2/2005 | Jones et al. | 209/534 |
| 2005/0035034 | A1 | 2/2005 | Long et al. | 209/534 |
| 2005/0040225 | A1 | 2/2005 | Csulits et al. | 235/379 |
| 2005/0047642 | A1 | 3/2005 | Jones et al. | 382/137 |
| 2005/0060055 | A1 | 3/2005 | Hallowell et al. | 700/95 |
| 2005/0060059 | A1 | 3/2005 | Klein et al. | 700/213 |
| 2005/0060061 | A1 | 3/2005 | Jones | 700/226 |
| 2005/0077142 | A1 | 4/2005 | Tam et al. | 194/217 |
| 2005/0086271 | A1 | 4/2005 | Jones et al. | 707/200 |
| 2005/0087422 | A1 | 4/2005 | Maier et al. | 194/207 |
| 2005/0108165 | A1 | 5/2005 | Jones et al. | 705/43 |
| 2005/0117791 | A2 | 6/2005 | Raterman et al. | 382/135 |
| 2005/0117792 | A2 | 6/2005 | Graves et al. | 382/135 |
| 2005/0150738 | A1 | 7/2005 | Hallowell et al. | 194/206 |
| 2005/0163361 | A1 | 7/2005 | Jones et al. | 382/135 |
| 2005/0163362 | A1 | 7/2005 | Jones et al. | 382/137 |
| 2005/0169511 | A1 | 8/2005 | Jones | 382/135 |
| 2005/0173221 | A1 | 8/2005 | Maier et al. | 194/207 |
| 2005/0183928 | A1 | 8/2005 | Jones et al. | 194/207 |
| 2005/0207634 | A1 | 9/2005 | Jones et al. | 382/135 |
| 2005/0213803 | A1 | 9/2005 | Mennie | 382/135 |
| 2005/0241909 | A1 | 11/2005 | Mazur et al. | 194/207 |
| 2005/0249394 | A1 | 11/2005 | Jones et al. | 382/135 |
| 2005/0265591 | A1 | 12/2005 | Jones et al. | 382/135 |
| 2005/0276458 | A1 | 12/2005 | Jones et al. | 382/135 |
| 2005/0278239 | A1 | 12/2005 | Jones et al. | 705/35 |
| 2006/0010071 | A1 | 1/2006 | Jones et al. | 705/42 |
| 2006/0054455 | A1 | 3/2006 | Kuykendall et al. | 194/217 |
| 2006/0078186 | A1 | 4/2006 | Freeman et al. | 382/135 |
| 2006/0182330 | A1 | 8/2006 | Chiles | 382/135 |
| 2006/0195567 | A1 | 8/2006 | Mody et al. | 709/224 |
| 2006/0210137 | A1 | 9/2006 | Raterman et al. | 382/135 |
| 2006/0274929 | A1 | 12/2006 | Jones et al. | 382/135 |
| 2007/0071302 | A1 | 3/2007 | Jones et al. | 382/135 |
| 2007/0076939 | A1 | 4/2007 | Jones et al. | 382/135 |
| 2007/0078560 | A1 | 4/2007 | Jones et al. | 700/224 |
| 2007/0095630 | A1 | 5/2007 | Mennie et al. | 194/206 |
| 2007/0112674 | A1 | 5/2007 | Jones et al. | 705/45 |
| 2007/0122023 | A1 | 5/2007 | Jenrick et al. | 382/135 |
| 2007/0172107 | A1 | 7/2007 | Jones et al. | 382/137 |
| 2007/0209904 | A1 | 9/2007 | Freeman et al. | 194/210 |
| 2007/0221470 | A1 | 9/2007 | Mennie et al. | 194/216 |
| 2007/0237381 | A1 | 10/2007 | Mennie et al. | 382/135 |
| 2007/0258633 | A1 | 11/2007 | Jones et al. | 382/135 |
| 2007/0269097 | A1 | 11/2007 | Chiles et al. | 382/135 |
| 2007/0278064 | A1 | 12/2007 | Hallowell et al. | 194/206 |
| 2008/0006505 | A1 | 1/2008 | Renz et al. | 194/206 |
| 2008/0033829 | A1 | 2/2008 | Mennie et al. | 705/16 |
| 2008/0044077 | A1 | 2/2008 | Mennie et al. | 382/135 |
| 2008/0060906 | A1 | 3/2008 | Fitzgerald et al. | 194/207 |
| 2008/0123932 | A1 | 5/2008 | Jones et al. | 382/135 |

| | | | | |
|---|---|---|---|---|
| 2008/0133411 | A1 | 6/2008 | Jones et al. | 705/42 |
| 2008/0177420 | A1 | 7/2008 | Klein et al. | 700/224 |
| 2008/0219543 | A1 | 9/2008 | Csulits et al. | 382/135 |
| 2008/0220707 | A1 | 9/2008 | Jones et al. | 453/2 |
| 2008/0285838 | A1 | 11/2008 | Jones et al. | 382/135 |
| 2009/0001661 | A1 | 1/2009 | Klein et al. | 271/258.01 |
| 2009/0022390 | A1 | 1/2009 | Yacoubian et al. | 382/135 |
| 2009/0087076 | A1 | 4/2009 | Jenrick | 382/135 |
| 2009/0090779 | A1 | 4/2009 | Freeman | 235/450 |
| 2009/0236200 | A1 | 9/2009 | Hallowell et al. | 194/215 |
| 2009/0236201 | A1 | 9/2009 | Blake et al. | 194/215 |
| 2009/0239459 | A1 | 9/2009 | Watts et al. | 453/18 |
| 2009/0242626 | A1 | 10/2009 | Jones et al. | 235/379 |
| 2009/0310188 | A1 | 12/2009 | Jones et al. | 358/448 |
| 2009/0313159 | A1 | 12/2009 | Jones et al. | 705/35 |
| 2009/0320106 | A1 | 12/2009 | Jones et al. | 726/5 |
| 2010/0038419 | A1 | 2/2010 | Blake et al. | 235/379 |

FOREIGN PATENT DOCUMENTS

| | | | |
|---|---|---|---|
| EP | 0 416 960 | A2 | 3/1991 |
| EP | 0 473 106 | A2 | 3/1992 |
| EP | 0 632 415 | A2 | 1/1995 |
| EP | 0 718 809 | B1 | 3/2000 |
| EP | 1 041 523 | A2 | 10/2000 |
| FR | 2 539 898 | | 7/1984 |
| FR | 2 722 316 | | 1/1996 |
| GB | 2 093 179 | A | 8/1982 |
| GB | 2 204 166 | A | 11/1988 |
| GB | 2 272 762 | A | 5/1994 |
| GB | 2 355 522 | A | 4/2001 |
| WO | WO 85/02148 | | 5/1985 |
| WO | WO 87/06041 | A1 | 10/1987 |
| WO | WO 90/07165 | | 6/1990 |
| WO | WO 91/11778 | | 8/1991 |
| WO | WO 92/17394 | | 10/1992 |
| WO | WO 93/23824 | | 11/1993 |
| WO | WO 95/10088 | | 4/1995 |
| WO | WO 95/24691 | | 9/1995 |
| WO | WO 96/10800 | | 4/1996 |
| WO | WO 96/36933 | | 11/1996 |
| WO | WO 97/30422 | | 8/1997 |
| WO | WO 97/43734 | | 11/1997 |
| WO | WO 97/45810 | | 12/1997 |
| WO | WO 98/12662 | | 3/1998 |
| WO | WO 98/13785 | | 4/1998 |
| WO | WO 98/24052 | | 6/1998 |
| WO | WO 98/24067 | | 6/1998 |
| WO | WO 98/35323 | | 8/1998 |
| WO | WO 98/40839 | | 9/1998 |
| WO | WO 98/47100 | | 10/1998 |
| WO | WO 98/50892 | | 11/1998 |
| WO | WO 98/59323 | | 12/1998 |
| WO | WO 99/09511 | | 2/1999 |
| WO | WO 99/14668 | | 3/1999 |
| WO | WO 99/23601 | | 5/1999 |
| WO | WO 99/41695 | | 8/1999 |
| WO | WO 99/48040 | | 9/1999 |
| WO | WO 99/48042 | | 9/1999 |
| WO | WO 00/24572 | | 5/2000 |
| WO | WO 94/06102 | | 10/2000 |
| WO | WO 01/08108 | | 2/2001 |
| WO | WO 01/59685 | | 8/2001 |
| WO | WO 01/59723 | | 8/2001 |
| WO | WO 02/29735 | | 4/2002 |
| WO | WO 02/054360 | | 7/2002 |
| WO | WO 03/005312 | | 1/2003 |
| WO | WO 03/028361 | | 4/2003 |
| WO | WO 03/029913 | | 4/2003 |
| WO | WO 03/030113 | | 4/2003 |
| WO | WO 03/067532 | | 8/2003 |
| WO | WO 03/107282 | | 12/2003 |
| WO | WO 2004/010367 | | 1/2004 |
| WO | WO 2004/027717 | | 4/2004 |
| WO | WO 2004/036508 | | 4/2004 |
| WO | WO 2004/038631 | | 5/2004 |
| WO | WO 2004/068422 | | 8/2004 |
| WO | WO 2005/013209 | A2 | 2/2005 |
| WO | WO 2005/017842 | A1 | 2/2005 |
| WO | WO 2005/028348 | A2 | 3/2005 |
| WO | WO 2005/029240 | A2 | 3/2005 |
| WO | WO 2005/036445 | A1 | 4/2005 |
| WO | WO 2005/076229 | A1 | 8/2005 |
| WO | WO 2006/039439 | A2 | 4/2006 |
| WO | WO 2006/076289 | A2 | 7/2006 |
| WO | WO 2006/076634 | A2 | 7/2006 |
| WO | WO 2007/044570 | A2 | 4/2007 |
| WO | WO 2007/120825 | A2 | 10/2007 |
| WO | WO 2007/143128 | A2 | 12/2007 |
| WO | WO 2008/030356 | A1 | 3/2008 |
| WO | WO 2008/112132 | A1 | 9/2008 |

OTHER PUBLICATIONS

Written Opinion of the International Searching Authority of Application No. PCT/US2008/003009.

CMOS Sensor Inc. I-CIS (Industrial camera image scanner) Sep. 3, 2008, 1 Page.

The Multifunctional and Parallel Working Desktop Banknote Processing System, Apr. 30, 2002, 4 Pages.

BEB Real Time Image Processing From BEB, As Fast As Light—Recognition, Verification, Sorting. 8 Pages.

Toshiba/Mosler: CF-420 brochure, "Wouldn't It Be Great . . . ," 4 pages. (© 1989).

Toshiba/Mosler: CF-420—Revised drawings of portions of Mosler CF-420 Cash Management System (Figs. A-C) and description of the same, 4 pages (1989).

(Toshiba /) Mosler: CF-420 Cash Management System—Operator's Manual, 152 pages (cover bears © 1989) [V0001-V0152].

* cited by examiner

OPTICAL IMAGING SENSOR FOR A DOCUMENT PROCESSING DEVICE

CROSS-REFERENCE TO RELATED APPLICATIONS

This application claims the benefit of U.S. Provisional Application No. 61/095,544, filed Sep. 9, 2008; this application is a continuation-in-part of U.S. patent application Ser. No. 12/175,307, filed Jul. 17, 2008, which claims the benefit of U.S. Provisional Application No. 60/950,263, filed Jul. 17, 2007; this application is a continuation-in-part of U.S. patent application Ser. No. 12/044,720, filed Mar. 7, 2008, which claims the benefits of U.S. Provisional Application No. 60/905,965, filed Mar. 9, 2007, and U.S. Provisional Application No. 61/022,752, filed Jan. 22, 2008; all of the above-identified applications being hereby incorporated by reference herein in their entireties.

FIELD OF THE INVENTION

The present disclosure relates generally to document processing systems, and more particularly, to document imaging systems including an optical imaging sensor arrangement.

BACKGROUND OF THE INVENTION

As document processing devices and systems become more advanced and include more mechanical and electrical components, the overall space needed to store and house all of the components increases. In a time where consumers require smaller, more compact, and more economical document processing devices and systems that take up less table-top space, elimination of unnecessary or superfluous physical and electrical components is desired.

One mechanical component that occupies space within document processing devices is mechanical rollers used to transport documents along a transport path. Typical document processing devices require a mechanical roller or wheel to be positioned over a detecting region—the region of the transport path where documents are detected, scanned, and/or imaged—to hold documents tight to a contact image sensor. Typically, document processing devices and systems configured to image both surfaces of documents require two contact image sensors on opposite sides of the transport path. Because each of the contact image sensors requires a mechanical wheel located adjacent to the respective detecting regions, the contact image sensors are located downstream along the transport path from one another to allow enough space for the mechanical wheels. Additionally, the contact image sensors are located downstream from one another to prevent light from one contact image sensor leaking into the other contact image sensor. However, such a downstream contact image sensor requires additional space within a document processing device to accommodate the resulting elongated transport path.

Thus, a need exists for an improved apparatus and system. The present disclosure is directed to satisfying one or more of these needs and solving other problems.

SUMMARY OF THE INVENTION

According to some embodiments a document processing device includes an input receptacle, a transport mechanism, one or more output receptacles, a sensor arrangement, a photodetector, and a controller. The input receptacle is configured to receive a stack of documents. The transport mechanism is configured to transport the documents, one at a time, in a transport direction from the input receptacle along a transport path to the one or more output receptacles. The sensor arrangement is positioned adjacent to the transport path. The sensor arrangement includes at least one light source configured to illuminate at least a portion of a surface of one of the documents and a gradient index lens array. The gradient index lens array is configured to collect light reflected from the surface of the one of the documents and to transmit at least a portion of the collected reflected light onto the photodetector array. The controller is operatively coupled with the transport mechanism and the sensor arrangement. The controller is configured to control operation of the transport mechanism and the sensor arrangement. The photodetector array generates one or more electrical signals in response to the gradient index lens transmitting at least a portion of the collected light reflected thereon. The one or more electrical signals are transmitted from the photodetector array to the controller. The controller is configured to derive data including image data from the one or more electrical signals. The image data is reproducible as a visually readable image of the surface of the document. The visually readable image has a resolution such that alphanumeric characters can be extracted from the image data in response to the document remaining within a depth of field of the gradient index lens array while being transported via the transport mechanism. The depth of field is at least about 0.03 inches.

According to some embodiments, a document processing device includes a first sensor arrangement and a second sensor arrangement. The first sensor arrangement is positioned along a first side of a transport path and includes at least one light source and a first gradient index lens array. The at least one light source is configured to illuminate at least a portion of a first surface of a document being transported along the transport path in a direction of motion. The first gradient index lens array is configured to collect light reflected from the first surface of the document and to transmit at least a portion of the collected reflected light onto a first photodetector array. The second sensor arrangement is positioned along a second opposing side of the transport path and includes at least one light source and a second gradient index lens array. The at least one light source is configured to illuminate at least a portion of a second surface of the document. The second gradient index lens array is configured to collect light reflected from the second surface of the document and to transmit at least a portion of the collected reflected light onto a second photodetector array. The first sensor arrangement and the second sensor arrangement are off-set along the direction of motion of the transport path by a distance of about 0.2 inches to about 1.0 inch. The first and the second photodetector arrays generate one or more electrical signals from which visually readable images of the first surface and of the second surface of the document can be reproduced having a resolution such that alphanumeric characters can be extracted therefrom. The one or more electrical signals are generated in response to the document remaining within a depth of field of the first and the second gradient index lens arrays while being transported along the transport path. The depth of field is at least about 0.03 inches.

According to some embodiments, a document processing device includes a first sensor arrangement and a second sensor arrangement. The first sensor arrangement is positioned along a first side of a transport path and includes a first cover, a first light source, a second light source, a first lens, a second lens, and a first gradient index lens array. The first cover has a first surface and a second surface. The first lens is configured to collect light emitted from the first light source and to illuminate at least a portion of a first surface of a document being transported in a direction of motion along the transport path. The second lens is configured to collect light emitted from the second light source and to illuminate at least a portion of the first surface of the document. The first gradient index lens array is configured to collect light reflected from the first surface of the document and to transmit at least a portion of the collected reflected light onto a first photodetector. The second sensor arrangement is positioned along a second opposing side of the transport path and includes a second cover, a third light source, a fourth light source, a third lens, a fourth lens, and a second gradient index lens array. The second cover has a first surface and a second surface, the first surface of the second covering is spaced across the transport path from the first surface of the first cover by a distance G. The third lens is configured to collect light emitted from the third light source and to illuminate at least a portion of a second surface of the document. The fourth lens is configured to collect light emitted from the fourth light source and to illuminate at least a portion of the second surface of the document. The second gradient index lens array is configured to collect light reflected from the second surface of the document and to transmit at least a portion of the received reflected light onto a second photodetector array. The first sensor arrangement and the second sensor arrangement are separated along the direction of motion of the transport path by a distance between about 0.2 inches and about 1.0 inch. The first gradient index lens array and the first photodetector array are configured such that the first gradient index lens array has a first shifted focal plane, the first shifted focal plane being located at about one-half of the distance G from the first surface of the first cover. The second gradient index lens array and the second photodetector array are configured such that the second gradient index lens array has a second shifted focal plane, the second shifted focal plane being located at about one-half of the distance G from the first surface of the second cover.

Figure 1A:
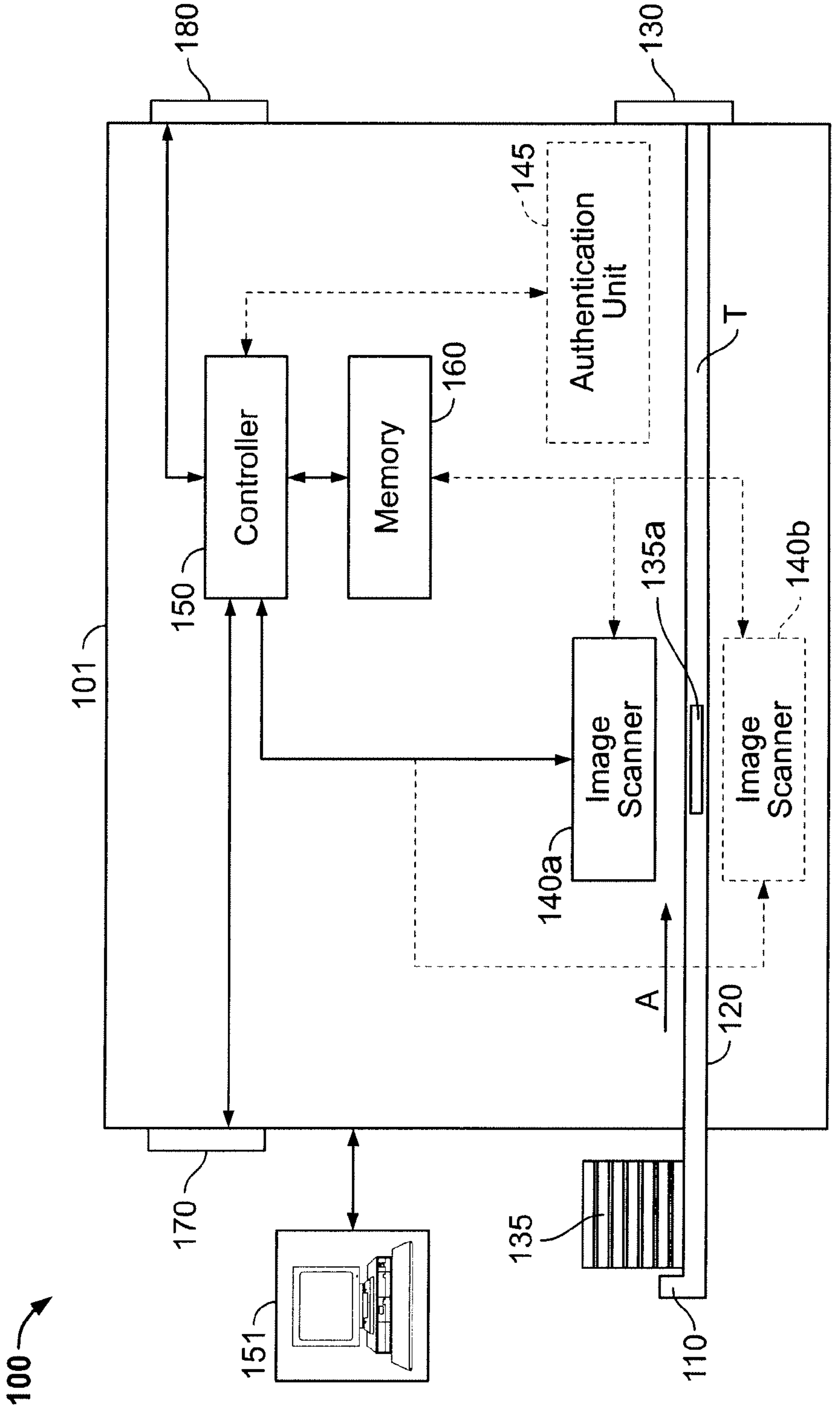
FIG. 1A is a block diagram of a document processing system according to some embodiments of the present disclosure.

Additional aspects of the invention will be apparent to those of ordinary skill in the art in view of the detailed description of various embodiments, which is made with reference to the above drawings and the detailed description provided below.

DETAILED DESCRIPTION

While this invention is susceptible of aspects and embodiments in different forms, there is shown in the drawings and will herein be described in detail certain aspects and embodiments of the invention with the understanding that the present disclosure is to be considered as an exemplification of the principles of the invention and is not intended to limit the broad aspect of the invention to the aspects and embodiments illustrated.

DEFINITIONS

When describing various embodiments, the term “currency bills” or “bills” refers to official currency bills including both U.S. currency bills, such as a $1, $2, $5, $10, $20, $50, or $100 note, and foreign currency bills. Foreign currency bills are notes issued by a non-U.S. governmental agency as legal tender, such as a euro, Japanese yen, pound sterling (e.g., British pound), Canadian dollar, or Australian dollar.

“Substitute currency notes” are sheet-like documents similar to currency bills, but are issued by non-governmental agencies such as casinos and amusement parks and include, for example, casino script and Disney Dollars. Substitute currency notes each have a denomination and an issuing entity associated therewith such as, for example, a $5 Disney Dollar, a $10 Disney Dollar, a $20 ABC Casino note, and a $100 ABC Casino note.

“Currency notes” consist of currency bills and substitute currency notes.

“Substitute currency media” are documents that represent a value by some marking or characteristic such as a bar code, color, size, graphic, or text. Examples of substitute currency media include without limitation: casino cashout tickets (also called cashout vouchers or coupons) such as, for example, “EZ Pay” tickets issued by International Gaming Technology or “Quicket” tickets issued by Casino Data Systems; casino script; promotional media such as, for example, Disney Dollars or Toys a Us “Geoffrey Dollars”; or retailer coupons, gift certificates, gift cards, or food stamps. Accordingly, substitute currency media includes, but is not limited to, substitute currency notes. Substitute currency media may or may not be issued by a governmental body.

The term "currency documents" includes both currency bills and "substitute currency media." The term "non-currency documents" includes any type of document except currency documents. For example, non-currency documents include personal checks, commercial checks, deposit slips, loan payment documents, cash credit or cash debit tickets, etc.

The terms "financial documents" and/or "documents" generally refer to any of currency bills, substitute currency notes, currency notes, substitute currency media, currency documents, and non-currency documents. According to some embodiments, the term document can also refer to full sheets of letter sized (e.g., 8½"×11") and/or A4 sized documents.

Everyday, businesses and people unknowingly accept counterfeit currency documents as genuine. A counterfeit currency document is a currency document which is not issued by an authorized maker. For example, in the case of U.S. currency bills, a counterfeit currency bill would be a document printed to look like a genuine U.S. bill but not printed by the U.S. Treasury Department's Bureau of Engraving and Printing or one that has been tampered with or altered. As another example, in the case of casino script, a counterfeit currency document would be a script that is not issued by the casino or one that has been tampered with or altered.

Document Processing System

Referring to FIG. 1A, a document processing system 100 is shown according to some embodiments of the present disclosure. According to some embodiments, the document processing system 100 includes a document processing device 101. According to some embodiments, the document processing system 100 further includes a computer and/or server 151 communicatively connected with the document processing device 101. While FIG. 1A illustrates a document processing system having a particular number and arrangement of devices and components, it is contemplated that a document processing system according to the present disclosure can have a variety of other devices and components with the same and/or different relative positions.

According to some embodiments, the document processing device 101 includes an input receptacle 110, a transport mechanism 120, and an output receptacle 130. While, only one input receptacle 110 and one output receptacle 130 are shown in FIG. 1A, it is contemplated that according to some embodiments, the document processing device 101 may include a plurality of input receptacles 110 and/or a plurality of output receptacles 130. Details of such systems/devices are described in International Publication No. WO 97/45810 and U.S. Pat. No. 6,311,819, entitled "Method and Apparatus for Document Processing," which are hereby incorporated by reference herein in their entireties.

According to some embodiments, the document processing device 101 is configured to receive only one document at a time. According to other embodiments, the document processing device 101 is configured to receive a stack of documents 135 in the input receptacle 110. According to some embodiments, the stack of documents 135 only includes U.S. currency bills. It is contemplated that in lieu of or in addition to bills, the stack of documents 135 can include one or more of a variety of other types of documents, such as, for example, currency bills of one or more countries, checks, coupons, casino tickets, barcoded tickets, stamps, etc. According to some embodiments, the stack of documents 135 can include intermingled documents, such as, for example, intermingled or mixed bills and checks.

According to some embodiments, the stack of documents 135 includes a first batch of documents and a second batch of documents. According to some such embodiments, the first batch of documents solely includes bills and the second batch of documents solely includes checks. According to some embodiments, the first batch of documents is inputted and processed separately from the second batch of documents. According to some embodiments, the first batch of documents is received in a first input receptacle and the second batch of documents is received in a second separate input receptacle. In such embodiments, the first and the second batches of documents can be run and/or transported simultaneously or one after the other. According to some embodiments, the first batch of documents can be processed using a first detector and the second batch of documents can be processed using the first detector and/or a second detector. According to some such embodiments, the first and the second detectors are located in separate and distinct transport paths. Yet, according to other embodiments, the first and the second detectors are located along the same transport path.

The transport mechanism 120 is coupled to the input receptacle 110 and is configured to transport the plurality of documents 135 along a transport path T. The documents, such as document 135*a*, are transported via the transport mechanism 120 in the direction of arrow A from the input receptacle 110 to the output receptacle 130 of the document processing device 101, past at least one detector, and to the output receptacle 130.

According to some embodiments, the at least one detector is configured to detect, scan, and/or image the documents 135 and to generate one or more electrical signals. The one or more generated electrical signals are associated with characteristic information of the documents 135. According to some embodiments, one or more electrical signals can be processed via one or more controllers and/or processors to derive image data, authentication data, positional data (e.g., position along the transport path T), etc.

According to some embodiments, the document processing device 101 includes a plurality of detector bays for mounting a plurality of detectors. In some embodiments, the document processing device 101 includes two or more detector bays. In some embodiments, the document processing device 101 includes three or four detector bays along a first side of the transport path T and/or three or four corresponding detector bays along a second opposing side of the transport path T.

According to some embodiments, the at least one detector includes one or more sensor arrangements 140*a* and/or 140*b*, one or more authentication sensors or units 145, or a combination thereof. According to some embodiments, the document processing device 101 includes a single sensor arrangement 140*a* to detect, scan, and/or image one or both sides of each passing document. According to other embodiments, the document processing device 101 includes a first sensor arrangement 140*a* to detect, scan, and/or image a first side of each passing document and a second sensor arrangement 140*b* to detect, scan, and/or image a second opposing side of each respective passing document. According to some embodiments, the second sensor arrangement 140*b* is positioned on an opposing side of the transport path T as compared with the position of the first sensor arrangement 140*a*. According to some embodiments, the second sensor arrangement 140*b* is off-set upstream or downstream from the first sensor arrangement 140*a*. According to some embodiments, the first and the second sensor arrangements 140*a* and 140*b* can be replaced with and/or substituted for any of the sensor arrangements described herein, such as, for example, sensor arrangements 210, 310, 410*c*, 610, 610', 710, 710', 810, and 810'.

According to some embodiments, the document processing device 101 includes an authentication sensor or authentication unit 145. Yet according to other embodiments, the document processing device 101 does not include an authentication sensor 145. In some such embodiments, the lack of the authentication sensor 145 reduces the overall weight, size, and cost of the document processing device 101. Authentication can be accomplished using the authentication sensor 145 and/or by using a database of serial numbers for known or suspected counterfeit currency bills. The authentication sensor 145 is optionally positioned adjacent to the transport path T in a similar fashion as the image sensor arrangements 140*a* and/or 140*b*. The authentication sensor 145 is configured to authenticate the documents 135 based on one or more criteria and/or authentication tests as is commonly known in the art. Some examples of authentication sensors and authentication tests are described in U.S. Pat. No. 5,640,463, issued on Jun. 17, 1997, entitled "Method and Apparatus For Authenticating Documents Including Currency"; U.S. Pat. No. 5,790,693, issued on Aug. 4, 1998, entitled "Currency Discriminator and Authenticator"; U.S. Pat. No. 5,992,601, issued on Nov. 30, 1999, entitled "Method and Apparatus for Document Identification and Authentication"; and U.S. Pat. No. 5,960,103, issued on Sep. 28, 1999, entitled "Method and Apparatus for Authenticating Currency"; all of which are hereby incorporated by reference herein in their entireties.

According to some embodiments, the input receptacle 110 is configured to receive the stack of documents 135 with a wide edge or a longer edge of the documents 135 being initially fed into the document processing device 101. That is, according to some embodiments, the wide edge of the stack of documents 135 is perpendicular to the direction of arrow A, which is also called the feed direction. According to some embodiments, transporting the stack of documents 135 with the wide edge leading can increase the overall processing speed of the document processing device 101. According to some embodiments, the input receptacle 110 includes two slidable guides (not shown) that are adjustable such that the input receptacle 110 can receive the stack of documents 135 with the wide edge leading or a narrow edge or shorter edge of the documents leading. That is, according to some embodiments, the narrow edge of the documents 135 is perpendicular to the feed direction.

According to some embodiments, a controller or processor 150 is coupled to the sensor arrangement(s) 140*a* and/or 140*b*, the transport mechanism 120, a memory 160, an operator interface or control panel 170, and a communications port or network device 180. The controller 150 is configured to control the operation of the transport mechanism 120 and the sensor arrangement(s) 140*a* and/or 140*b*. The controller 150 is also configured to communicate information and/or instructions to and from the memory 160, the control panel 170, and the communications port 180. For example, the controller 150 may send information to and receive operator input from the control panel 170. The control panel 170 can be configured to display information regarding the documents 135 and/or status information concerning the operation of the document processing system 100. For example, according to some embodiments, the control panel 170 is configured to display an image or a partial image (e.g., snippet image) of a document of concern, such as a currency bill that is identified as a possible counterfeit currency bill, also known as a suspect currency bill.

According to some embodiments, the controller 150 is one or more computers. In these embodiments, the controller 150 can include a plurality of memory devices (e.g., RAM, ROM, Hard Drive, flash memory, etc.), processor(s), etc. necessary to perform a plurality of document processing functions within the document processing system 100. Some examples of document processing functions include, but are not limited to, cropping and deskewing images and/or data, compressing data, denominating bills, extracting information (e.g., character information, serial numbers, etc.), comparing extracted data with one or more databases, determining, storing, transmitting, etc.

According to some embodiments, the operator can initiate document processing via use of the control panel 170. According to some embodiments, the operator can initiate document processing via use of the computer 151 communicatively connected to the document processing device 101 via, for example, the communications port 180. According to some embodiments, the control panel 170 is a full graphics color touch screen configured to display operational instructions, configuration menus/screens, warnings, visually readable images of documents and/or snippet images, softkey buttons, etc. to an operator of the document processing device 101. Alternatively or additionally, the control panel 170 may contain physical keys or buttons and/or another type of display such as an LED display. For example, a QWERTY keyboard and/or a ten key numerical keypad may be utilized. According to some embodiments, the control panel 170 displays "functional" keys when appropriate. According to some embodiments, the control panel 170 is integrated within a housing 190 (FIG. 1B) of the document processing device 101. Alternatively, the control panel 170 can be remotely positioned from the housing 190, yet communicatively connected therewith via a wired connection, a wireless connection, a Bluetooth connection, a WI-FI connection, etc.

In response to the operator initiating document processing, the transport mechanism 120 transports the stack of documents 135 in the direction of arrow A in a serial fashion, one document at a time, one after another. As the documents 135 are transported along the transport path T via the transport mechanism 120, data associated with each document, such as, for example, document 135*a*, is generated using the controller 150 and/or at least one detector, such as, for example, the sensor arrangement(s) 140*a* and/or 140*b*.

According to some embodiments, the generated data is image data that is reproducible as a visually readable image or a human readable image of substantially the entire document 135*a* (a "full image") and/or of selected portions of the document 135*a* (a "snippet image"). According to some embodiments, a visually readable and/or human readable image is defined based on a number of dots or pixels per inch ("DPI") that form the image. For purposes of the present disclosure, a visually readable image is an image having a sufficient resolution to be used in document processing. According to some embodiments, a resolution of at least 50 DPI×50 DPI—that is, a visually readable image having 2500 dots or pixels per square inch—is a sufficient resolution for document processing. According to some embodiments, a resolution of at least 100 DPI×100 DPI is a sufficient resolution for document processing. According to some embodiments, a resolution of at least 200 DPI×100 DPI is a sufficient resolution for document processing. According to some embodiments, a resolution of at least 200 DPI×200 DPI is a sufficient resolution for document processing. As the DPI increase, the amount of data and/or information generated by the controller 150 and/or the sensor arrangement(s) 140*a* and/or 140*b* increases, which may be a factor in causing relatively slower processing speeds in some embodiments. According to some embodiments, the resolution of an image is defined as P DPI×Q DPI, where P is the resolution in the x-direction or the direction perpendicular to the feed direction, and Q is the resolution in the y-direction or the direction parallel to the feed direction.

According to some embodiments, the sensor arrangement(s) 140*a* and/or 140*b*, the controller 150, and/or the memory 160 includes data extraction software such as optical character recognition (OCR) software for identifying characters contained in one or more fields of image data—reproducible as a visually readable image or a human readable image—of the documents 135 and extracting the characters as extracted data. It is contemplated that according to some embodiments, other software can be used to extract character or symbol information from the image data and/or the visually readable images. According to some embodiments, the document processing system 100 uses the OCR software to obtain or extract identifying information from the image data associated with each of the documents 135. For example, the OCR software may search image data for a currency bill for a serial number data field and extract a serial number of the currency bill once the data field is located.

According to some embodiments, the visually readable image can be formed from the image data with a resolution of 300 DPI×200 DPI, 300 DPI×300 DPI, 400 DPI×200 DPI, or 400 DPI×400 DPI. Such elevated resolutions can be desired when using OCR software to extract relatively small characters from an image. For example, when trying to extract small characters on a currency bill, such as, for example, plate serial numbers, the controller 150 and/or the sensor arrangement(s) 140*a* and/or 140*b* can be configured to produce image data that is reproducible as visually readable images having elevated resolutions (e.g., 400 DPI×200 DPI).

According to some embodiments, the memory 160 is configured to store and/or buffer data associated with the documents 135. The data can be reproducible as a visually readable image when read and displayed on a display device (e.g., control panel 170) or printed on a printing device (not shown). The visually readable image can be a full visually readable image that depicts the document 135*a* or a partial or snippet visually readable image (e.g., serial number snippet image) that depicts the document 135*a*. According to some embodiments, the memory 160 is configured to store and/or buffer extracted and/or inputted data, such as, for example, identifying information and/or transactional information associated with the stack of documents 135. The identifying information can include, for example, serial numbers, denominations, batch/deposit identification numbers, etc. The transaction information can include, for example, a financial institution account number, a transaction identifier, a customer name, address, phone number, a total deposit amount, a total currency bill deposit amount, a total check deposit amount, a number of deposited currency bills broken down by denomination, and/or a number of deposited checks.

According to some embodiments, the memory 160 is configured to store a database or a suspect database. The database can include a variety of information associated with known and/or suspected counterfeit currency bills. For example, the database can include a list of serial numbers of known or suspected counterfeit currency bills. As another example, the database can include a list of known combinations of identifying information used on counterfeit currency bills. Due to the difficulty in producing counterfeit currency bills that each have completely unique identifying information (e.g., serial number, federal reserve bank number, plate serial number, and plate position letters and numbers), such known combinations of identifying information are useful in detecting counterfeit currency bills that have varying or unique serial numbers. Such counterfeit currency bills would be unique but for other small constant numbers, letters, and/or symbols on the currency bills that remain the same from currency bill to currency bill. Additionally or alternatively, the database can include a variety of information (e.g., checking account numbers, bank routing numbers, check numbers, etc.) associated with checking accounts tied to fraudulent activity (e.g., check kiting schemes).

According to some embodiments, authentication by use of a database is accomplished by comparing identifying information (e.g., currency bill serial number, check MICR line) with data or information in the database, which can be called a blacklist comparison. Such authentication using the database does not require the presence of the authentication sensor 145. According to some embodiments, the database is stored in the memory 160 of the document processing device 101. Alternatively, the database can be stored in a memory of a computer (e.g., computer 151) communicatively connected with the document processing device 101 and/or a memory of a server communicatively connected to the document processing system 100. The computer and/or the server can be configured to compare identifying information associated with the stack of documents 135 with the data or information in the database to determine if one or more of the documents in the stack of documents 135 is a suspect document (e.g., suspect bill or fraudulent check). For example, according to some embodiments, the controller 150 compares an extracted serial number associated with a bill against serial numbers in the database. If a complete match or, in some embodiments, a partial match is found, the controller 150 may send a signal or an instruction to the operator control panel 170 to indicate that a suspect currency bill has been found (e.g., a currency bill suspected of being counterfeit). According to some embodiments, a visually readable image of at least a portion of the suspect bill is displayed on the control panel 170.

According to some embodiments, a number of types of information can be used to assess whether a currency bill is a suspect currency bill, including serial number, denomination, series, front plate number, back plate number, signatories, issuing bank, image quality, infrared characteristics, magnetic characteristics, ultraviolet characteristics, color shifting ink, watermarks, metallic threads, holograms, etc., or some combination thereof. According to some embodiments, all of or a portion of these types of information can be derived from and/or extracted from a currency bill, a visually readable image of a currency bill, and/or data reproducible as a visually readable image of a currency bill. According to some embodiments, the information may be used for cross-referencing the serial number of a currency bill for purposes of determining suspect currency bills. For example, a serial number of a currency bill may be related to an extracted series. Thus, for a particular currency bill having a serial number and a series that do not correspond, the currency bill can be determined to be a suspect currency bill.

As described above, according to some embodiments, the controller 150 is configured to communicate information to and from the communications port 180. The communications port 180 is configured to be communicatively connected to a network (e.g., Internet, private network, customer network, financial institution network, LAN, WAN, secured network, etc.) to permit information to be transmitted to and from the document processing device 101. For example, according to some embodiments, the document processing device 101 comprises an Ethernet card comprising the communications port 180 that is communicatively connected to a network. It is contemplated that according to some embodiments, the document processing device 101 includes two or more communications ports 180 to increase the flow and/or transfer of data to and from the document processing device 101.

Figure 1B:
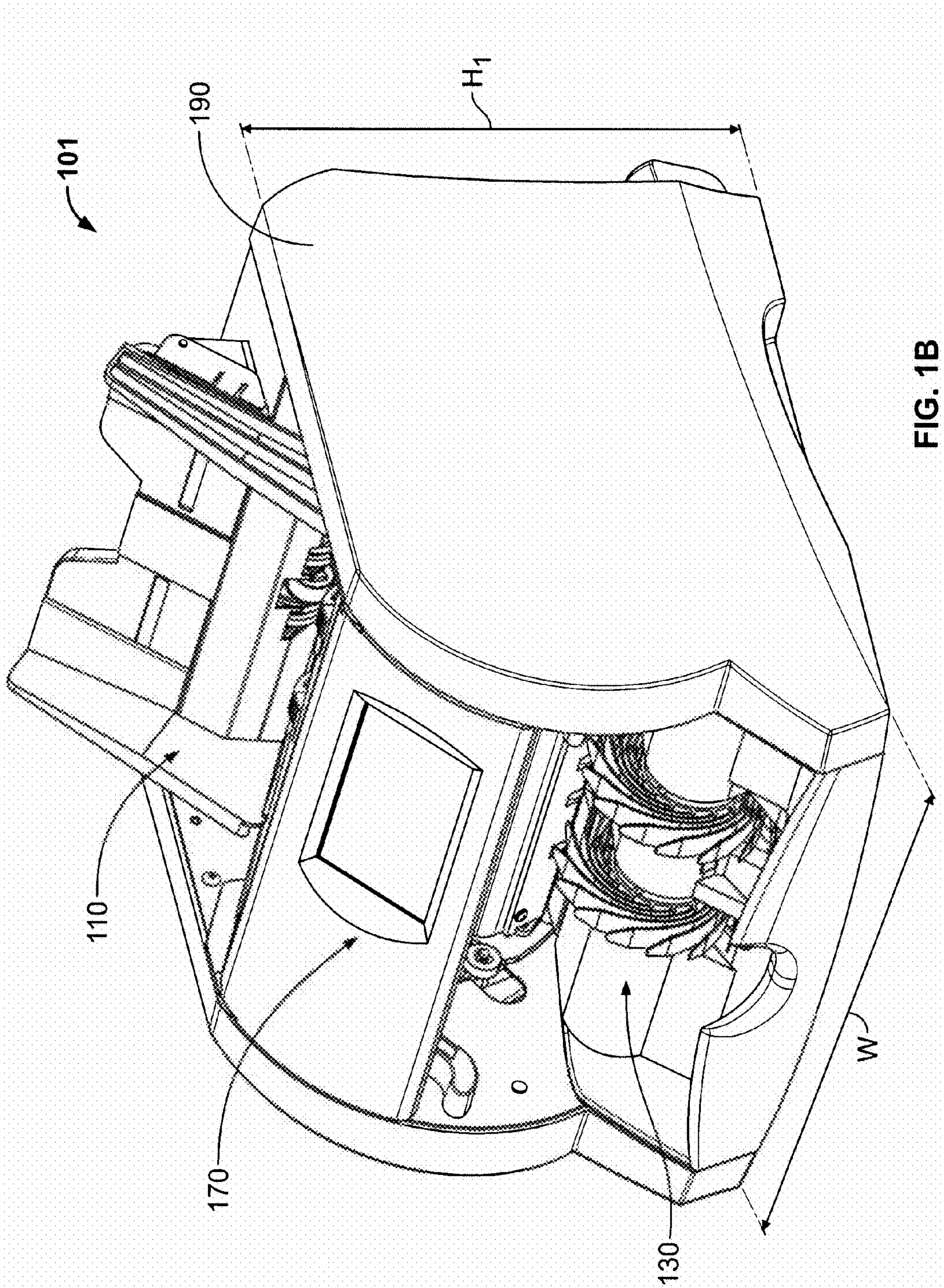
FIG. 1B is a perspective view of a document processing device according to some embodiments of the present disclosure.
Figure 1C:
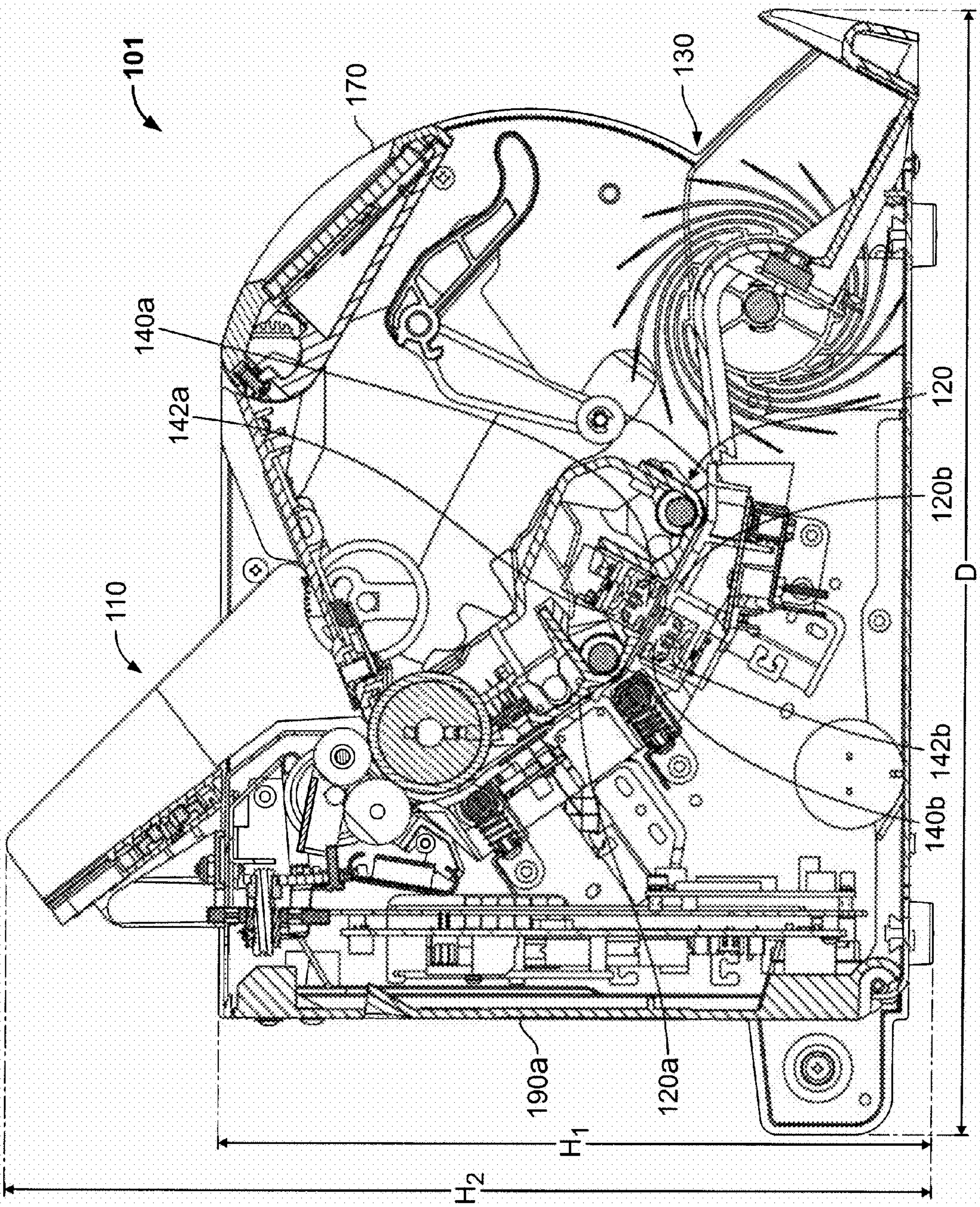
FIG. 1C is a cross-sectional side view of the document processing device of FIG. 1B.

Referring generally to FIGS. 1B and 1C, the document processing device 101, described above and shown in FIG. 1A, is shown according to some exemplary embodiments of the present disclosure, where like reference numbers are used to indicate like components. FIG. 1B is a perspective view of the document processing device 101 and FIG. 1C is a cross-sectional side view of the document processing device 101. According to some embodiments, the document processing device 101 includes an input receptacle 110, a transport mechanism 120, an output receptacle 130, and a housing 190. According to some embodiments, the input receptacle 110 is configured to receive a plurality of documents with a wide edge or a longer edge of the plurality of documents being initially fed into the document processing device 101. That is, the document processing device 101 is adapted to transport documents in a wide-edge leading manner.

According to some embodiments, the control panel 170 is coupled to the housing 190. The control panel 170 is shown in a closed or down position. According to some embodiments, the control panel 170 can be rotationally or moveably coupled to the housing 190, such that, the control panel 170 can be rotated with respect to the housing 190 to change a viewing angle of the control panel 170. In some embodiments, the control panel 170 can also be repositioned to increase access to the transport mechanism 120 during a document jam.

According to some embodiments, the transport mechanism 120 includes an upper transport plate assembly 120*a* and a lower transport plate assembly 120*b*, as shown in FIG. 1C. According to some embodiments, the upper transport plate assembly defines a first side of the transport path T. Similarly, according to some embodiments, the lower transport plate assembly 120*b* defines a second opposing side of the transport path T. The upper transport plate assembly 120*a* can be selectively positioned between an open position and a closed position. The open position of the transport mechanism 120 allows for easy removal of jammed documents, cleaning, and maintenance, all from a front or display side of the document processing device 101.

The upper and lower transport plate assemblies 120*a* and 120*b* can each include a plurality of mechanical and/or electrical components, such as, for example, UV sensors, IR sensors, magnetic sensors, imaging sensors, hold-down wheels, drive wheels, spring wheels, LEDs and/or other light sources. According to some embodiments, the upper transport plate assembly 120*a* includes a first sensor assembly such as the sensor arrangement 140*a* and the lower transport plate assembly 120*b* includes a second sensor assembly such as the sensor arrangement 140*b*. According to some embodiments, the first sensor arrangement 140*a* includes a first housing 142*a* and the second sensor arrangement 140*b* includes a second housing 142*b*. According to some embodiments, the first and the second sensor arrangements 140*a* and 140*b* are at least about 9.1 inches wide. That is, the dimension of the first and the second housings 142*a* and 142*b* that is perpendicular to the direction of transport of documents is at least about 9.1 inches. According to some embodiments, the first and the second housings 142*a* and 142*b* are about 9.1 inches wide. According to some embodiments, the first and the second sensor arrangements 140*a* and 140*b* are wide enough to detect, scan, and/or image business or commercial checks in a wide edge leading feed and standard and A4 sheets of paper with a narrow edge leading feed.

According to some embodiments, the document processing device 101 is communicatively connected to a computer or a processor (e.g., computer 151) to form a document processing system, such as the document processing system 100. Alternatively, the computer or processor is integral within the housing 190 such that the document processing device 101 corresponds to a singly housed document processing system.

According to some embodiments, the document processing device 101 has a height $H_2$ of less than about twelve inches, a width W of less than about fourteen inches, and a depth D of less than about fifteen inches. According to some embodiments, the document processing device 101 has a height $H_1$ of less than about nine and a half inches, a width W of less than about fourteen inches, and a depth D of less than about thirteen and a half inches.

According to some embodiments, the document processing device 101 has a footprint of less than about two square feet. According to some embodiments, the document processing device 101 has a footprint of less than about one and a half square feet. According to some embodiments, the document processing device 101 has a footprint of less than one and a quarter square feet.

According to some embodiments, the document processing device 101 weighs less than about 35 lbs. According to some embodiments, the document processing device 101 weighs less than about 25 lbs. According to some embodiments, the document processing device 101 weighs about twenty lbs. According to some embodiments, the document processing device 101 is compact and adapted to be rested on a tabletop or countertop. According to some embodiments, the document processing device 101 can be a part of a larger document processing system such as, for example, systems used for currency bill sorting and/or other types of document sorting. According to some embodiments, the document processing device 101 is configured to be placed on a surface and be opened to be permit removal or clearing of a document jam, cleaning, and/or maintenance without having to be moved or otherwise repositioned and without consuming additional footprint space while being in the open position. That is, the footprint associated with the device 101 in its open state (permitting access to its interior transport path) is the same as the footprint of the device 101 in its closed operational state. Likewise, according to some embodiments, the volume occupied the document processing device 101 in its open state (permitting access to its interior transport path) is the same as the volume of the document processing device 101 in its closed operational state. In some such embodiments, the housing 190 of the document processing device 101 can be positioned with a back side 190*a* adjacent to a wall and does not need to be moved away from the wall when the upper transport plate assembly 120*a* is in the opened position.

Figure 1D:
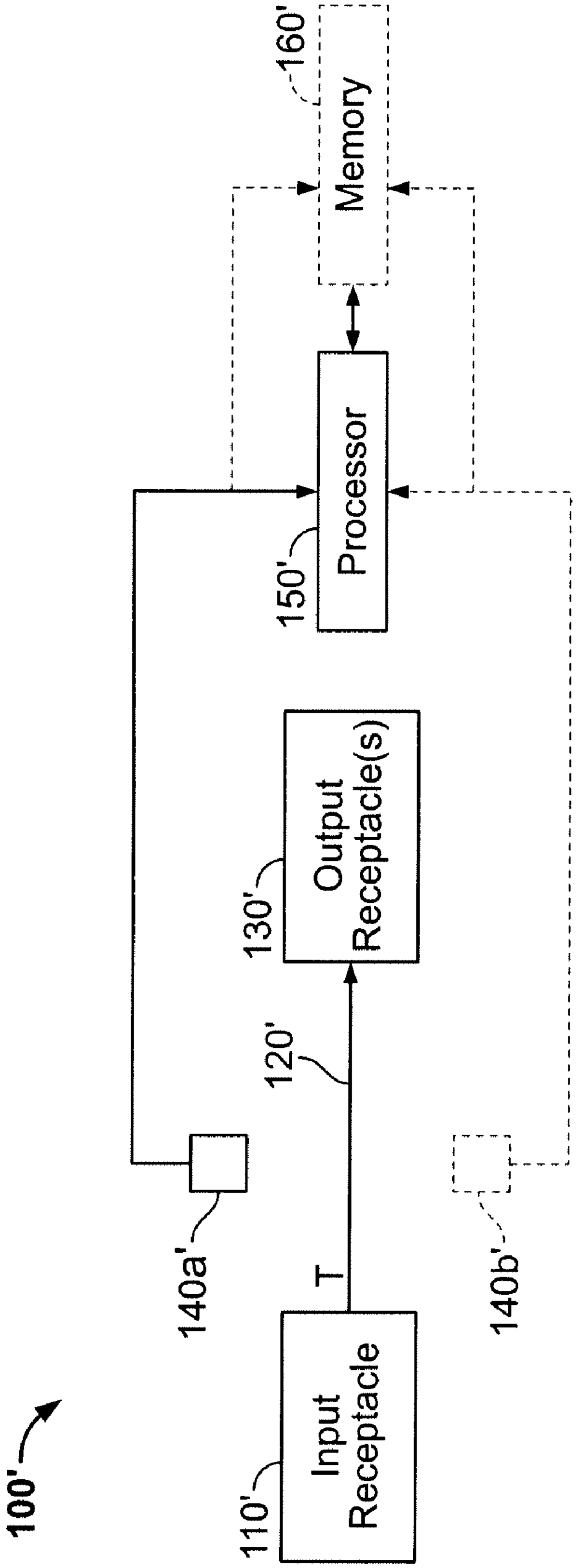
FIG. 1D is a block diagram of a document processing system according to some embodiments of the present disclosure.

Referring to FIG. 1D, a block diagram of a document processing system 100' is shown according to some embodiments of the present disclosure. According to some embodiments, the document processing system 100' is similar to the document processing system 100, where like reference numbers are used to indicate similar exemplary components. The document processing system 100' includes an input receptacle 110', a transport mechanism 120', one or more output receptacles 130', and a sensor arrangement 140*a*'. According to some embodiments, the document processing system 100' can include a second sensor arrangement 140*b*'.

According to some embodiments, an operator of the document processing system 100' puts a stack of documents into the input receptacle 110'. According to some embodiments, the stack of documents includes bills, checks, or both. The transport mechanism 120' transports the stack of documents, one at a time, which are in a serial fashion fed along a transport path T. As the documents are transported, they pass by the first sensor arrangement 140*a*' and/or by the second sensor arrangement 140*b*'. According to some embodiments, the document sensor arrangements 140*a*' and 140*b*' both detect, scan, and/or image a respective surface of each of the passing documents. According to some embodiments, the first sensor arrangement 140*a*' detects, scans, and/or images a first surface of each of the documents and the second sensor arrangement 140*b*' detects, scans, and/or images a second surface of each of the documents.

According to some embodiments, the document processing system 100' includes a processor 150' configured to receive one or more electrical signals and/or information from the sensor arrangements 140*a*' and/or 140*b*'. According to some embodiments, the one or more electrical signals are associated with characteristic information of the documents being processed. According to some embodiments, the characteristic information can be processed via the processor 150' to derive data associated with the documents being processed. According to some embodiments, the derived data is image data that is reproducible by the processor 150' as visually readable images of the first and the second surfaces of each of the documents transported past the sensor arrangements 140*a*' and/or 140*b*'.

According to some embodiments, the derived image data is stored in a memory 160'. According to some embodiments, the processor 150' transmits the derived image data to the memory 160' for storage. According to some embodiments, the visually readable images are stored in the memory 160' as image data that is retrievable by the processor 150' on demand of an operator or at any other time.

Referring generally to the document processing systems of FIGS. 1A-1D, according to some embodiments, the document processing systems 100 and 100' are configured to derive information from generated data and/or visually readable images (e.g., image data reproducible as visually readable images) associated with processed documents and to use that derived information to determine one or more of the following characteristics of the documents individually and/or in combination: the denominations of bills, authenticity of documents such as bills and/or checks, face orientation of documents such as bills and/or checks, fitness of bills, edges of documents such as bills and/or checks, edges of a print of a bill or other document, size, width, or length of documents such as bills or checks, thickness and/or density of documents such as bills, a stacked document condition such as a stacked bill condition, a doubles condition, bill series, bill serial number, check routing number, checking account number, authenticity of a signature on a check or other document, a check number, a bar-code, or any combination thereof. The above described list of characteristics of documents that the document processing systems 100 and 100' can determine will be commonly referred to as "Document Characteristics."

Document Processing Speeds

For the following exemplary document processing speeds disclosure, the document processing device 101 and the document processing system 100,100', which are all discussed in detail above with respect to the exemplary embodiments of FIGS. 1A-D, are collectively referred to herein as the document processing devices and systems of the present disclosure. Thus, specific reference to any of the elements or components of the document processing device 101, such as, for example, the input receptacle 110, the transport mechanism 120, the output receptacle 130, the sensor arrangements 140*a* and 140*b*, the authentication unit 145, the controller 150, the memory 160, the control panel 170, and/or the communications port 180, are by way of example and is not intended to limit the following disclosure to the document processing device 101. Additionally, references made herein to document processing, such as, for example, deskewing, cropping, OCRing (e.g., character extraction from bill and/or check), denominating, authenticating, and transmitting a visually readable image of a document is understood to mean that data including image data from which a visually readable image may be produced is deskewed, cropped, OCRed, denominated, authenticated, transmitted, etc.

Referring generally to FIGS. 1A-D, according to some embodiments, the sensor arrangements 140*a* and 140*b* have a pixel capture scan rate up to about twenty Megapixels per second. According to some such embodiments, for documents having dimensions smaller than about 10 inches×about 5 inches, the sensor arrangements 140*a* and 140*b* can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the sensor arrangements 140*a* and 140*b* can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the sensor arrangements 140*a* and 140*b* can capture at least about 600 documents per minute at a resolution of about 200 DPI×200 DPI and at a pixel capture rate of about twenty Megapixels per second. The sensor arrangements 140*a* and 140*b* include a proportionate number of output data channels to transmit electrical signals generated by the sensor arrangements 140*a* and 140*b* to the controller 150 and/or the memory 160 for processing (e.g., deriving image data, denomination, OCR, authentication, etc.). According to some such embodiments, the sensor arrangements 140*a* and 140*b* include about 4 output data channels, although other numbers of output data channels are contemplated. According to some embodiments, each of the output data channels can output or be read at about five Megapixels per second in parallel, that is, at the same time.

According to some embodiments, the sensor arrangements 140*a* and 140*b* have a pixel capture scan rate up to about forty Megapixels per second. According to some such embodiments, for documents having dimensions smaller than about 10 inches×about 5 inches, the sensor arrangements 140*a* and 140*b* can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the sensor arrangements 140*a* and 140*b* can capture at least about 1200 documents per minute at a resolution of about 200 DPI×100 DPI and at a pixel capture rate of about twenty Megapixels per second. According to some such embodiments, for documents having dimensions smaller than about 9.1 inches×five inches, the sensor arrangements 140*a* and 140*b* can capture at least about 1200 documents per minute at a resolution of about 200 DPI×200 DPI and at a pixel capture rate of about forty Megapixels per second. According to some such embodiments, for documents having dimensions smaller than about 9.1 inches×five inches, the sensor arrangements 140*a* and 140*b* can capture at least about 2400 documents per minute at a resolution of about 200 DPI×100 DPI and at a pixel capture rate of about forty Megapixels per second. The sensor arrangements 140*a* and 140*b* include a proportionate number of output data channels to transmit electrical signals generated by the sensor arrangements 140*a* and 140*b* to the controller 150 and/or the memory 160 for processing (e.g., deriving image data, denomination, OCR, authentication, etc.). According to some such embodiments, the sensor arrangements 140*a* and 140*b* include about 8 output data channels, although other numbers of output data channels are contemplated, such as, for example, 12, 16, 20, 30, etc. According to some embodiments, each of the output data channels can output or be read at about five Megapixels per second in parallel, that is, at the same time.

According to some embodiments, for a check transportation speed and/or processing speed of about 150 checks per minute (about 12.5 inches per second), the controller 150 and/or memory 160 have about 157.5 milliseconds to derive data including image data that is reproducible as visually readable images from electrical signals received from the sensor arrangements 140*a* and 140*b*, crop each visually readable image (e.g., crop the data from which a visually readable image may be produced), deskew each cropped visually readable image, and/or OCR one or more portions of the cropped and deskewed visually readable image; the controller 150 and/or the memory 160 being configured to perform all these operations in less than about 157.5 milliseconds. According to some embodiments, the document processing devices and systems of the present disclosure are configured to process commercial checks at a rate of at least about 150 checks per minute. According to some embodiments, for a check transportation speed and/or processing speed of about 250 checks per minute (about 21 inches per second), the controller 150 and/or memory 160 have about 87.5 milliseconds to derive data including image data that is reproducible as visually readable images from electrical signals received from the sensor arrangements 140*a* and 140*b*, crop each visually readable image, deskew each cropped visually readable image, and/or OCR one or more portions of the cropped and deskewed visually readable image; the controller 150 and/or the memory 160 being configured to perform all these operations in less than about 87.5 milliseconds. According to some embodiments, the document processing devices and systems of the present disclosure are configured to process personal checks at a rate of at least about 250 checks per minute. According to some embodiments, the larger physical dimensions of commercial checks require additional processing time as compared to personal checks to perform the above described processing operations.

According to some embodiments, for a document transportation speed and/or processing speed of about 300 documents per minute (about 25 inches per second), the controller 150 and/or memory 160 have about 70 milliseconds to derive data including image data that is reproducible as visually readable images from electrical signals received from the sensor arrangements 140*a* and 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 70 milliseconds. According to some embodiments, for a document transportation speed and/or processing speed of about 600 documents per minute (about 50 inches per second), the controller 150 and/or memory 160 have about 35 milliseconds to derive data including image data that is reproducible as visually readable images from electrical signals received from the image sensor arrangements 140*a* and 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 35 milliseconds. According to some embodiments, for a document transportation speed and/or processing speed of about 1200 documents per minute (about 100 inches per second), the controller 150 and/or memory 160 have about 17.5 milliseconds to derive data including image data that is reproducible as visually readable images from electrical signals received from the sensor arrangements 140*a* and 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 17.5 milliseconds. According to some embodiments, for a document transportation speed and/or processing speed of about 2000 documents per minute (about 167 inches per second), the controller 150 and/or memory 160 have about 10.5 milliseconds to derive data including image data that is reproducible as visually readable images from electrical signals received from the sensor arrangements 140*a* and 140*b*, crop each visually readable image, deskew each cropped visually readable image, denominate each visually readable image for currency bills, OCR one or more portions of the cropped and deskewed visually readable image for currency bills and checks, and/or authenticate the visually readable image for currency bills and checks and are configured to perform all these operations in less than about 10.5 milliseconds.

According to some embodiments, the document processing devices and systems of the present disclosure are each configured to perform the following processing operations: transport a plurality of currency bills one at a time, past one or more detectors, such as sensor arrangements 140*a* and 140*b*, scan and/or image each currency bill at a pixel capture rate of about twenty Megapixels per second to produce data including image data reproducible as a visually readable image having a resolution of about 200 DPI×80 DPI, and denominate each of the currency bills based on the data and/or the visually readable images at a rate of at least about 1500 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing devices and systems of the present disclosure can perform the above stated processing operations at a rate of at least about 1200 currency bills per minute. According to some embodiments, the document processing devices and systems of the present disclosure can perform the above stated processing operations at a resolution of 200 DPI×100 DPI at a rate of at least about 1600 currency bills per minute by employing one or more detectors, such as sensor arrangements 140*a* and 140*b*, capable of scanning each currency bill at a pixel capture rate of about forty Megapixels per second. According to some embodiments, the document processing device 101 can perform the above stated processing operations at any of the above stated rates for a plurality of currency bills, where the plurality of currency bills are U.S. currency bills transported with a wide edge leading. According to some such embodiments, the document processing device 101 can perform the above stated processing operations at any of the above stated rates where the document processing device 101 has a footprint of less than about two square feet and/or a weight of less than about 30 pounds.

According to some embodiments, the document processing devices and systems of the present disclosure are each configured to perform the following processing operations: transport a plurality of currency bills one at a time, past one or more detectors, such as sensor arrangements 140*a* and 140*b*, scan and/or image each currency bill at a pixel capture rate of about twenty Megapixels per second to generate one or more electrical signals associated with the plurality of currency bills, transmit the electrical signals to one or more controllers and/or processors to derive data including image data reproducible as a visually readable image having a resolution of about 200 DPI×100 DPI therefrom, denominate each of the currency bills based on the derived data and/or visually readable images, crop and deskew a serial number snippet image for each currency bill, extract a serial number from each serial number snippet image, tag the extracted serial number to a record including the respective serial number snippet image, and transmit the record to an external storage device, such as, for example, a memory in the computer 151, at a rate of at least about 1200 currency bills per minute. According to some embodiments, the records are transmitted from the document processing device, such as document processing device 101 via an Ethernet communications port. According to some embodiments, the document processing devices and systems of the present disclosure are configured to compress the records prior to transmitting the records. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing devices and systems of the present disclosure can perform the above stated processing operations at a rate of at least about 1200 currency bills per minute. According to some embodiments, the document processing devices and systems of the present disclosure can perform the above stated processing operations at a rate of at least about 2400 currency bills per minute by employing one or more detectors, such as sensor arrangements 140*a* and 140*b*, capable of scanning each currency bill at a pixel capture rate of about forty Megapixels per second. According to some embodiments, the document processing device 101 can perform the above stated processing operations at any of the above stated rates for the plurality of currency bills, where the plurality of currency bills are U.S. currency bills transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the document processing device 101.

According to some embodiments, the document processing device 101 is configured to perform the following processing operations: transport a plurality of currency bills one at a time, with a wide edge leading, past one or more detectors, such as sensor arrangements 140*a* and 140*b*, scan and/or image each currency bill at a pixel capture rate of about twenty Megapixels per second to produce data including image data reproducible as a visually readable image having a resolution of about 200 DPI×100 DPI, denominate each of the currency bills based on the produced data and/or visually readable images, crop and deskew a serial number snippet image for each currency bill, extract a serial number from each serial number snippet image to produce respective extracted serial number data, and transmit each of the respective serial number snippet images and respective extracted serial number data to an external storage device (e.g., a memory in the computer 151) to generate a record for each of the currency bills at a rate of at least about 800 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 600 currency bills per minute. According to some embodiments, the document processing device 101 can perform the above stated processing operations at a rate of at least about 1000 currency bills per minute. According to some embodiments, the document processing device 101 can perform the above stated processing operations at a rate of at least about 1200 currency bills per minute. According to some embodiments, the document processing device 101 can perform the above stated processing operations at a rate of at least about 2400 currency bills per minute by employing one or more detectors, such as sensor arrangements 140*a* and 140*b*, capable of scanning and/or imaging each currency bill at a pixel capture rate of about forty Megapixels per second. According to some embodiments, the document processing device 101 can each perform the above stated processing operations at any of the above stated rates for a plurality of currency bills, where the plurality of currency bills are U.S. currency bills. According to some such embodiments, the document processing device 101 can each perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the document processing device 101.

According to some embodiments, the document processing devices and systems of the present disclosure are each configured to perform the following processing operations: transport a plurality of currency bills one at a time, past one or more detectors, such as the sensor arrangements 140*a* and 140*b*, scan each currency bill at a pixel capture rate of about twenty Megapixels per second to produce data including image data reproducible as a visually readable image of both sides of each currency bill having a resolution of about 200 DPI×100 DPI, denominate each of the currency bills based on the produced data and/or the visually readable images, crop and deskew the visually readable images of both sides of each currency bill, extract one or more serial numbers from the visually readable images for each of the currency bills to produce respective extracted serial number data, and transmit each of the respective visually readable images of both sides of each currency bill and respective extracted serial number data to an external storage device (e.g., a memory in the computer 151) to generate a record for each of the currency bills at a rate of at least about 1200 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1000 currency bills per minute. According to some embodiments, the document processing device 101 can perform the above stated processing operations at any of the above stated rates for the plurality of currency bills, where the plurality of currency bills are U.S. currency bills transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the document processing device 101.

According to some embodiments, the document processing devices and systems of the present disclosure are each configured to perform the following processing operations: transport a plurality of currency bills one at a time, past one or more detectors, such as the sensor arrangements 140*a* and 140*b*, scan each currency bill at a pixel capture rate of about twenty Megapixels per second to produce data including image data reproducible as a visually readable image of both sides of each currency bill having a resolution of about 200 DPI×200 DPI, denominate each of the currency bills based on the produced data and/or visually readable images, crop and deskew the visually readable images of both sides of each currency bill, extract one or more serial numbers from the visually readable images for each of the currency bills to produce respective extracted serial number data, and transmit each of the respective visually readable images of both sides of each currency bill and respective extracted serial number data to an external storage device (e.g., a memory in the computer 151) to generate a record for each of the currency bills at a rate of at least about 600 currency bills per minute. According to some embodiments, the document processing devices and systems of the present disclosure can perform the above stated processing operations at a rate of at least about 200 currency bills per minute. According to some embodiments, the document processing devices and systems of the present disclosure can perform the above stated processing operations at a rate of at least about 400 currency bills per minute. According to some embodiments, the document processing devices and systems of the present disclosure can perform the above stated processing operations at a rate of at least about 600 currency bills per minute. According to some embodiments, the document processing devices and systems of the present disclosure can perform the above stated processing operations at a rate of at least about 800 currency bills per minute. According to some embodiments, the document processing devices and systems of the present disclosure can perform the above stated processing operations at a rate of at least about 1200 currency bills per minute by employing one or more detectors, such as sensor arrangements 140*a* and 140*b*, capable of scanning each currency bill at a pixel capture rate of about forty Megapixels per second. According to some embodiments, the document processing device 101 can perform the above stated processing operations at any of the above stated rates for the plurality of currency bills, where the plurality of currency bills are U.S. currency bills transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the device 101.

According to some embodiments, the document processing devices and systems of the present disclosure are each configured to perform the following processing operations: transport a plurality of checks one at a time, past one or more detectors, such as the sensor arrangements 140*a* and 140*b*, scan each check at a pixel capture rate of about twenty Megapixels per second to produce data including image data reproducible as a visually readable image of both sides of each check having a resolution of about 200 DPI×200 DPI, crop and deskew the visually readable images of both sides of each check, extract MICR characters from the visually readable images for each of the checks to produce respective extracted MICR character data, and transmit each of the respective visually readable images of both sides of each check and respective extracted MICR character data to an external storage device (e.g., a memory in the computer 151) to generate a record for each of the checks at a rate of at least about 600 checks per minute. According to some embodiments, the checks are personal or standard size checks, commercial checks, or a combination of both. The MICR characters can include a checking account number, a routing number, a check number, or any combination thereof. According to some embodiments, one or more image sensor arrangements produce the visually readable image of both sides of each of the checks having a resolution of about 200 DPI×100 DPI. According to some embodiments, one or more image sensor arrangements produce the visually readable image of both sides of each of the checks having a resolution of about 200 DPI×300 DPI. According to some embodiments, one or more image sensor arrangements produce the visually readable image of both sides of each of the checks having a resolution of about 300 DPI×300 DPI. According to some embodiments, the document processing devices and systems of the present disclosure can perform the above stated processing operations at a rate of at least about 100 checks per minute. According to some embodiments, the document processing devices and systems of the present disclosure can perform the above stated processing operations at a rate of at least about 200 checks per minute. According to some embodiments, the document processing devices and systems of the present disclosure can perform the above stated processing operations at a rate of at least about 300 checks per minute. According to some embodiments, the document processing devices and systems of the present disclosure can perform the above stated processing operations at a rate of at least about 400 checks per minute. According to some embodiments, the document processing devices and systems of the present disclosure can perform the above stated processing operations at a rate of at least about 800 checks per minute at a resolution of about 200 DPI×200 DPI. According to some embodiments, the document processing devices and systems of the present disclosure can perform the above stated processing operations at a rate of at least about 1000 checks per minute at a resolution of about 200 DPI×200 DPI. According to some embodiments, the document processing devices and systems of the present disclosure can perform the above stated processing operations at a rate of at least about 1200 checks per minute at a resolution of about 200 DPI×200 DPI by employing one or more detectors, such as sensor arrangements 140_a_ and 140_b_, capable of scanning each check at a pixel capture rate of about forty Megapixels per second. According to some embodiments, the document processing device 101 can perform the above stated processing operations at any of the above stated rates for the plurality of checks, where the plurality of checks are transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the device 101.

According to some embodiments, the document processing devices and systems of the present disclosure are each configured to perform the following processing operations: transport a plurality of documents at least including currency bills and checks one at a time, past one or more detectors, such as the sensor arrangements 140_a_ and 140_b_, scan and/or image each document at a pixel capture rate of about twenty Megapixels per second to generate one or more electrical signals associated with the plurality of documents, transmit the electrical signals to one or more controllers and/or processors to derive data including image data reproducible as a visually readable image of both sides of each document having a resolution of about 200 DPI×200 DPI therefrom, crop and deskew the image data and/or the visually readable images of both sides of each document, for currency bills denominate each of the currency bills based on the derived data and/or the visually readable images and extract one or more serial numbers from the visually readable images for each of the currency bills to produce respective extracted serial number data and transmit each of the respective visually readable images of both sides of each currency bill and respective extracted serial number data to an external storage device (e.g., a memory in the computer 151) to generate a currency bill record for each of the currency bills, for checks extract MICR characters from the visually readable images for each of the checks to produce respective extracted MICR character data and transmit each of the respective visually readable images of both sides of each check and respective extracted MICR character data to the external storage device to generate a check record for each of the checks, all at a rate of at least about 600 documents per minute. According to some embodiments, the document processing devices and systems of the present disclosure can perform the above stated processing operations at a rate of at least about 200 documents per minute. According to some embodiments, the document processing devices and systems of the present disclosure can perform the above stated processing operations at a rate of at least about 400 documents per minute. According to some embodiments, the document processing devices and systems of the present disclosure can perform the above stated processing operations at a rate of at least about 600 documents per minute. According to some embodiments, the document processing devices and systems of the present disclosure can perform the above stated processing operations at a rate of at least about 800 documents per minute. According to some embodiments, the document processing devices and systems of the present disclosure can perform the above stated processing operations at a rate of at least about 1000 documents per minute. According to some embodiments, the document processing devices and systems of the present disclosure can perform the above stated processing operations at a rate of at least about 1200 documents per minute by employing one or more detectors, such as sensor arrangements 140_a_ and 140_b_, capable of scanning each document at a pixel capture rate of about forty Megapixels per second. According to some embodiments, the document processing device 101 can perform the above stated processing operations at any of the above stated rates for a plurality of documents, where the documents include intermixed U.S. currency bills and the documents are transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the device 101. According to some embodiments, the document processing device 101 can perform the above stated processing operations at any of the above stated rates for a plurality of documents, where the documents include intermixed or intermingled currency bills and checks. That is, the bills and the checks are processed in a single batch of documents simultaneously. According to some embodiments, the document processing device 101 can perform the above stated processing operations at any of the above stated rates for a plurality of documents, where the documents include a first batch of currency bills and a second batch of checks. That is, the document processing device 101 is configured to process the bills and the checks as distinct and separate batches at distinct and separate times.

According to some embodiments, the document processing device 101 is configured to perform the following processing operations: (1) transport documents, one at a time, past two sensor arrangements, (2) scan and/or image the documents with the two sensor arrangements at a pixel capture rate of at least about forty Megapixels per second to produce a record for each document including data reproducible as a visually readable image of both sides of each document having a resolution of at least 200 dpi×200 dpi, (3) deskew and crop the visually readable images, for records associated with currency bills (4)(i) denominate currency bills based on one or both of the visually readable images in an associated record, (ii) extract identifying information from one or both of the visually readable images, and (iii) tag the extracted identifying information to one or more data fields included in the record, for records associated with checks (5)(i) extract identifying information from one or both of the visually readable images and (ii) tag the extracted identifying information to one or more data fields included in the record, and (6) buffer the records in an internal memory of the document processing device 101 at a rate of at least about 1200 documents per minute. In these embodiments, the document processing device 101 can further transmit the buffered records via a communications port, such as the communications port 180, to an external memory, such as a memory in the computer 151, at a rate of at least about 1100 documents per minute. According to some embodiments, the document processing device 101 can perform the above stated processing operations at a rate of at least about 250 documents per minute. According to some embodiments, the document processing device 101 can perform the above stated processing operations at a rate of at least about 500 documents per minute. According to some embodiments, the document processing device 101 can perform the above stated processing operations at a rate of at least about 750 documents per minute. According to some embodiments, the document processing device 101 can perform the above stated processing operations at a rate of at least about 1170 documents per minute. According to some embodiments, the document processing device 101 can perform the above stated processing operations at any of the above stated rates for the plurality of documents, where the currency bills are U.S. currency bills and the documents are transported with a wide edge leading. According to some such embodiments, the document processing device 101 can perform the above stated processing operations at any of the above stated rates where the document processing device 101 has a footprint of less than about two square feet and/or a weight of less than about 30 pounds and/or satisfies the other dimensional and weight limitations mentioned in the present disclosure in connection with the device 101.

According to some embodiments, the document processing devices and systems of the present disclosure are each configured to perform the following processing operations: transport a plurality of documents including currency bills, personal checks, commercial checks, and full sheets of letter and/or A4 sized documents, one at a time, past one or more detectors, such as sensor arrangements 140*a* and/or 140*b*, scan and/or image each document at a pixel capture rate of at least about twenty Megapixels per second to generate one or more electrical signals associated with the plurality of documents, transmit the electrical signals to one or more controllers and/or processors to derive data including image data reproducible as a visually readable image having a resolution of about 200 DPI×100 DPI at a rate of at least about 300 documents per minute. According to some embodiments, the document processing device 101 can perform the above stated processing operations at any of the above stated rates where the document processing device 101 has a footprint of less than about two square feet and/or a weight of less than about 30 pounds.

According to some embodiments, the document processing devices and systems of the present disclosure are each configured to perform the following processing operations: transport a plurality of full sheets of letter and/or A4 sized documents, one at a time, past one or more detectors, such as sensor arrangements 140*a* and/or 140*b*, scan and/or image each document at a pixel capture rate of at least about twenty Megapixels per second to produce data including image data reproducible as a visually readable image having a resolution of about 200 DPI×100 DPI at a rate of at least about 300 documents per minute. According to some embodiments, the document processing device 101 can perform the above stated processing operations at any of the above stated rates where the document processing device 101 has a footprint of less than about two square feet and/or a weight of less than about 30 pounds.

According to some embodiments, the document processing devices and systems of the present disclosure are each configured to receive a plurality of currency bills, transport the currency bills one at a time, past one or more sensor arrangements, scan and/or image each currency bill at a pixel capture rate of at least about twenty Megapixels per second to produce data including image data reproducible as a visually readable image having a resolution of about 200 DPI×100 DPI, and denominate each of the currency bills. According to some embodiments, denominating the currency bills includes determining a series of each of the currency bills. In these embodiments, the series information can be used to determine a coordinate location of one or more serial numbers in the visually readable image for the currency bill. According to some embodiments, each currency bill includes two identical serial numbers in two distinct locations (e.g., upper left corner and lower right corner or upper right corner and lower left corner). According to some embodiments, determining the series of a currency bill reduces the processing time needed for the document processing devices and systems of the present disclosure to locate, crop, deskew, and extract the serial number from the visually readable image. Reducing the processing time to extract the serial number can allow for overall faster document processing. For example, the processing time according to some embodiments can be seventeen milliseconds for each currency bill. Thus, in these embodiments, the document processing devices and systems of the present disclosure could process at least about 1200 currency bills every minute. According to some such embodiments, the document processing devices and systems of the present disclosure each has about 17 milliseconds to determine if the currency bill being processed should be flagged by halting or stopping the transportation of the currency bills such that the flagged currency bill is the last currency bill presented in an output receptacle, such as the output receptacle 130 of the document processing device 101.

According to some embodiments, international currency bills, such as, for example, the Euro, have varying sizes (e.g., length×width dimensions) based on denomination. Thus, a coordinate location of one or more serial numbers on a visually readable image of a Euro currency bill will vary for each of the different Euro denominations. Thus, in these embodiments, denominating the Euro currency bills provides a coordinate location of one or more serial numbers for a particular Euro denomination, which, as described above, can reduce the processing time for extracting the serial number.

According to some embodiments, the rate that the document processing devices and systems of the present disclosure can perform any of the above stated processing operations within the Document Processing Speeds Section is a function of a processor clock speed and/or a system clock speed. According to some embodiments, the processor clock speed is the clock speed of a controller or digital signal processor (DSP), such as the controller 150 of the document processing device 101. According to some embodiments, the processor clock speed is a function or weighted average of a variety of component clock speeds used to process currency bills and/or checks. For example, the processor clock speed can be a weighted average of a clock speed of the processor, cache memory, SDRAM memory, and image scanner. According to some embodiments, the document processing devices and systems of the present disclosure each has a ratio of the processing operation rate to the processor clock speed of two (e.g., processing operation rate/processor clock speed=2). According to some embodiments, the document processing device 101 has a ratio of processing operation rate to processor clock speed of two. For example, in some embodiments, the processing operation rate is about 1200 documents/min and the processor clock speed is about 600 megahertz, which is a ratio of two documents/minute per each megahertz of clock speed. For another example, the processing operation rate is about 2400 documents/min and the processor clock speed is about 1200 megahertz, which is a ratio of two documents/minute per each megahertz of clock speed. According to some embodiments, a ten percent increase in processor clock speed provides about a ten percent increase in document processing speed. For example, for a document processing device or system operating at about twenty microseconds to OCR a serial number from a visually readable image, a ten percent (10%) increase in that document processing device or system's clock speed can reduce the time to process and OCR the serial number from about twenty microseconds to about eighteen microseconds. According to some embodiments, the document processing device 101 includes the ratio of two while maintaining a footprint of less than about two square feet and/or a weight of less than about 30 pounds and/or satisfies the other dimensional and weight limitations mentioned in the present disclosure in connection with the device 101.

According to some embodiments, the document processing devices and systems of the present disclosure can each transport a plurality of general circulation U.S. currency bills at a rate of at least about 1200 currency bills per minute and denominate the plurality of U.S. currency bills with a no-call denomination percentage of less than about 0.01 percent. That is, the document processing devices and systems of the present disclosure can each accurately call the denomination of U.S. currency bills at least about 9,999 times out of 10,000 general circulation U.S. currency bills. Thus, according to some embodiments, the document processing devices and systems of the present disclosure flag a U.S. currency bill as a no-call denomination currency bill less than about once out of about every 10,000 U.S. currency bills that are processed.

Sensor Arrangements

This section, entitled "Sensor Arrangements," includes descriptions of exemplary sensor arrangements suitable for use in the document processing systems 100 and 100', such as the first and/or the second sensor arrangements 140*a* and/or 140*b*. Thus, it is understood that any of the sensor arrangements described herein can replace and/or substitute the sensor arrangements 140*a,b* and 140*a',b'* described above.

Figure 2A:
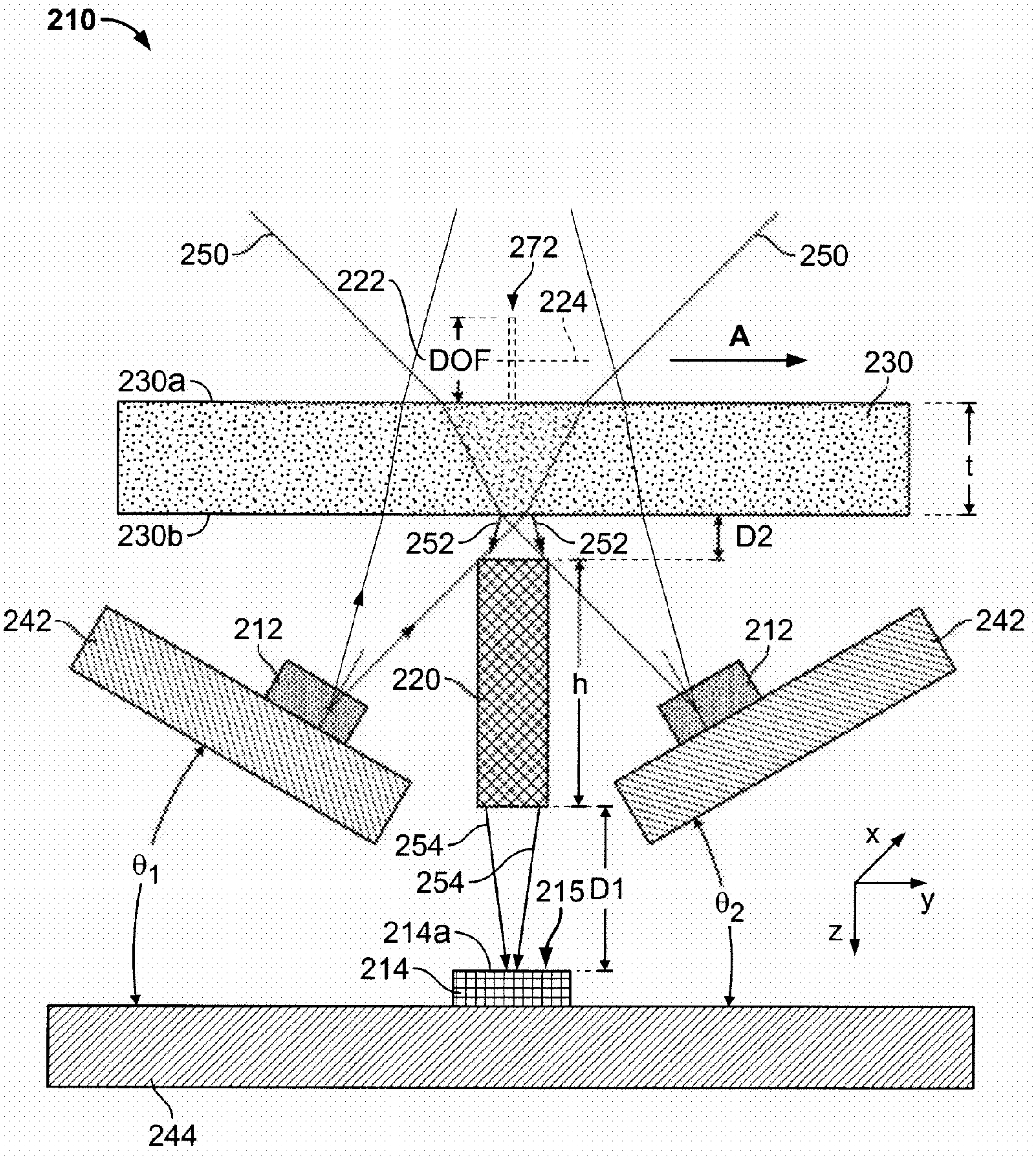
FIG. 2A is a side view of a sensor arrangement according to some embodiments of the present disclosure.
Figure 2C:
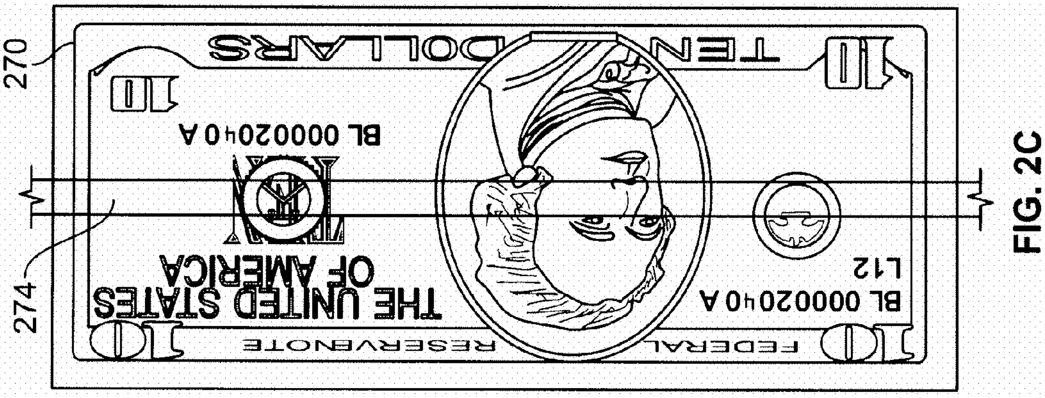
FIG. 2C is a top view of a bill being imaged by the sensor arrangement of FIG. 2A.
Figure 2B:
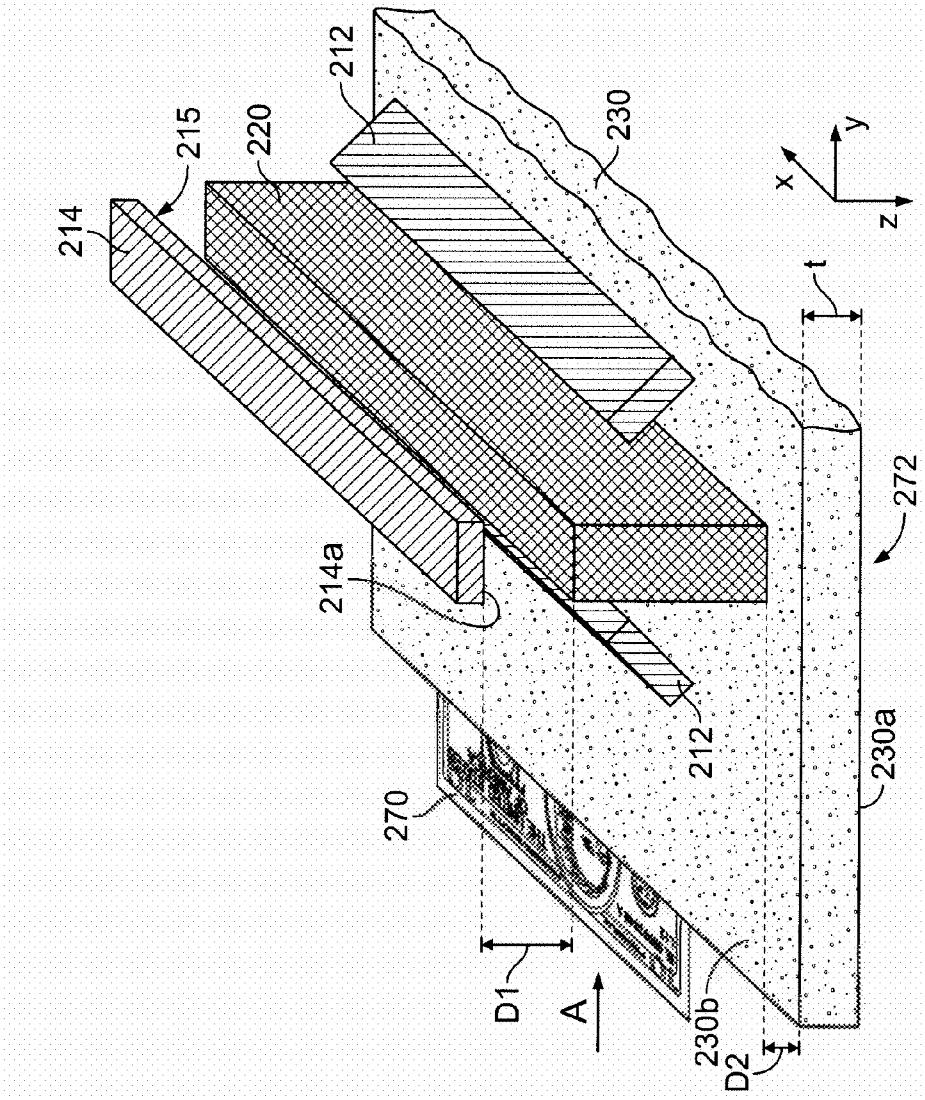
FIG. 2B is a perspective view of the sensor arrangement of FIG. 2A.

Referring to FIGS. 2A-C, a sensor arrangement 210 is illustrated. According to some embodiments, the sensor arrangement 210 can be positioned within the upper transport plate assembly 120*a* and along the first side of the transport path T of the document processing device 101. Similarly, according to some embodiments, the sensor arrangement 210 can be positioned within the lower transport plate assembly 120*b* and along the second opposing side of the transport path T of the document processing device 101. According to some embodiments, the sensor arrangement 210 includes two light sources 212, a photodetector array 214, and a gradient index lens array 220.

According to some embodiments, the light sources 212 are light emitting diodes (LEDs), lasers, laser diodes (LD), halogen lamps, fluorescent lamps, or any combination thereof. According to some embodiments, the light sources 212 comprise arrays of light sources extending generally in the x-direction. Likewise, according to some embodiments, the photodetector array 214 comprises an array of photodetectors extending generally in the x-direction. Likewise, according to some embodiments, the gradient index lens array 220 comprises an array of gradient index lenses extending generally in the x-direction.

According to some embodiments, the light sources 212 emit multiple wavelengths. For example, the light sources 212 comprise one or more arrays of a plurality of light sources with each of the light sources being configured to emit a single type of light (e.g., green light), but each array collectively being configured to emit a plurality of types or wavelengths of lights (e.g., green, red, and blue light). For another example, each of the light sources 212 comprise an array of a plurality of light sources with each array configured to output red light, blue light, green light, white light, infrared light, ultra violet light, or any combination thereof.

According to some embodiments, the sensor arrangement 210 includes a cover 230 having a first surface 230*a* and a second surface 230*b*. According to some embodiments, the cover 230 is formed from a material having a substantially uniform density. According to some embodiments, the cover 230 is transparent and allows illumination light rays 250 to transmit through the cover 230. According to some embodiments, the cover 230 is formed from glass or plastic. In certain embodiments, the cover 230 has a thickness t, which can range from about 0.04 inches to about 0.1 inches. In some embodiments, the cover is about 0.075 inches thick. Various other thicknesses, t, of the cover are contemplated.

According to some embodiments, a portion of the illumination light rays 250 that transmit through the cover 230 are incident, as a strip of light 274 (FIG. 2C), upon the passing document 270. According to some embodiments, the size of the strip of light 274 varies with the transported documents' z-positioning. For example, if document 270 is transported in the direction of arrow A, as the document 270 moves away from the first surface 230*a* of the cover 230 in the z-direction, the strip of light 274 initially decreases in the y-direction and then increases. Such a result is caused by the positioning of the light sources 212, which cross the illumination light rays 250, as shown in FIG. 2A. According to some embodiments, the strip of light 274 has a width of about 5 millimeters to about 10 millimeters. A portion of the light incident upon the passing document is reflected and transmitted back through the cover 230. The gradient index lens array 220 is positioned to receive at least a portion of the reflected light 252.

According to some embodiments, the gradient index lens array 220 transmits light 254 onto the photodetector array 214. According to some embodiments, the gradient index lens array 220 focuses the received reflected light 252 and emits focused light 254 as an image, a portion of an image, or a line-scan, onto the photodetector array 214. According to some embodiments, the gradient index lens array 220 can include a GRIN (GRadient INdex) lens or a SELFOC® lens, such as those supplied by Nippon Sheet Glass Co. of Japan, also known as NSG Europe. According to some embodiments, the gradient index lens array 220 is a one-to-one image transfer lens that transfers light reflected from a subject (e.g., document) located at a subject plane through an array of gradient index lenses (e.g., the gradient index lens array 220), which transmit and/or focus the light onto an imaging plane 215. According to some embodiments, the imaging plane 215 is located along the z-direction at about +/−30 mils from a first surface 214*a* (also known as an active surface) of the photodetector array 214. According to some embodiments, the imaging plane 215 is aligned along the z-direction to coincide with the first surface 214*a* of the photodetector array 214. According to some embodiments, documents (e.g., document 270) being transported along the transport path T can fluctuate or flutter in the z-direction during detecting, scanning, and/or imaging.

According to some embodiments, in response to receiving the focused light 254, the photodetector array 214 produces one or more electrical signals associated with the received focused light 254 and/or characteristic information of documents (e.g., document 270). According to some embodiments, the one or more electrical signals are processed via one or more controllers and/or processors (e.g., the controller 150) to derive data therefrom. According to some embodiments, the derived data is associated with the characteristic information of the documents. The derived data includes image data that is reproducible as a visually readable image having a sufficient resolution (e.g., 50 DPI×50 DPI, 200 DPI×100 DPI, or 200 DPI×200 DPI) for document processing, as long as the subject (e.g., document) remains located within the depth of field 222 of the gradient index lens array 220. Examples of such document processing include, but are not limited to, (1) optical character recognition ("OCR") of characters in the image data of documents such as checks and/or currency bills (2) denomination of documents such as currency bills, (3) authentication of documents such as currency bills, and (4) fitness determination of documents such as currency bills.

According to some embodiments, the photodetector array 214 generates a line-scan signal that corresponds to analog image intensity variations in the x-direction. As documents are transported along the transport path T in the y-direction, the sensor arrangement 210 scans and/or images the documents in the y-direction. The x-direction image line-scans can be accumulated by a controller or processor, which can reproduce the image line-scans as a two-dimensional visually readable image. According to some embodiments, the document processing device 101 derives information (e.g., look-up patterns shown in FIG. 5) from the data including image data that is reproducible as a visually readable image that can be used in document processing, such as to determine one or more of the Document Characteristics defined above.

According to some embodiments, the depth of field 222 is measured in the z-direction and has a center-line or center-plane, also referred to as a focal plane 224. According to some embodiments, subjects located at the focal plane 224 are in focus. According to some embodiments, subjects located within the depth of field 222 and subjects located within a certain distance from the focal plane 224 (e.g., one half of the depth of field distance, or ½ DOF) are sufficiently focused such that the sensor arrangement 210 can generate one or more electrical signals that can be derived into data including image data that is reproducible as a visually readable image of the subject with a sufficient resolution for document processing, such as, for example, OCR of the image data. For example, a sufficient resolution for image data that is reproducible as a visually readable image of a document may have a resolution of at least about 50 DPI in the direction of motion or the y-direction and at least about 50 DPI in the x-direction.

According to some embodiments, the cover 230 is positioned relative to the gradient index lens array 220 to provide a shifted focal plane 224 that utilizes the entire depth of field 222 during document processing. The focal plane 224 can be referred to as the shifted focal plane 224 to signify that the focal plane 224 is shifted a distance from the first surface **230*a* of the cover 230**.

According to some embodiments, the gradient index lens array 220 is selected with a depth of field 222 of at least 0.02 inches (20 mils). According to some embodiments, the gradient index lens array 220 has a depth of field of about 0.06 inches (60 mils). According to some embodiments, the gradient index lens array 220 has a depth of field of at least about 0.06 inches (60 mils). According to some embodiments, the gradient index lens array 220 has a depth of field of about 0.09 inches (90 mils). According to some embodiments, the gradient index lens array 220 has a depth of field of at least about 0.09 inches (90 mils). According to some embodiments, the cover 230 is positioned relative to the gradient index lens array 220 to shift the focal plane 224 to be located at about 0.03 inches (30 mils) from the first surface **230*a* of the cover 230. According to some embodiments, the cover 230 is positioned relative to the gradient index lens array 220 to shift the focal plane 224 to be located at least about 0.03 inches (30 mils) from the first surface 230*a* of the cover 230. According to other embodiments, the cover 230 is positioned relative to the gradient index lens array 220 to shift the focal plane 224 to be located at about 0.045 inches (45 mils) from the first surface 230*a* of the cover 230. According to other embodiments, the cover 230 is positioned relative to the gradient index lens array 220 to shift the focal plane 224 to be located at least about 0.045 inches (45 mils) from the first surface 230*a* of the cover 230. According to other embodiments, the cover 230 is positioned relative to the gradient index lens array 220 to shift the focal plane 224 to be located at a distance of about one half of the depth of field (½ DOF) of the gradient index lens array 220 from the first surface 230*a* of the cover 230. Various other depths of fields 222 and locations for the shifted focal plane 224 are contemplated. For example, the focal plane 224 can be shifted between about one-quarter to about three-quarters of the depth of field (¼ DOF-¾ DOF) of the gradient index lens array 220 from the first surface 230*a* of the cover 230**.

The gradient index lens array 220 comprises a plurality of individual gradient index lenses. The individual gradient index lenses are configured such the individual gradient index lenses can be grouped together to form a gradient index lens array that is suitable for use in imaging applications, such as document processing devices. The gradient index lens array 220 has a variety of different optical parameters that define the depth of field 222, the optical focusing ability, and the magnification power of the gradient index lens array 220. For example, the gradient index lens array 220 can be characterized with an F-number, an aperture diameter, a focal length, and/or a total conjugate length. According to some embodiments, the depth of field 222 and the focal plane 224 of the sensor arrangement 210 are a function of the F-number of the gradient index lens array 220.

A gradient index lens array can be selected to have one of a variety of F-numbers having one of a variety of depths of field greater than, for example, 0.02 inches (20 mils). Selecting such a gradient index lens array involves balancing the depth of field of the gradient index lens array with its overall size and height h, and with its focal length and/or total conjugate length, all of which affect the overall size of the document processing device that houses the selected gradient index lens array. Thus, according to some embodiments, selecting a gradient index lens array having a sufficient depth of field with a relatively small focal length and small height can decrease the overall size of the document processing device.

For example, according to some embodiments, selecting a gradient index lens array having a depth of field of about 0.02 inches (20 mils) can allow for the removal of certain mechanical wheels, also known as hold-down wheels, which hold transported documents tight to the cover, for example, the first surface **230*a* of the cover 230, while being transported along the transport path T. The selection of a gradient index lens array having a depth of field 222 of about 0.02 inches (20 mils) can allow for documents to be detected, scanned, and/or imaged to produce image data associated with the documents without using a mechanical wheel to hold the documents tight to the cover 230 during detection, such that the image data is reproducible as a visually readable image with a sufficient resolution to be used for document processing. Selecting and positioning a gradient index lens array having a depth of field of at least about 0.02 inches (20 mils) to about 0.09 inches (90 mils) can provide a sensor arrangement (e.g., sensor arrangements 210, 310, 410*c*, 610, 610', 710, 710', 810, and 810') that facilitates a reduction or elimination of the use of hold-down wheels located adjacent to a scanning region 272** of the sensor arrangement. Such a sensor arrangement is desirable because it facilitates the elimination of parts of the document processing device, and also frees up a second opposing side of the transport path T for the addition of additional detectors, sensor arrangements, and/or light sources. According to some embodiments, an additional sensor arrangement can be positioned across the transport path T for detecting, scanning, and/or imaging a second surface of the documents simultaneously.

According to some embodiments, the gradient index lens array 220 can be selected with a particular F-number to yield a sensor arrangement having a desired depth of field 222. In optics, the F-number of an optical system (e.g., sensor arrangement 210) can also be referred to as a focal ratio, a F-ratio, or a relative aperture. The F-number can be used to express the aperture diameter of each of the individual gradient index lenses in the gradient index lens array 220. As the F-number increases, the depth of field 222 increases. Similarly, as the aperture diameter of each of the individual gradient index lenses decreases, the F-number increases and the depth of field 222 increases.

According to some embodiments, the F-number of the index gradient lens array 220 is between about 2.8 and about 3.2. According to some embodiments, the F-number of the index gradient lens array 220 is about 3. According to some embodiments, the aperture diameter of the index gradient lens array 220 is between about 0.25 millimeters and about 0.35 millimeters. According to some embodiments, the aperture diameter of the index gradient lens array 220 is about 0.3 millimeters. According to some embodiments, as the F-number of the gradient index lens array 220 increases, the aperture diameter can decrease, which reduces the amount of light that can reach the photodetector array 214. Thus, a sensor arrangement having a gradient index lens array with too large of an F-number and/or too small of an aperture diameter will not allow enough focused light 254 to reach the photodetector array 214 to generate electrical signals from which data including image data can be derived that is reproducible as a visually readable image with a sufficient resolution to be used for document processing. Several solutions to the F-number/aperture size problem include use of: (1) a gradient index lens array having a smaller F-number and/or larger aperture diameter; (2) additional light sources for increased illumination; (3) light sources 212 configured to emit a greater intensity of illumination light rays 250; and/or (4) cylindrical lenses (shown in FIGS. 3 and 6) to produce collimated rays of light, such as collimated light rays 351.

According to some embodiments, a total conjugate length of the gradient index lens array 220 is measured as the distance from the focal plane to the imaging plane in air. In these embodiments, the focal length can be calculated as the total conjugate length (TC) minus the height (h) of the gradient index lens array divided by two, or (TC−h)/2. According to some embodiments, the distance D1 between the gradient index lens array 220 and the photodetector array 214 is the focal length, as calculated using the total conjugate length of the gradient index lens array 220. Similarly, the distance D2 between the gradient index lens array 220 and the second surface 230*b* of the cover 230 can be calculated using the total conjugate length of the gradient index lens array 220 and Snell's law. Because the cover 230 is located within the total conjugate length of the gradient index lens array 220, Snell's law can be used to determine how the cover 230 affects (e.g., bending light) the passing light. According to some embodiments, the cover 230 is positioned relative to the gradient index lens array 220 based on the total conjugate length and Snell's Law such that the focal plane 224 of the gradient index lens 220 is shifted from the first surface 230*a* of the cover 230. According to some embodiments, the distance D1 can also be referred to as the back focal length and/or the back focal distance.

In some embodiments, a selected gradient index lens array 220 is contemplated to have an F-number of about 3, a total conjugate length of about 9.9 millimeters, and an aperture diameter of about 0.3 millimeters. The gradient index lens array 220 has a height h of about 4.3 millimeters. Thus, if the gradient index lens array 220 was located in air, the focal plane would be located at about 2.8 millimeters from a top surface of the gradient index lens array 220 and the imaging plane 215 would be located at about 2.8 millimeters from a bottom surface of the gradient index lens array 220. Thus, for the selected gradient index lens array 220, the photodetector array 214 should be placed a distance D1 of about 2.8 millimeters from the bottom surface of the gradient index lens array such that the imaging plane 215 corresponds to the active surface 214*a* of the photodetector array. However, as described above, because the cover 230 is located within the total conjugate length of the gradient index lens array 220, the focal plane is not located at a distance of about 2.8 millimeters from the top surface of the gradient index lens array 220. Rather, because the cover 230 is made of glass or plastic having a thickness t, Snell's law can be used to determine the relative placement of the cover 230, with respect to the top surface of the gradient index lens array 220, such that the focal plane 224 is shifted, for example, 0.03 inches (30 mils) from the first surface 230*a* of the cover 230. For the above non-limiting example, if the cover 230 is made of glass having a thickness t of about 1.9 millimeters, the distance D2 from the top surface of the gradient index lens array 220 to the second surface 230*b* of the cover 230 is about 0.8 millimeters and the depth of field 222 is about 0.06 inches (60 mils).

According to some embodiments, the photodetector array 214 can be mounted on a circuit board 244. The circuit board 244 can be a printed circuit board configured to connect a plurality of devices. Similarly, the two light sources 212 can be mounted on circuit boards 242. It is contemplated that the circuit boards 242 and 244 are separate circuit boards or the same circuit board. According to some embodiments, the circuit boards 242 are positioned at angles θ1 and θ2 relative to the circuit board 244. Angling the circuit boards 242 can position the two light sources 212 to provide an increased intensity of illumination light rays 250 onto the documents being processed. According to some embodiments, angles θ1 and θ2 are between about 15 degrees and about 60 degrees.

According to some embodiments, the sensor arrangement 210 further includes a sensor housing (not shown), which is the same as, or similar to, the sensor housings 142*a* and 142*b* of the first and the second sensor arrangements 140*a,b* described above and shown in FIG. 1C. According to some embodiments, the sensor housing maintains the relative positions and spacing between the light sources 212, the photodetector 214, the gradient index lens array 220, and the cover 230. According to some embodiments, the sensor housing further defines a slit or slot, also referred to herein as an iris. As discussed below in further detail in reference to FIG. 7, the slot/iris is configured to limit scattered and/or extraneous light from entering into the sensor housing and becoming incident upon the photodetector 214. According to some embodiments, the sensor housings 142*a* and 142*b* have a width of about 0.74 inches, a height of about 0.79 inches, and a length of about 9.4 inches. According to some embodiments, the sensor housings 142*a* and 142*b* have a width of about 0.7 inches to about 0.8 inches, a height of about 0.6 inches to about 1 inch, and a length of about 6 inches to about 10 inches.

Figure 3A:
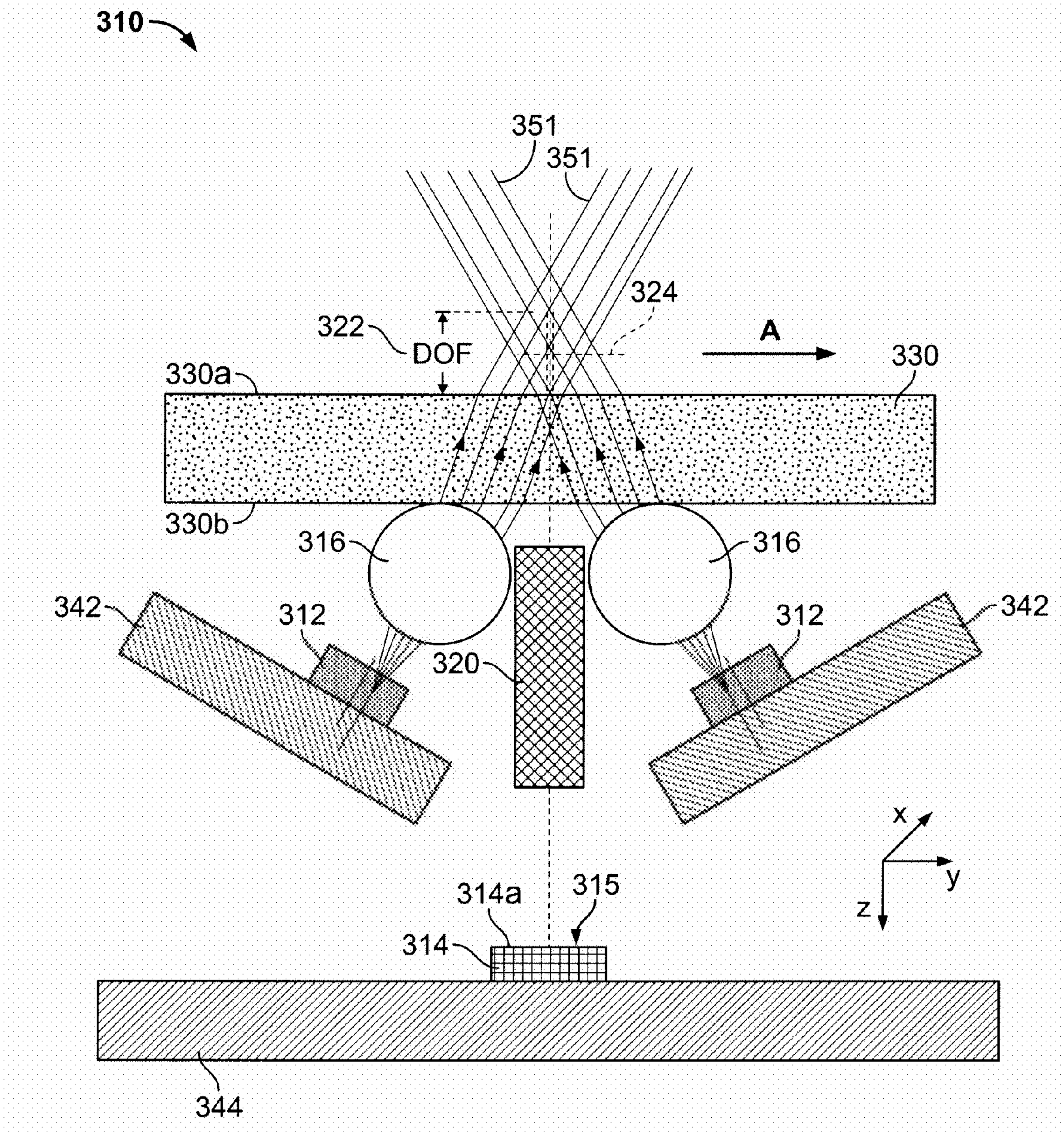
FIG. 3A is a side view of a sensor arrangement including two cylindrical lenses according to some embodiments of the present disclosure.
Figure 3C:
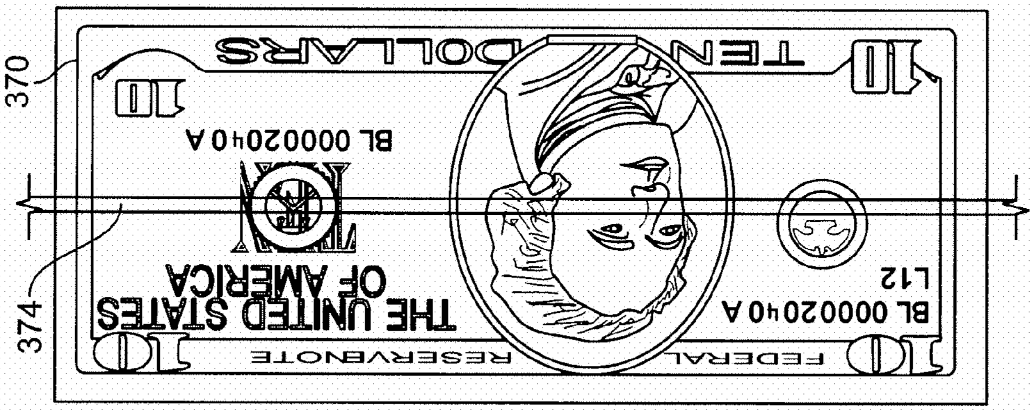
FIG. 3C is a top view of a bill being imaged by the sensor arrangement of FIG. 3A.
Figure 3B:
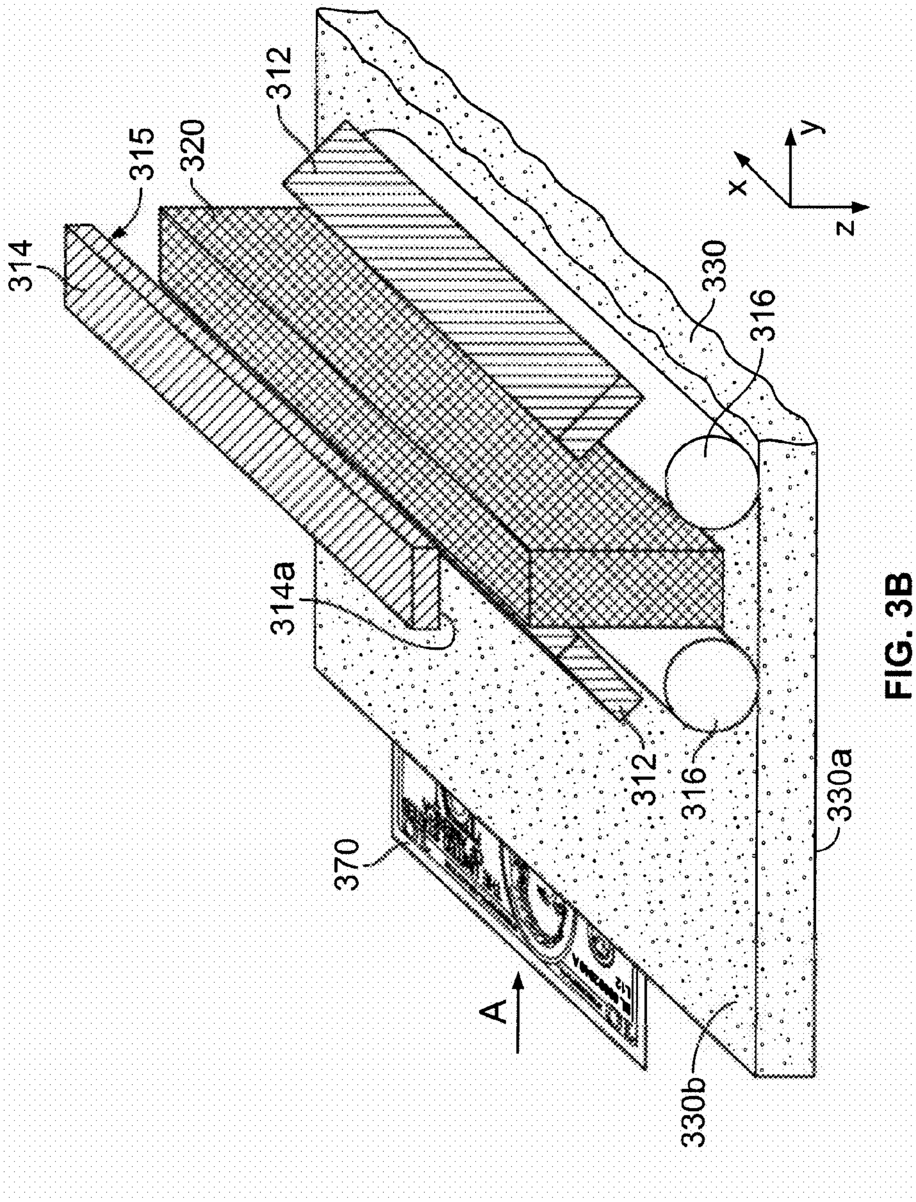
FIG. 3B is a perspective view of the sensor arrangement of FIG. 3A.

Referring to FIGS. 3A-C, a sensor arrangement 310 is illustrated according to some embodiments. According to some embodiments, the sensor arrangement 310 is identical to the sensor arrangement 210 described above and shown in FIGS. 2A-B, except for the addition of lenses 316, as shown in FIGS. 3A-B. According to some embodiments, the sensor arrangement 310 can be positioned within the upper transport plate assembly 120*a* and along the first side of the transport path T of the document processing device 101. Similarly, according to some embodiments, the sensor arrangement 310 can be positioned within the lower transport plate assembly 120*b* and along the second side of the transport path T of the document processing device 101. According to some embodiments, the transport mechanism 120 transports documents along the transport path T in the direction of arrow A. According to some embodiments, the sensor arrangement 310 includes two light sources 312, a photodetector array 314, a gradient index lens array 320, and two lenses 316, such as two cylindrical or rod lenses.

According to some embodiments, the two light sources 312 are positioned on circuit boards 342 to emit and direct illumination light rays. A respective portion of the emitted illumination light rays is received by the two lenses 316. According to some embodiments, the light sources 312 are identical to the light sources 212 described above and shown in FIG. 2. Thus, the descriptions of the light sources 212 apply to the light sources 312.

According to some embodiments, a substantial amount of the emitted light is received by the lenses 316. According to some embodiments, each lens 316 has a circular cross-section. According to other embodiments, each lens 316 can have an oval, a half cylinder, or a half-moon shaped cross-section. According to other embodiments, the lens 316 has an aspheric shaped cross-section. A defining characteristic of the lens 316 is that the lens 316 has light focusing characteristics in one dimension but not in a second dimension. For example, as shown in FIG. 3, the lenses 316 focus and/or narrow light in a y-dimension, while distributing and/or expanding the light in an x-dimension.

According to some embodiments, each of the lenses 316 receives respective light from the light sources 312 and transmits collimated light rays 351. According to some embodiments, the lenses 316 focus the collimate light rays 351 into a collimated strip of light 374 (FIG. 3C) that is incident on a first surface of a document 370 being processed. According to some embodiments, the collimated strip of light 374 provides uniform illumination in the z-direction on the documents that are transported within a depth of field 322 of the gradient index lens array 320. According to some embodiments, the collimated strip of light 374 is narrower in the y-direction than the strip of light 274, which is described above and shown in FIG. 2C. According to some embodiments, the strip of light 274 has a width of about 2 millimeters to about 5 millimeters.

According to some embodiments, the size of the collimated strip of light 374 is directly correlated with the size and position of the lenses 316. For example, cylindrical lenses with larger diameters and larger lengths will produce larger collimated strips of light. Similarly, the relative distances between the light sources 312, the lenses 316, and the document being processed directly effect the size of the collimated strip of light. Such dimensions can influence the design of a sensor arrangement such as the sensor arrangement 310.

For example, it might be desirable to position the light sources 312 at some distance from the transport mechanism 120 that transports documents along the transport path T for mechanical reasons. Additionally, some light sources can generate significant amounts of heat that can disrupt and/or complicate the processing of documents or otherwise pose problems. As the light sources are positioned further from the lenses, for example, a cylindrical lens having a larger diameter may be used.

According to some embodiments, the lenses 316 and the two light sources 312 are positioned such that the collimated strip of light 374 is between about 0.04 inches and about 1.15 inches in width along the y-dimension and between about 4 inches and about 10 inches along the x-dimension. Such a configuration is suitable for detecting, scanning, and/or imaging a document to produce data including image data that is reproducible as a visually readable image with a sufficient resolution (e.g., 50 DPI×50 DPI, 100 DPI×200 DPI, or 200 DPI×200 DPI) for document processing. According to some embodiments, the size of the collimated strip of light 374 varies with the transported documents' z-positioning. For example, referring to FIGS. 3A-C, if document 370 is transported in the direction of arrow A, as the document 370 moves away from a first surface 330*a* of a cover 330 in the z-direction, the collimated strip of light 374 will initially decrease in the y-direction and then increase. Such a result is caused by the positioning of the light sources 312, which cross the collimated rays of light 351, as shown in FIG. 3A.

According to some embodiments, the sensor arrangement 310 includes the cover 330 having the first surface 330*a* and a second surface 330*b*. According to some embodiments, the cover 330 is identical to the cover 230 described above and shown in FIG. 2. Thus, the descriptions of the cover 230 apply to the cover 330. According to some embodiments, the lenses 316 direct and/or focus the collimated light rays 351 towards a first surface of the document 370 being processed. At least a portion of the collimated light rays 351 pass through the cover 330 and are incident upon the passing document in the form of the collimated strip of light 374. A portion of the light incident upon the passing document is reflected and passed back through the cover 330. The gradient index lens array 320 is positioned to receive at least a portion of the reflected light.

According to some embodiments, the gradient index lens array 320 focuses the received reflected light onto an imaging plane 315. According to some embodiments, the imaging plane 315 is located along the z-direction at about +/−30 mils from a first surface 314*a* of the photodetector array 314. According to some embodiments, the imaging plane 315 is aligned along the z-direction to coincide with the first surface 314*a* of the photodetector array 314. According to some embodiments, in response to receiving the focused light, the photodetector array 314 produces one or more electrical signals associated with the received focused light and/or characteristic information of the documents. According to some embodiments, the one or more electrical signals are processed via one or more controllers and or processors (e.g., the controller 150) to derive data therefrom. According to some embodiments, the derived data is associated with the characteristic information of the documents. The derived data includes image data that is reproducible as a visually readable image having a sufficient resolution (e.g., 50 DPI×50 DPI, 200 DPI×100 DPI, or 200 DPI×200 DPI) for document processing, as long as the subject (e.g., document) remains located within the depth of field 322 of the gradient index lens array 320.

According to some embodiments, the photodetector array 314 generates a line-scan signal that corresponds to analog image intensity variations in the x-direction. As documents are transported along the transport path T in the y-direction, the sensor arrangement 310 scans and/or images the documents in the y-direction. The x-direction image line-scans can be accumulated by a controller or processor, which can reproduce the image line-scans as a two-dimensional visually readable image.

According to some embodiments, the cover 330 is positioned relative to the gradient index lens array 320 to provide a shifted focal plane 324 that utilizes the entire depth of field 322 during document processing. According to some embodiments, the gradient index lens array 320 is identical to the gradient index lens array 220 described above and shown in FIG. 2. Thus, the descriptions of the gradient index lens array 220 apply to the gradient index lens array 320.

According to some embodiments, the photodetector array 314 can be mounted on a circuit board 344. The circuit board 344 can be a printed circuit board configured to connect a plurality of devices. Similarly, the two light sources 312 can be mounted on circuit boards 342. It is contemplated that the circuit boards 342 and 344 are separate circuit boards or the same circuit board. According to some embodiments, as discussed above in connection with FIG. 2, the circuit boards 342 are positioned at angles θ1 and θ2 relative to the circuit board 344. Angling the circuit boards 342 can position the two light sources 312 to provide an increased intensity of collimated light rays 351 onto the documents being processed. According to some embodiments, angles θ1 and θ2 are between about 15 degrees and about 60 degrees.

Figure 4A:
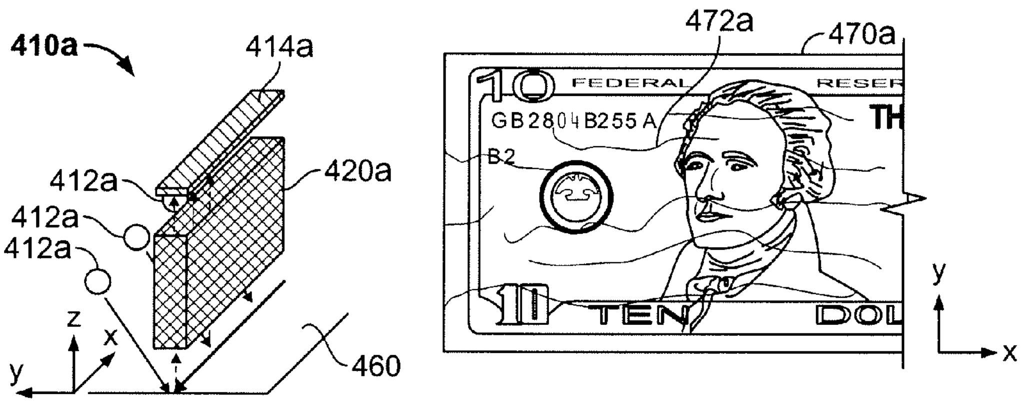
FIG. 4A is a perspective view of a sensor arrangement having one-sided illumination and a resulting scanned image according to some embodiments.
Figure 4B:
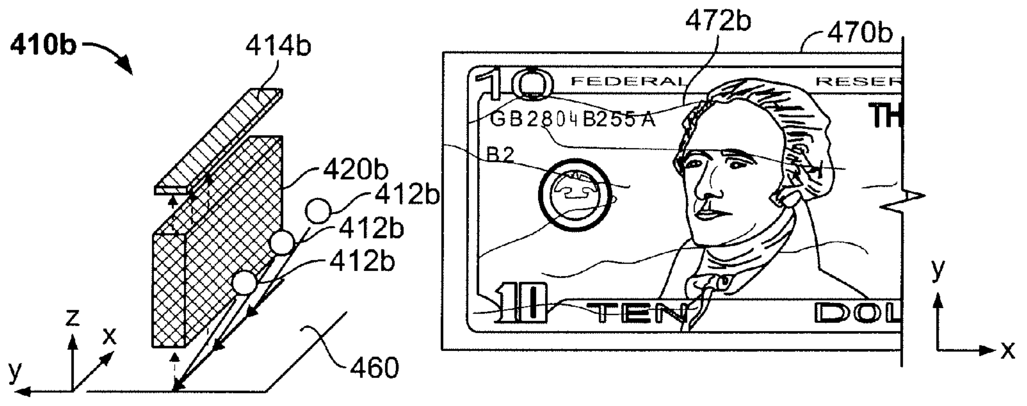
FIG. 4B is a perspective view of a sensor arrangement having one-sided illumination and a resulting scanned image according to some embodiments.
Figure 4C:
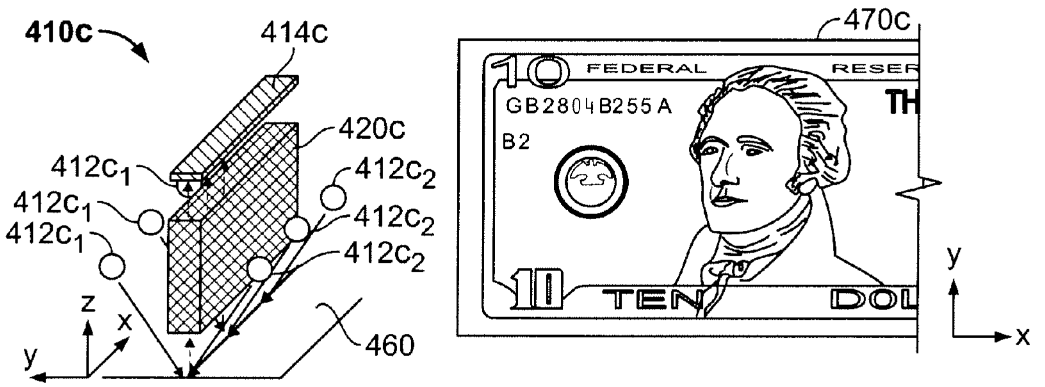
FIG. 4C is a perspective view of a sensor arrangement having two-sided illumination and a resulting scanned image according to some embodiments.

Referring to FIGS. 4A-C, perspective views of three document sensor arrangements 410*a-c* and corresponding visually readable images 470*a-c* are shown. The first sensor arrangement 410*a* includes light sources 412*a*, a photodetector array 414*a*, and a gradient index lens array 420*a*. The second sensor arrangement 410*b* includes light sources 412*b*, a photodetector array 414*b*, and a gradient index lens array 420*b*. The light sources 412*a* of the first sensor arrangement 410*a* are positioned on a first side of the photodetector 420*a* and the light sources 412*b* of the second sensor arrangement 410*b* are positioned on a second opposing side of the respective photodetector 420*b*. Documents 460 having wrinkles being processed by a document processing device employing either the first sensor arrangement 410*a* or the second sensor arrangement 410*b* are more prone to generate electrical signals including wrinkle-noise. Thus, in response to reproducing data derived from such signals as visually readable images, the resulting visually readable images 470*a,b* tend to contain shadows 472*a,b*, as shown in FIGS. 4*a* and 4*b*.

The third sensor arrangement 410*c* of FIG. 4C includes first light sources 412$c_1$ and second opposing light sources 412$c_2$, a photodetector array 414*c*, and a gradient index lens array 420*c*. The gradient index lens array 420*c* is positioned between the two opposing light sources 412$c_1$, 412$c_2$ with illumination angles θ1 and θ2, as described above in reference to FIG. 2. Positioning the two light sources 412$c_1$, 412$c_2$ on opposing sides of the gradient index lens array 420*c*, as shown, can reduce shadows in the resulting visually readable image 470*c* of the document 460 being processed. The two opposing light sources 412$c_1$ and 412$c_2$ thereby minimize or reduce a shadowing effect of wrinkles in the document 460 being processed.

Figure 5:
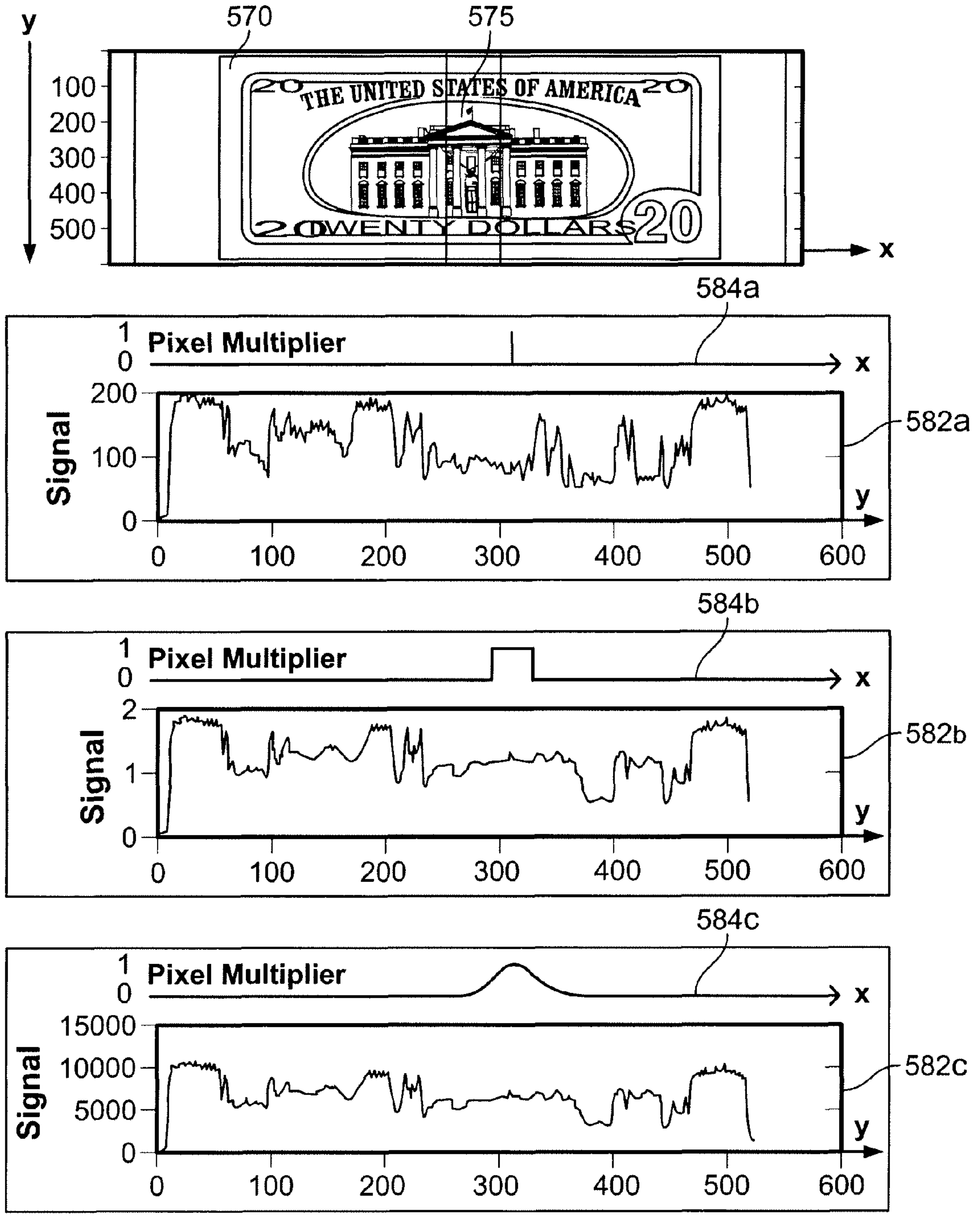
FIG. 5 illustrates three exemplary look-up patterns generated from image data according to some embodiments.

Referring to FIG. 5, a reproduced visually readable image 570 of a document and three exemplary look-up patterns 582*a-c* generated therefrom are shown. According to some embodiments, the look-up patterns were created as follows: a document was transported via the transport mechanism past at least the first sensor arrangement 140*a*. The sensor arrangement 140*a* detected, scanned, and/or imaged at least one side of the document to generate one or more electrical signals associated with the document and/or characteristic information of the document. The one or more electrical signals were transmitted to one or more controllers and/or processors that derived data including image data therefrom. It is that derived image data that is reproduced as the visually readable image 570. According to some embodiments, one or more controllers and/or processors (e.g., the controller 150) generated the look-up patterns (e.g., 582*a-c*) from the derived data and/or from the visually readable image 570. According to some embodiments, comparing the generated look-up pattern derived from the data and/or the visually readable image 570 the with a plurality of master look-up patterns can be used to denominate currency bills associated with the generated look-up pattern. According to some embodiments, pixels within one or more regions in an x-direction are averaged, and a look-up pattern 582*a-c* in a y-direction is generated.

According to some embodiments, a controller and/or processor (e.g., the controller 150) is configured to apply a multiplier 584*a-c* to a portion of the derived data and/or visually readable image to generate the look-up pattern 582*a-c*. According to some embodiments, a controller and/or a processor applies the multiplier 584*a-c* to the image data associated with a half-inch wide portion 575 generally in the center of the visually readable image 570. It is contemplated that the multiplier 584*a-c* can be applied to image data associated with any portion of the visually readable image 570.

According to some embodiments, a single pixel multiplier 584*a* can be used to generate a look-up pattern 582*a* in the y-direction based on a one pixel-wide region in the x-direction. Such a look-up pattern 582*a* is prone to large variations from a master pattern due to potential currency bill shift in the x-direction, as well as, electrical noise and optical noise. To reduce the effects of x-direction shifting and noise, pixels within, for example, the half-inch-wide portion 575 of the visually readable image 570 can be averaged. According to some embodiments, an averaging multiplier 584*b* can be applied to a region of pixels in the x-direction to generate an averaged look-up pattern 582*b*, which is less prone to variations due to shifting and noise. According to other embodiments, a weighted average multiplier 584*c*, such as a Gaussian function, can be applied to a region of pixels in the x-direction to generate a weighted average look-up pattern 582*c*, which is also less prone to variations due to shifting and noise. According to some embodiments, the generated lookup patterns 582*a-c* can be compared with stored master patterns to determine, inter alia, the currency bill's denomination.

According to other embodiments, other techniques known to those skilled in the art are used to determine the denomination of bills.

Figure 6:
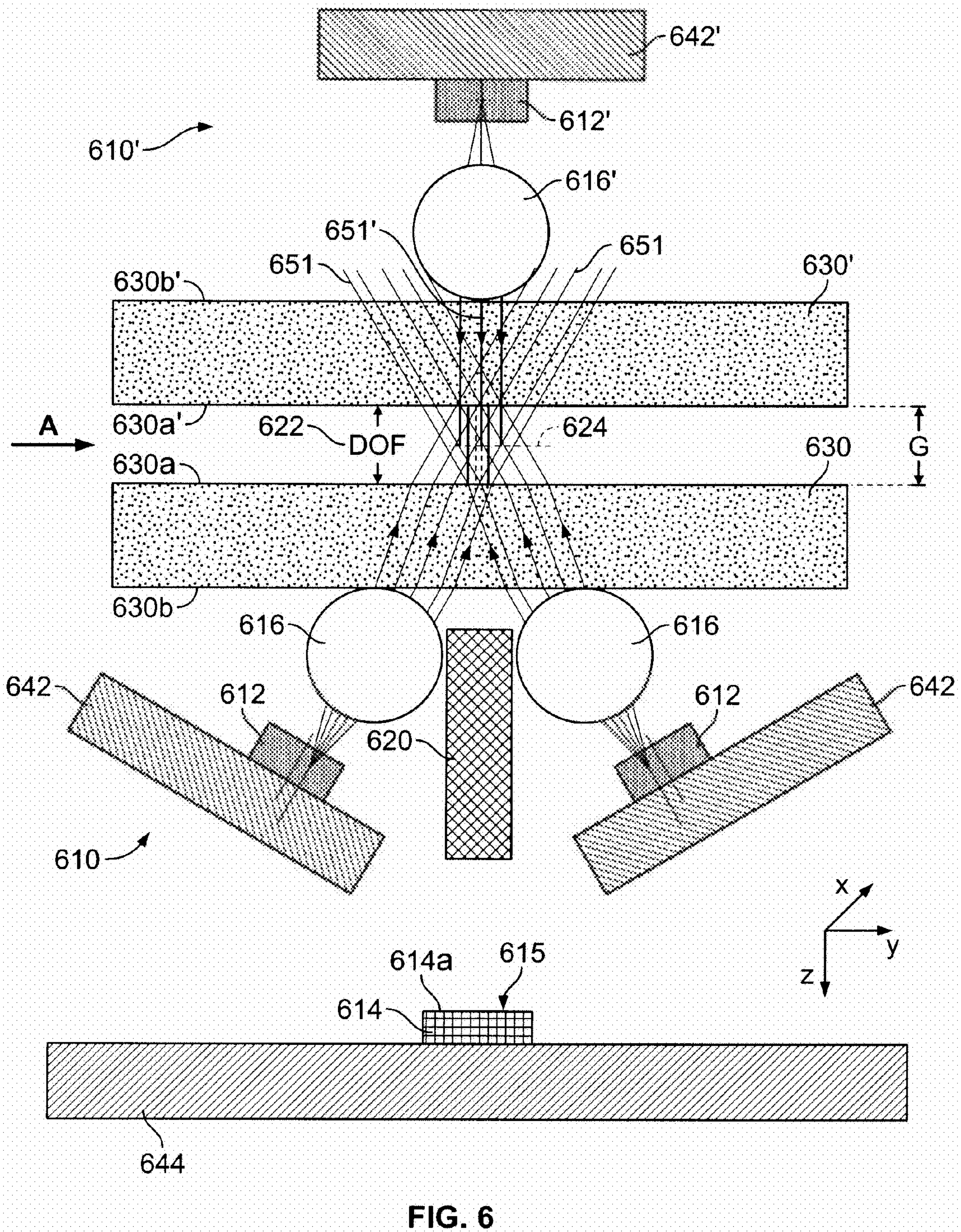
FIG. 6 is a side view of a sensor arrangement having light sources on both sides of a transport path for detecting reflected and transmitted light according to some embodiments.

Referring to FIG. 6, a sensor arrangement 610, 610' is shown according to some embodiments. The sensor arrangement 610, 610' includes a first half 610 and a second half 610'. According to some embodiments, the first half 610 can be positioned within the upper transport plate assembly 120*a* and along the first side of the transport path T of the document processing device 101. Similarly, according to some embodiments, the second half 610' can be positioned within the lower transport plate assembly 120*b* and along the second opposing side of the transport path T of the document processing device 101. According to some embodiments, the sensor arrangement 610, 610' is similar to the sensor arrangements 210 and 310 described above and shown in FIGS. 2 and 3. According to some embodiments, the first half 610 is identical to the sensor arrangement 310 described above and shown in FIGS. 3A-B.

According to some embodiments, the transport mechanism 120 transports documents along the transport path T in the direction of arrow A. The first half 610 includes two light sources 612 which may comprise arrays of light sources, a photodetector array 614, a gradient index lens array 620, and two lenses 616 such as cylindrical lenses or rod lenses. The second half 610' includes a third light source or light source array 612' and a third lens 616', such as a cylindrical lens or rod lens.

According to some embodiments, the two light sources/arrays 612 are positioned on circuit boards 642 to emit and direct illumination light rays. A respective portion of the emitted illumination light rays is received by the two lenses 616. Similarly, the light source/array 612' is positioned on circuit board 642' to emit and direct illumination light rays. A portion of the emitted illumination light rays is received by the cylindrical lens 616'. According to some embodiments, the light sources/arrays 612 and 612' are identical to the light sources/arrays 212 and 312 described above and shown in FIGS. 2 and 3. Thus, the descriptions of the light sources/arrays 212 and 312 apply to the light sources/arrays 612 and 612'.

According to some embodiments, the sensor arrangement 610, 610' includes a first cover 630 having a first surface 630*a* and a second surface 630*b* and a second cover 630' having a first surface 630*a'* and a second surface 630*b'*. According to some embodiments, the first and second covers 630 and 630' are identical to the covers 230 and 330 described above and shown in FIGS. 2 and 3. Thus, the descriptions of the covers 230 and 330 apply to the first and the second covers 630 and 630'. According to some embodiments, the first surface 630*a* of the first cover 630 and the first surface 630*a'* of the second cover 630' form a portion of the transport path T. According to some embodiments, the first surface 630*a* of the first cover 630 forms a portion of the upper transport plate assembly 120*a* and the first surface 630*a'* of the second cover 630' forms a portion of the lower transport plate assembly 120*b*.

According to some embodiments, the lenses 616 on the first side of the transport path T direct and/or focus collimated light rays 651 towards a first surface of a document (not shown) being processed. At least a portion of the collimated light rays 651 pass through the first cover 630 and are incident upon the first surface of the passing document in the form of a collimated strip of light. A portion of the light incident upon the passing document is reflected and passed back through the first cover 630. The gradient index lens array 620 is positioned to receive at least a portion of the reflected light. Similarly, the lens 616' on the second side of the transport path T directs and/or focuses collimated light rays 651' towards a second surface of the document being processed. At least a portion of the collimated light rays 651' pass through the second cover 630' and are incident upon the second surface of the passing document in the form of a collimated strip of light. A portion of the light incident upon the second surface of the passing document is transmitted through the document and passed through the first cover 630. The gradient index lens array 620 is positioned to receive at least a portion of the transmitted light. According to some embodiments, the lenses 616 and 616' are identical to the lenses 316 described above and shown in FIG. 3. Thus, the descriptions of the lenses 316 apply to the lenses 616 and 616'.

According to some embodiments, the gradient index lens array 620 focuses the received reflected light and received transmitted light onto an imaging plane 615. According to some embodiments, the imaging plane 615 is located along the z-direction at about +/−30 mils from a first surface 614*a* of the photodetector array 614. According to some embodiments, the imaging plane 615 is aligned along the z-direction to coincide with the first surface 614*a* of the photodetector array 614. According to some embodiments, in response to receiving the focused light, the photodetector array 614 produces one or more electrical signals associated with the received focused light and/or characteristic information of the documents. According to some embodiments, the one or more electrical signals are processed via one or more controllers and/or processors (e.g., the controller 150) to derive data therefrom. According to some embodiments, the derived data is associated with the characteristic information of the documents. The derived data includes image data that is reproducible as a visually readable image having a sufficient resolution (e.g., 50 DPI×50 DPI, 200 DPI×100 DPI, or 200 DPI×200 DPI) for document processing, as long as the subject (e.g., document) remains located within the depth of field 622 of the gradient index lens array 620. According to some embodiments, the one or more electrical signals includes one or more electrical signals associated with reflected light and one or more electrical signals associated with transmitted light. According to some such embodiments, a processor and/or a controller can be configured to separate the electrical signals into a reflection component and a transmission component for use in document processing.

According to some embodiments, the photodetector array 614 generates a line-scan signal that corresponds to analog image intensity variations in the x-direction. As the documents are transported along the transport path T in the y-direction, the sensor arrangement 610, 610' scans and/or images the documents in the y-direction. The x-direction image line-scans can be accumulated by a controller or processor, which can reproduce the image line-scans as a two-dimensional visually readable image.

According to some embodiments, the cover 630 is positioned relative to the gradient index lens array 620 to provide a shifted focal plane 624 that utilizes the entire depth of field 622 during document processing. According to some embodiments, the gradient index lens array 620 is identical to the gradient index lens array 220 described above and shown in FIG. 2. Thus, the descriptions of the gradient index lens array 220 apply to the gradient index lens array 620.

Figure 7:
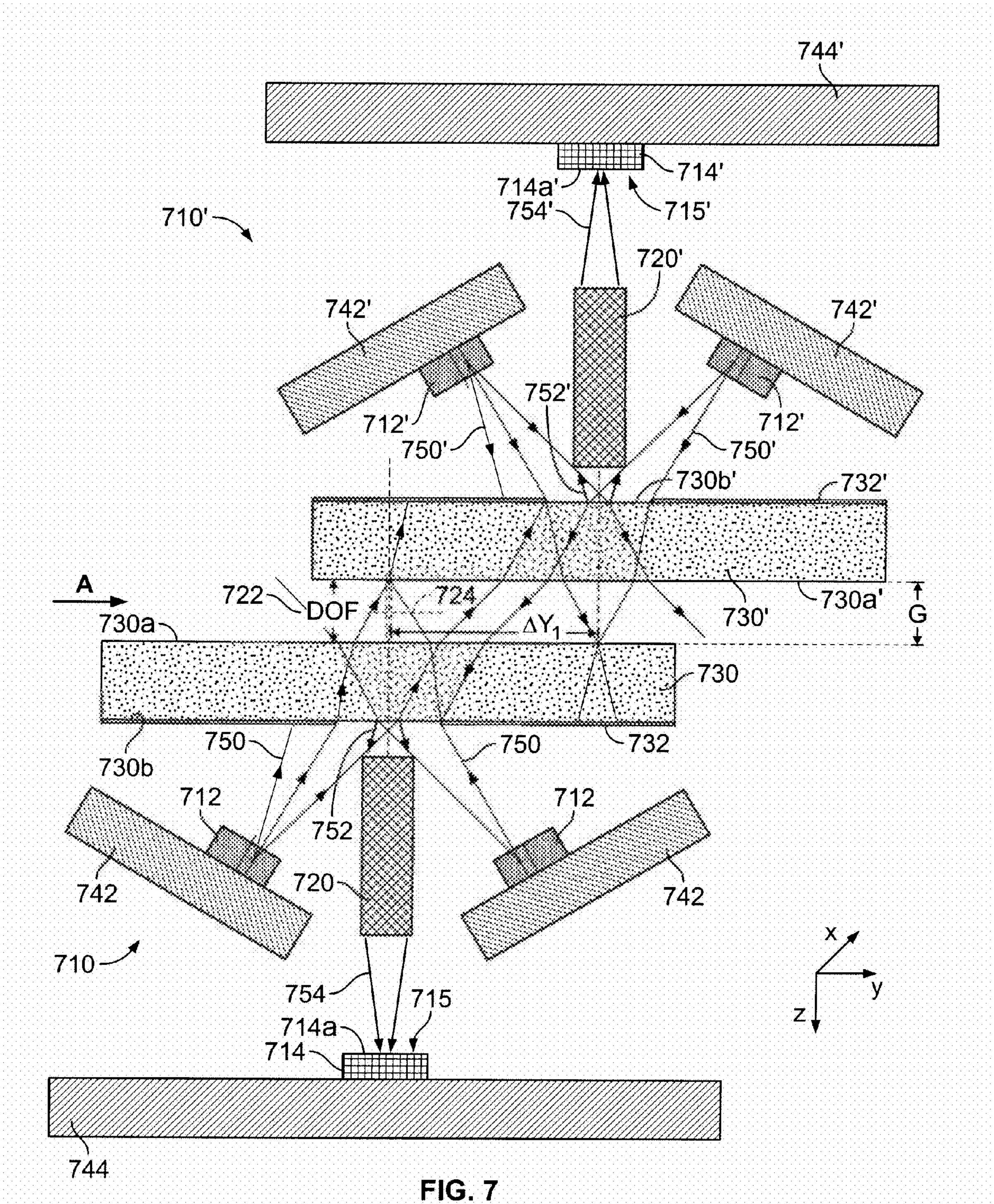
FIG. 7 is a side view of two sensor arrangements on opposite sides of a transport path for detecting light reflected from two surfaces of a document according to some embodiments.

Referring to FIG. 7, a sensor arrangement 710, 710' is shown according to some embodiments. The sensor arrangement 710, 710' includes a first half 710 and a second half 710'. According to some embodiments, the first half 710 can be positioned within the upper transport plate assembly 120*a* and along the first side of the transport path T of the document processing device 101. Similarly, according to some embodiments, the second half 710' can be positioned within the lower transport plate assembly 120*b* and along the second opposing side of the transport path T of the document processing device 101. According to some embodiments, the first and the second halves of the sensor arrangement 710, 710' is the same as, or similar to, the sensor arrangement 210 described above and shown in FIG. 2. According to some embodiments, the first and the second halves of the sensor arrangement 710, 710' are each identical to the sensor arrangement 210 described above and shown in FIG. 2.

According to some embodiments, the transport mechanism 120 transports documents along the transport path T in the direction of arrow A. The first half 710 includes two light sources or arrays 712, a photodetector array 714, and a gradient index lens array 720. The second half 710' includes two light sources 712', a photodetector array 714', and a gradient index lens array 720'.

According to some embodiments, the light sources/arrays 712 are positioned on circuit boards 742 to emit and direct illumination light rays 750. Similarly, the light sources/arrays 712' are positioned on circuit boards 742' to emit and direct illumination light rays 750'. According to some embodiments, the light sources/arrays 712 and 712' are identical to the light sources/arrays 212, 312, and 612 described above and shown in FIGS. 2, 3, and 6. Thus, the descriptions of the light sources/arrays 212, 312, and 612 apply to the light sources 712 and 712'.

According to some embodiments, the first half 710 includes a first cover 730 having a first surface 730*a* and a second surface 730*b* and the second half 710' includes a second cover 730' having a first surface 730*a'* and a second surface 730*b'*. According to some embodiments, the first and the second covers 730 and 730' are identical to the covers 230, 330, 630, and 630' described above and shown in FIGS. 2, 3, and 6. Thus, the descriptions of the cover 230, 330, 630, and 630' apply to the first and second covers 730 and 730'. According to some embodiments, the first surface 730*a* of the first cover 730 and the first surface 730*a'* of the second cover 730' form a portion of the transport path T. According to some embodiments, the first surface 730*a* of the first cover 730 forms a portion of the upper transport plate assembly 120*a* and the first surface 730*a'* of the second cover 730' forms a portion of the lower transport plate assembly 120*b*.

According to some embodiments, a portion of the emitted illumination light rays 750 are transmitted through the first cover 730 and are incident upon a first surface of a passing document (not shown). At least a portion of the light incident upon the first surface of the passing document is reflected and transmitted back through the first cover 730. According to some embodiments, the gradient index lens array 720 is positioned to receive at least a portion of reflected light 752. Similarly, a portion of the emitted illumination light rays 750' are transmitted through the second cover 730' and are incident upon a second surface of the passing document. A portion of the light incident upon the second surface of the passing document is reflected and transmitted back through the second cover 730'. According to some embodiments, the gradient index lens array 720' is positioned to receive at least a portion of reflected light 752'.

According to some embodiments, the gradient index lens array 720 focuses the received reflected light 752 onto an imaging plane 715. According to some embodiments, the imaging plane 715 is located along the z-direction at about +/−30 mils from a first surface 714*a* of the photodetector array 714. According to some embodiments, the imaging plane 715 is aligned along the z-direction to coincide with the first surface 714*a* of the photodetector array 714. Similarly, the gradient index lens array 720' focuses the received reflected light 752' onto an imaging plane 715'. According to some embodiments, the imaging plane 715' is located along the z-direction at about +/−30 mils from a first surface 714*a'* of the photodetector array 714'. According to some embodiments, the imaging plane 715' is aligned along the z-direction to coincide with the first surface 714*a'* of the photodetector array 714'.

According to some embodiments, in response to receiving the light rays 754, the photodetector array 714 produces one or more electrical signals associated with the light rays 754 and/or characteristic information of the documents. According to some embodiments, the one or more electrical signals are processed via one or more controllers and or processors (e.g., the controller 150) to derive data therefrom. According to some embodiments, the derived data is associated with the characteristic information of the documents. The derived data includes image data that is reproducible as a visually readable image having a sufficient resolution (e.g., 50 DPI×50 DPI, 200 DPI×100 DPI, or 200 DPI×200 DPI) for document processing, as long as the subject (e.g., document) remains located within the depth of field 722 of the gradient index lens array 720. According to some embodiments, the photodetector array 714 generates a line-scan signal that corresponds to analog image intensity variations in the x-direction on the first surface of the transported document (e.g., document 135*a*). As the documents are transported along the transport path T in the y-direction, the first half 710 scans and/or images the documents in the y-direction. The x-direction image line-scans can be accumulated by a controller or processor, which can reproduce the image line-scans as a two-dimensional visually readable image of the first surface of the documents.

Similarly, in response to receiving the light rays 754', the photodetector array 714' produces one or more electrical signals associated with the light rays 754' and/or characteristic information of the documents. According to some embodiments, the one or more electrical signals are processed via one or more controllers and or processors (e.g., the controller 150) to derive data therefrom. According to some embodiments, the derived data is associated with the characteristic information of the documents. The derived data includes image data that is reproducible as a visually readable image having a sufficient resolution (e.g., 50 DPI×50 DPI, 200 DPI×100 DPI, or 200 DPI×200 DPI) for document processing, as long as the subject (e.g., document) remains located within the depth of field 722' of the gradient index lens array 720'. According to some embodiments, the photodetector array 714' generates a line-scan signal that corresponds to analog image intensity variations in the x-direction on the second surface of the transported document (e.g., document 135*a*). As the documents are transported along the transport path T in the y-direction, the second half 710' scans and/or images the documents in the y-direction. The x-direction image line-scans can be accumulated by a controller or processor, which can reproduce the image line-scans as a two-dimensional visually readable image of the second surface of the documents.

According to some embodiments, the first surface 730*a* of the first cover 730 is positioned relative to the first surface 730*a'* of the second cover 730' such that the distance between the first and second covers 730, 730' is about equal to a depth of field 722 of both of the gradient index lens arrays 720, 720'. According to some embodiments, the covers 730 and 730' are positioned relative to each other such that the distance between the covers 730, 730' is less than the depth of field 722 of both of the gradient index lens arrays 720, 720'. Such positioning of the covers 730 and 730' ensures that transported documents remain within the depth of fields 722 and 722' during scanning and/or imaging to produce data that is reproducible as visually readable images having sufficient resolution for document processing. According to some embodiments, the first and the second covers 730 and 730' are each positioned relative to their respective gradient index lens array 720, 720' to provide a shifted focal plane 724 that utilizes the entire depth of field 722 during document processing. According to some embodiments, the gradient index lens array 720 is identical to the gradient index lens array 220 described above and shown in FIG. 2. Similarly, according to some embodiments, the gradient index lens array 720' is identical to the gradient index lens array 220 described above and shown in FIG. 2. Thus, the descriptions of the gradient index lens array 220 apply to the gradient index lens arrays 720 and 720'.

According to some embodiments, the first half 710 can be positioned a distance $\Delta Y_1$ upstream or downstream from the second half 710' along the transport path. Centerlines of the respective gradient index lens arrays 720 and 720' are separated by the distance $\Delta Y_1$ to minimize and/or eliminate light leakage from one half to the other half of the sensor arrangement 710, 710'. According to some embodiments, the first and second covers 730 and 730' each include an iris 732 and 732' respectively. The iris 732 is affixed to the second surface 730*b* of the first cover 730 and the iris 732' is affixed to the second surface 730*b'* of the second cover 730'. The irises 732 and 732' can be formed from a variety of opaque materials that block light from being transmitted. According to some embodiments, the first and the second halves 710 and 710' each include a housing that forms the irises 732 and 732', respectively. According to some embodiments, the combination of the irises 732 and 732' and the separation distance $\Delta Y_1$ prevents light leakage from one half to the other half of the sensor arrangement 710, 710'. According to some embodiments, the distance $\Delta Y_1$ is between about 0.2 inches and about 1 inch. According to some embodiments, the distance $\Delta Y_1$ is between about 0.2 inches and about 0.3 inches.

Figure 8:
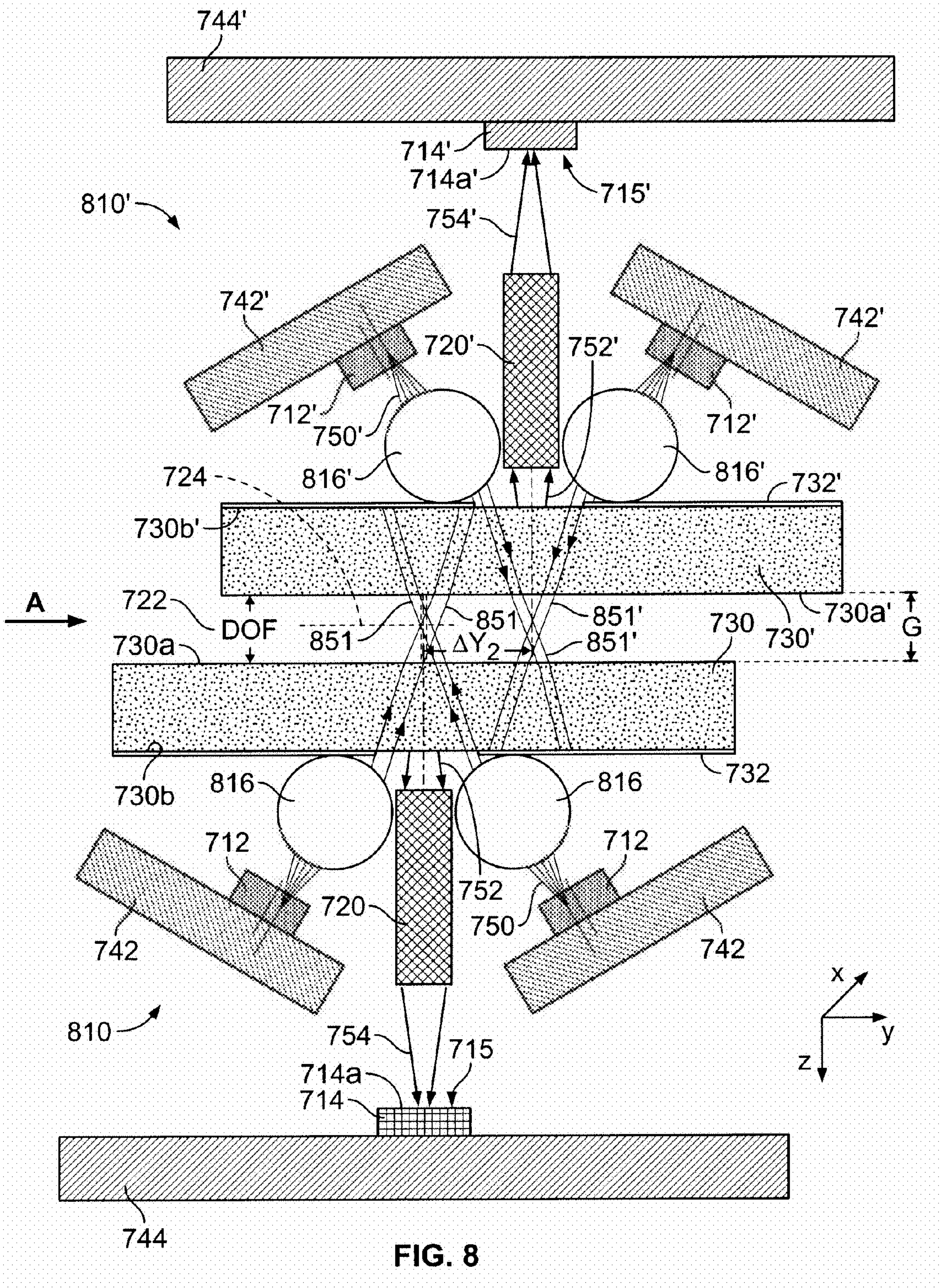
FIG. 8 is a side view of two sensor arrangements on opposite sides of a transport path for detecting light reflected from two surfaces of a document including two cylindrical lenses according to some embodiments.

Referring to FIG. 8, a sensor arrangement 810, 810' is shown according to some embodiments. The sensor arrangement 810, 810' includes a first half 810 and a second half 810'. According to some embodiments, the first half 810 can be positioned within the upper transport plate assembly **120*a* and along the first side of the transport path T of the document processing device 101. Similarly, the second half 810' can be positioned within the lower transport plate assembly 120*b* and along the second opposing side of the transport path T of the document processing device 101. According to some embodiments, the transport mechanism 120 transports documents along the transport path T in the direction of arrow A. According to some embodiments, the sensor arrangement 810, 810' is identical to the sensor arrangement 710, 710' described above and shown in FIG. 7, except for the addition of lenses 816 in the first half 810 and the addition of lenses 816' in the second half 810'. According to some embodiments, the first and the send halves of the sensor arrangement 810, 810' are the same as, or similar to, the sensor arrangement 310 described above and shown in FIG. 3. According to some embodiments, the first and the send halves of the sensor arrangement 810, 810' are identical to the sensor arrangement 310 described above and shown in FIG. 3**.

According to some embodiments, each half of the sensor arrangement 810, 810' includes two lenses 816, 816', such as cylindrical lenses or rod lenses, identical to the lenses 316, 616, and 616' described above and shown in FIGS. 3 and 6. In these embodiments, the lenses 816, 816' direct and/or focus collimated light rays 851, 851' that are incident on the surfaces of the transported documents (not shown) as collimated strips of light. The collimated strips of light have narrower or more focused rays of light than the illumination light rays 750 and 750' shown in FIG. 7. Thus, according to some embodiments, the first and second halves of the sensor arrangement 810, 810' can be separated by a distance $\Delta Y_2$ between about 0.1 inches and about 0.3 inches when lenses 816, 816', such as cylindrical lenses or rod lenses, are included in the sensor arrangement 810, 810'. According to some such embodiments, the distance $\Delta Y_2$ is between about 0.1 inches and about 0.15 inches.

ALTERNATIVE EMBODIMENTS

Alternative Embodiment A

A sensor arrangement positioned along a transport path of a document processing device, the sensor arrangement comprising:

at least one light source positioned to illuminate at least a portion of a surface of a document; and a gradient index lens array positioned to receive light reflected from the surface of the document and to transmit at least a portion of the received reflected light onto a photodetector array, wherein, the gradient index lens array and the photodetector array are positioned such that the photodetector array receives at least a portion of the reflected light, the photodetector array configured to generate one or more electrical signals from which a visually readable image of the surface of the document can be generated (e.g., in the form of image data) in response to the document being transported along the transport path remaining within a depth of field of the gradient index lens array, the depth of field being at least about 0.03 inches.

Alternative Embodiment B

A sensor arrangement positioned along a transport path of a document processing device, the sensor arrangement comprising:

at least one light source positioned to illuminate at least a portion of a surface of a document being transported along the transport path; and a gradient index lens array positioned to receive light reflected from the surface of the document and to transmit at least a portion of the received reflected light onto a photodetector array, wherein, the photodetector array is configured to generate one or more electrical signals from which image data can be derived, in response to the document being transported remaining within a depth of field of the gradient index lens array, the image data being reproducible as a visually readable image of the surface of the document having a sufficient resolution such that alphanumeric characters can be extracted therefrom, the depth of field being at least about 0.03 inches.

Alternative Embodiment C

A sensor arrangement positioned along a transport path of a document processing device, the document sensor arrangement comprising:

a cover having a first surface and a second surface;

a first light source and a second light source, each of the first and second light sources configured to emit light, the emitted light propagating through the cover to illuminate at least a portion of a surface of a document being transported along the transport path; and a gradient index lens array positioned to receive light reflected from the surface of the document and to transmit at least a portion of the received reflected light onto an active surface of a photodetector array, wherein, the gradient index lens array and the photodetector array are positioned relative to the cover such that photodetector array receives at least a portion of the reflected light, the photodetector array configured to generate one or more electrical signals from which a visually readable image of the surface of the document can be reproduced (e.g., from image data based on the electrical signals) in response to the document being transported along the transport path remaining within a depth of field of the gradient index lens array, the depth of field being at least about 0.03 inches.

Alternative Embodiment D

A sensor arrangement positioned along a transport path of a document processing device, the sensor arrangement comprising:

a cover having a first surface and a second opposing surface;

a first light source and a second light source, each of the first and the second light sources configured to emit light, the emitted light propagating through the cover to illuminate at least a portion of a surface of a document; and a gradient index lens array positioned to receive light reflected from the surface of the document and to transmit at least a portion of the received reflected light onto a photodetector array, wherein, the gradient index lens array and the photodetector array are positioned relative to the cover such that the gradient index lens array has a shifted focal plane, the shifted focal plane being at least about 0.015 inches away from the first surface of the cover.

Alternative Embodiment E

A sensor arrangement positioned along a transport path of a document processing device, the sensor arrangement comprising:

a cover having a first surface and a second surface;

a first light source and a second light source, each of the first and second light sources configured to emit light, the emitted light propagating through the cover to illuminate at least a portion of a surface of a document; and a gradient index lens array positioned to receive light reflected from the surface of the document and to transmit at least a portion of the received reflected light onto a photodetector array, the gradient index lens having a depth of field of at least about 0.03 inches, wherein, the gradient index lens array and the photodetector array are positioned relative to the cover such that the gradient index lens array has a shifted focal plane, the shifted focal plane being located at about half the distance of the depth of field from the first surface of the cover.

Alternative Embodiment F

A document sensor arrangement positioned along a transport path of a document processing device, the document sensor arrangement comprising:

a first light source and a second light source;

a first lens and a second lens, light emitted from the first light source passes through the first lens and illuminates at least a portion of a surface of a document; light emitted from the second light source passes through the second lens and illuminates at least a portion of the surface of the document; and a gradient index lens array positioned to receive light reflected from the surface of the document and to transmit at least a portion of the received reflected light onto an active surface of a photodetector array, wherein, the gradient index lens array and the photodetector array are positioned such that the photodetector array receives at least a portion of the reflected light, the photodetector array configured to generate one or more electrical signals from which a visually readable image of the surface of the document can be generated in response to the document being transported along the transport path remaining within a depth of field of the gradient index lens array, the depth of field being at least about 0.03 inches.

Alternative Embodiment G

A sensor arrangement positioned along a transport path of a document processing device, the sensor arrangement comprising:

a first light source and a second light source;

a first lens and a second lens, the first lens positioned to collect light emitted from the first light source and to illuminate at least a portion of a surface of a document being transported along the transport path; the second lens positioned to collect light emitted from the second light source and to illuminate at least a portion of the surface of the document; and a gradient index lens array positioned to collect light reflected from the surface of the document and to transmit at least a portion of the collect reflected light onto an active surface of a photodetector array, wherein, the photodetector array generates one or more electrical signals in response to the at least a portion of the collected light being transmitted onto the active surface of the photodetector, the one or more electrical signals being derivable into data from which a visually readable image of the surface of the document can be generated having sufficient resolution such that alphanumeric characters can be extracted therefrom, the one or more electrical signals being generated in response to the document remaining within a depth of field of the gradient index lens array while being transported, the depth of field being at least about 0.03 inches.

Alternative Embodiment H

A sensor arrangement positioned along a transport path of a document processing device, the sensor arrangement comprising:

at least one light source positioned to illuminate at least a portion of a first surface of a document;

at least one light source positioned to illuminate at least a portion of a second opposing surface of the document;

a gradient index lens array positioned to collect light reflected from the first surface of the document, the gradient index lens array further positioned to collect light transmitted through the document; and a photodetector array positioned to collect light;

wherein, the gradient index lens array and the photodetector array are positioned such that the photodetector array collects at least a portion of the reflected light and at least a portion of the transmitted light, the photodetector array configured to generate one or more electrical signals from which a visually readable image of the first surface of the document can be reproduced in response to the document being transported along the transport path remaining within a depth of field of the gradient index lens array, the depth of field being at least about 0.03 inches.

Alternative Embodiment I

A sensor arrangement positioned along a transport path of a document processing device, the sensor arrangement comprising:

a first cover having a first surface and a second surface;

a second cover having a first surface and a second surface;

a first light source and a second light source;

a first lens and a second lens, the first lens positioned to collect light emitted from the first light source and to illuminate at least a portion of a first surface of a document; the second lens positioned to collect light emitted from the second light source and to illuminate at least a portion of the first surface of the document;

a third light source;

a third lens positioned to collect light emitted from the third light source and to illuminate at least a portion of a second surface of the document; and a gradient index lens array positioned to collect light reflected from the first surface of the document and to transmit at least a portion of the collected reflected light onto a photodetector array; the gradient index lens array positioned to collect light transmitted through the document and to transmit at least a portion of the collected transmitted light onto the photodetector array;

wherein, the gradient index lens array and the photodetector array are positioned relative to the first cover such that the photodetector array collects at least a portion of the reflected light and at least a portion of the transmitted light, the photodetector array configured to generate one or more electrical signals from which a visually readable image of the first surface of the document can be reproduced in response to the document remaining within a depth of field of the gradient index lens array while being transported along the transport path, the depth of field being at least about 0.03 inches.

Alternative Embodiment J

A sensor arrangement positioned along a transport path of a document processing device, the sensor arrangement comprising:

a first cover having a first surface and a second surface;

a second cover having a first surface and a second surface, the first surface of the second covering being spaced across the transport path from the first surface of the first cover by a distance G;

a first light source and a second light source;

a first lens and a second lens, the first lens positioned to collect light emitted from the first light source and to illuminate at least a portion of a first surface of a document; the second lens positioned to collect light emitted from the second light source and to illuminate at least a portion of the first surface of the document;

a third light source;

a third lens positioned to collect light emitted from the third light source and to illuminate at least a portion of a second surface of the document; and a gradient index lens array positioned to collect light reflected from the first surface of the document and to transmit at least a portion of the collected reflected light onto a photodetector array; the gradient index lens array positioned to collect light transmitted through the document and to transmit at least a portion of the collected transmitted light onto the photodetector array;

wherein, the gradient index lens array and the photodetector array are positioned relative to the first cover such that the gradient index lens array has a shifted focal plane, the shifted focal plane being located at about one-half of the distance G from the first surface of the first cover.

Alternative Embodiment K

The sensor arrangement of alternative embodiment J, wherein the gradient index lens array has a depth of field of at least about 0.03 inches, the depth of field being equal to or greater than the distance G.

Alternative Embodiment L

A sensor arrangement positioned along a transport path of a document processing device, the sensor arrangement comprising:

a first cover having a first surface and a second surface;

a second cover having a first surface and a second surface, the first surface of the second covering being spaced across the transport path from the first surface of the first cover by a distance G;

a first light source and a second light source;

a first lens and a second lens, the first lens positioned to collect light emitted from the first light source and to illuminate at least a portion of a first surface of a document; the second lens positioned to collect light emitted from the second light source and to illuminate at least a portion of the first surface of the document;

a third light source;

a third lens positioned to collect light emitted from the third light source and to illuminate at least a portion of a second surface of the document; and a gradient index lens array positioned to collect light reflected from the first surface of the document and to transmit at least a portion of the collected reflected light onto a photodetector array; the gradient index lens array positioned to collect light transmitted through the document and to transmit at least a portion of the received transmitted light onto the photodetector array;

wherein, the photodetector array generates one or more electrical signals in response to the at least a portion of the collected reflected and transmitted light being transmitted onto the photodetector array, the one or more electrical signals being derivable into image data from which a visually readable image of the first surface of the document can be generated having sufficient resolution such that alphanumeric characters can be extracted therefrom, the one or more electrical signals being generated in response to the document remaining within a depth of field of the gradient index lens array while being transported, the depth of field being at least about 0.03 inches.

Alternative Embodiment M

A document processing device, comprising:

a first sensor arrangement positioned along a first side of a transport path, the first sensor arrangement comprising:

i) at least one light source positioned to illuminate at least a portion of a first surface of a document being transported along the transport path in a direction of motion; and ii) a first gradient index lens array positioned to collect light reflected from the first surface of the document and to transmit at least a portion of the collected reflected light onto a first photodetector array; and a second sensor arrangement positioned along a second opposing side of the transport path, the second sensor arrangement comprising:

i) at least one light source positioned to illuminate at least a portion of a second surface of the document; and ii) a second gradient index lens array positioned to collect light reflected from the second surface of the document and transmit at least a portion of the collected reflected light onto a second photodetector array; and wherein, the first sensor arrangement and the second sensor arrangement are separated along the transport path in the direction of motion by a distance between about 0.2 inches and about 1.0 inch; and wherein, the first and the second photodetector arrays generate one or more electrical signals from which a visually readable image of the first surface and of the second surface of the document can be reproduced having a sufficient resolution such that alphanumeric characters can be extracted therefrom, the one or more electrical signals being generated in response to the document remaining within a depth of field of the first and the second gradient index lens arrays while being transported along the transport path, the depth of fields being at least about 0.03 inches.

Alternative Embodiment N

A document processing device, comprising:

a first sensor arrangement positioned along a first side of a transport path, the first sensor arrangement comprising:
- i) a first cover having a first surface and a second surface;
- ii) a first light source and a second light source;
- iii) a first lens and a second lens, the first lens positioned to collect light emitted from the first light source and to illuminate at least a portion of a first surface of a document being transported along the transport path in a direction of motion; the second lens positioned to collect light emitted from the second light source and to illuminate at least a portion of the first surface of the document; and
- iv) a first gradient index lens array positioned to collect light reflected from the first surface of the document and to transmit at least a portion of the collected reflected light onto a first photodetector; and a second sensor arrangement positioned along a second opposing side of the transport path, the second sensor arrangement comprising:
- i) a second cover having a first surface and a second surface, the first surface of the second covering being spaced across the transport path from the first surface of the first cover by a distance G;
- ii) a third light source and a fourth light source;
- iii) a third lens and a fourth lens, the third lens positioned to collect light emitted from the third light source and to illuminate at least a portion of a second surface of the document; the fourth lens positioned to collect light emitted from the fourth light source and to illuminate at least a portion of the second surface of the document; and
- iv) a second gradient index lens array positioned to collect light reflected from the second surface of the document and to transmit at least a portion of the received reflected light onto a second photodetector array, wherein, the first sensor arrangement and the second sensor arrangement are separated along the transport path in the direction of motion by a distance between about 0.2 inches and about 1.0 inch; and wherein, the first gradient index lens array and the first photodetector array are positioned relative to the first cover such that the first gradient index lens array has a first shifted focal plane, the first shifted focal plane being located at about one-half of the distance G from the first surface of the first cover; and wherein the second gradient index lens array and the second photodetector array are positioned relative to the second cover such that the second gradient index lens array has a second shifted focal plane, the second shifted focal plane being located at about one-half of the distance G from the first surface of the second cover.

Alternative Embodiment O

The document processing device of alternative embodiment N, wherein the first and the second gradient index lens arrays each have a depth of field of at least about 0.03 inches, the depth of field being equal to or greater than the distance G.

Alternative Embodiment P

A document processing device for receiving a stack of documents and rapidly processing all of the documents in the stack, the device comprising:

an input receptacle positioned to receive the stack of documents;

a transport mechanism positioned to transport the documents, one at a time, in a transport direction from the input receptacle along a transport path at a rate of at least about 1000 documents per minute;

a sensor arrangement positioned along the transport path, the sensor arrangement comprising:
- i) at least one light source positioned to illuminate at least a portion of a surface of one of the documents; and
- ii) a gradient index lens array positioned to collect light reflected from the surface of the one of the documents and to transmit at least a portion of the collected reflected light onto a photodetector array;

wherein, the photodetector array generates one or more electrical signals from which a visually readable image of the surface of the document can be reproduced having sufficient resolution such that alphanumeric characters can be extracted from the visually readable image (e.g., from at least a portion of the image data derived from the electrical signals) in response to the document being transported remaining within a depth of field of the gradient index lens array, the depth of field being at least about 0.03 inches.

Alternative Embodiment Q

The document processing device of alternative embodiment P, wherein the transport mechanism is configured to constrain transported documents to remain within the depth of field of the gradient index lens array.

Alternative Embodiment R

The sensor arrangement of any of alternative embodiments A to L and the document processing device of any of alternative embodiments M to Q, wherein each of the documents has a wide edge, and wherein the documents are transported in a wide-edge leading manner.

Alternative Embodiment S

The sensor arrangement of alternative embodiments A and B and the document processing device of alternative embodiments P and Q, wherein the at least one light source includes a first light source and a second light source, the first light source positioned on a first side of the gradient index lens array and the second light source positioned on a second opposing side of the gradient index lens array.

Alternative Embodiment T

The sensor arrangement of any of alternative embodiments C to G and I to L, wherein the first light source is positioned on a first side of the gradient index lens array and the second light source is positioned on a second opposing side of the gradient index lens array.

Alternative Embodiment U

The sensor arrangement of alternative embodiment H, wherein the at least one light source positioned to illuminate the first surface of the document includes a first light source and a second light source, the first light source positioned on a first side of the gradient index lens array and the second light source positioned on a second opposing side of the gradient index lens array.

Alternative Embodiment V

The document processing device of alternative embodiment M, wherein the at least one light source positioned to illuminate the first surface of the document includes a first light source and a second light source, the first light source positioned on a first side of the first gradient index lens array and the second light source positioned on a second opposing side of the first gradient index lens array; the at least one light source positioned to illuminate the second surface of the document includes a third light source and a fourth light source, the third light source positioned on a first side of the second gradient index lens array and the fourth light source positioned on a second opposing side of the second gradient index lens array.

Alternative Embodiment W

The document processing device of alternative embodiments N and O, wherein the first light source is positioned on a first side of the first gradient index lens array and the second light source is positioned on a second opposing side of the first gradient index lens array; the third light source is positioned on a first side of the second gradient index lens array and the fourth light source is positioned on a second opposing side of the second gradient index lens array.

Alternative Embodiment X

The sensor arrangement of any of alternative embodiments S to U and the document processing device of alternative embodiments V and W, wherein the opposing light sources illuminate the document with opposing angles of illumination to reduce shadows and/or a wrinkle effect.

Alternative Embodiment Y

The sensor arrangement of alternative embodiments F and G, wherein the emitted light forms a collimated strip of light on the first surface of the document.

Alternative Embodiment Z

The sensor arrangement of any of alternative embodiments I to L and the document processing device of alternative embodiments N and O, wherein the emitted light forms a collimated strip of light on the first and second surfaces of the document.

Alternative Embodiment AA

The document processing device of alternative embodiments P and Q, further comprising one or more output receptacles positioned to receive documents from the transport mechanism after the documents pass the sensor arrangement.

Alternative Embodiment BB

The sensor arrangement of any of alternative embodiments A to L and the document processing device of alternative embodiments M to Q, wherein the documents being processed include currency bills, checks, or a combination of both.

Alternative Embodiment CC

The sensor arrangements of any of alternative embodiments A, F to I, and L, and the document processing device of alternative embodiments P and Q, further comprising a processor configured to receive the one or more electrical signals and to derive image data therefrom, the image data being reproducible as a visually readable image.

Alternative Embodiment DD

The sensor arrangements of alternative embodiment CC and the document processing device of alternative embodiment CC, wherein the processor is configured to denominate currency bills based on the image data at a rate of at least about 1000 bills per minute.

Alternative Embodiment EE

The sensor arrangement of any of alternative embodiments A to L and the document processing device of any of alternative embodiments M to Q, wherein the light sources are LED light sources.

Alternative Embodiment FF

The sensor arrangement of any of alternative embodiments F, G, and I to L and the document processing device of alternative embodiments N and O, wherein the lenses are cylindrical lenses.

Alternative Embodiment GG

The sensor arrangement of any of alternative embodiments A to L and the document processing device of any of alternative embodiments M to Q, wherein the depth of field is between about 0.03 inches and about 0.1 inches.

Alternative Embodiment HH

The sensor arrangement of any of alternative embodiments A to L and the document processing device of any of alternative embodiments M to Q, wherein the depth of field is about 0.09 inches.

Alternative Embodiment II

The sensor arrangement of any of alternative embodiments A to L and the document processing device of any of alternative embodiments M to Q, wherein the depth of field is about 0.06 inches.

Alternative Embodiment JJ

The sensor arrangement of alternative embodiments D and E, wherein the depth of field is a distance measured from the first surface of the cover.

Alternative Embodiment KK

The sensor arrangement of alternative embodiments D and E, wherein the depth of field has a shifted focal plane, the shifted focal plane being between about 0.015 inches and about 0.05 inches from the first surface of the cover.

Alternative Embodiment LL

The sensor arrangement of any of alternative embodiments I to L and the document processing device of alternative embodiments N and O, wherein the depth of field has a shifted focal plane, the shifted focal plane being between about 0.015 inches and about 0.05 inches from the first surface of the first cover.

Alternative Embodiment MM

The document processing device of alternative embodiments N and O, wherein the first and the second sensor arrangements have a focal plane, the focal plane located about at a median distance between the first surface of the first cover and the first surface of the second cover.

Alternative Embodiment NN

The sensor arrangement of any of alternative embodiments A to L and the document processing device of alternative embodiments P and Q, wherein the gradient index lens array has a total conjugate distance between about 9.5 mm and about 11 mm.

Alternative Embodiment OO

The document processing device of any of alternative embodiments M to O, wherein the first and second gradient index lens arrays have a total conjugate distance between about 9.5 mm and about 11 mm.

Alternative Embodiment PP

The sensor arrangement of any of alternative embodiments A to L and the document processing device of alternative embodiments P and Q, wherein the gradient index lens array comprises a plurality of gradient index lenses, each of the gradient index lenses having an f-number between about 2.8 and about 3.2.

Alternative Embodiment QQ

The document processing device of any of alternative embodiments M to O, wherein the first and the second gradient index lens arrays each comprise a plurality of gradient index lenses, each of the gradient index lenses having an f-number between about 2.8 and about 3.2.

Alternative Embodiment RR

The sensor arrangement of any of alternative embodiments A to L and the document processing device of alternative embodiments P and Q, wherein the gradient index lens array comprises a plurality of gradient index lenses, each of the gradient index lenses having an aperture with a diameter between about 0.25 mm and about 0.35 mm.

Alternative Embodiment SS

The document processing device of any of alternative embodiments M to O, wherein the first and the second gradient index lens arrays each comprise a plurality of gradient index lenses, each of the gradient index lenses having an aperture with a diameter between about 0.25 mm and about 0.35 mm.

Alternative Embodiment TT

The document processing device of any of alternative embodiments M to O, further comprising an iris positioned to reduce light leakage from the first sensor arrangement into the second sensor arrangement and light leakage from the second sensor arrangement into the first sensor arrangement.

Alternative Embodiment UU

The document processing device of alternative embodiments N and O, wherein the first sensor arrangement further comprises a first iris coupled to the second surface of the first cover and the second sensor arrangement further comprises a second iris coupled to the second surface of the second cover.

Alternative Embodiment VV

The document processing device of alternative embodiment UU, wherein the first iris and the second iris each have an aperture positioned to minimize light leakage from one sensor arrangement to the other sensor arrangement.

Alternative Embodiment WW

The document processing device of alternative embodiment M, wherein the first sensor arrangement and the second sensor arrangement are separated along the transport path by a distance between 0.2 inches and 0.3 inches.

Alternative Embodiment XX

The document processing device of alternative embodiments N and O, wherein the first sensor arrangement and the second sensor arrangement are separated along the transport path by a distance between 0.1 inches and 0.15 inches.

Alternative Embodiment YY

The sensor arrangement of any of alternative embodiments A to L and the document processing device of alternative embodiments M to Q, wherein documents are transported along the transport path at a rate between about 150 documents per minute to about 1500 documents per minute.

Alternative Embodiment ZZ

The sensor arrangement of any of alternative embodiments A to L and the document processing device of alternative embodiments M to Q, wherein documents are transported along the transport path at a rate of at least about 400 documents per minute.

Alternative Embodiment AAA

The sensor arrangement of any of alternative embodiments A to L and the document processing device of alternative embodiments M to Q, wherein documents are transported along the transport path at a rate of at least about 800 documents per minute.

Alternative Embodiment BBB

The sensor arrangement of any of alternative embodiments A to L and the document processing device of alternative embodiments M to Q, wherein documents are transported along the transport path at a rate of at least about 1200 documents per minute.

Alternative Embodiment CCC

The sensor arrangement of any of alternative embodiments YY to BBB and the document processing device of alternative embodiments YY to BBB, wherein the transported documents are U.S. currency bills.

Alternative Embodiment DDD

The sensor arrangement of any of alternative embodiments YY to BBB and the document processing device of alternative embodiments YY to BBB, wherein the transported documents include currency bills associated with multiple countries including two or more of the following currencies: U.S. dollar, euro, Australian dollar, Canadian dollar, Japanese yen, and pound sterling.

Alternative Embodiment EEE

The sensor arrangement of any of alternative embodiments YY to BBB and the document processing device of alternative embodiments YY to BBB, wherein each of the transported documents has a wide edge, and wherein the documents are transported in a wide-edge leading manner.

Alternative Embodiment FFF

The document processing device of alternative embodiments YY to EEE, wherein the document processing device has a footprint of less than about 3 square feet.

Alternative Embodiment GGG

The document processing device of alternative embodiments YY to EEE, wherein the document processing device has a footprint of less than about 2 square feet.

Alternative Embodiment HHH

The document processing device of alternative embodiments YY to EEE, wherein the document processing device has a footprint of less than about 1.5 square feet.

Alternative Embodiment III

The document processing device of alternative embodiments YY to HHH, wherein the document processing device has a weight of less than about 30 pounds.

Alternative Embodiment JJJ

The document processing device of alternative embodiments YY to HHH, wherein the document processing device has a weight of less than about 22 pounds.

Alternative Embodiment KKK

The document processing device of alternative embodiments YY to HHH, wherein the document processing device has a weight of less than about 20 pounds.

Each of these aspects, embodiments, and variations thereof is contemplated as falling within the spirit and scope of the claimed invention, which is set forth in the following claims.

What is claimed is:

1. A document processing device, comprising:

a first sensor arrangement positioned along a first side of a transport path, the first sensor arrangement comprising:

i) at least one light source configured to illuminate at least a portion of a first surface of a document being transported along the transport path in a direction of motion; and ii) a first gradient index lens array configured to collect light reflected from the first surface of the document and to transmit at least a portion of the collected reflected light onto a first photodetector array; and a second sensor arrangement positioned along a second opposing side of the transport path, the second sensor arrangement comprising:

i) at least one light source configured to illuminate at least a portion of a second surface of the document; and ii) a second gradient index lens array configured to collect light reflected from the second surface of the document and transmit at least a portion of the collected reflected light onto a second photodetector array; and wherein, the first sensor arrangement and the second sensor arrangement are off-set along the direction of motion of the transport path by a distance of about 0.2 inches to about 1.0 inch; and wherein the first and the second photodetector arrays generate one or more electrical signals from which visually readable images of the first surface and of the second surface of the document can be reproduced having a resolution such that alphanumeric characters can be extracted therefrom, the electrical signals being generated in response to the document remaining within a depth of field of the first and the second gradient index lens arrays while being transported along the transport path, the depth of field being at least about 0.03 inches.

2. The document processing device of claim 1, wherein the at least one light source configured to illuminate the first surface of the document includes a first light source and a second light source, the first light source positioned on a first side of the first gradient index lens array and the second light source positioned on a second opposing side of the first gradient index lens array; and wherein the at least one light source positioned to illuminate the second surface of the document includes a third light source and a fourth light source, the third light source positioned on a first side of the second gradient index lens array and the fourth light source positioned on a second opposing side of the second gradient index lens array.

3. The document processing device of claim 2, wherein the first light source and the second light source are configured to illuminate the first surface of the document with substantially similar wavelengths and with opposing angles of illumination, and wherein the third light source and the fourth light source are configured to illuminate the second surface of the document with substantially similar wavelengths and with opposing angles of illumination.

4. The document processing device of claim 2, wherein the first sensor arrangement further comprises a first lens and a second lens, and wherein light emitted from the first light source passes through the first lens and illuminates at least a portion of the first surface of the document; and light emitted from the second light source passes through the second lens and illuminates at least a portion of the first surface of the document.

5. The document processing device of claim 4, wherein the second sensor arrangement further comprises a third lens and a fourth lens, and wherein light emitted from the third light source passes through the third lens and illuminates at least a portion of the second surface of the document; and light emitted from the fourth light source passes through the fourth lens and illuminates at least a portion of the second surface of the document.

6. The document processing device of claim 1, wherein the depth of field is between about 0.03 inches and about 0.1 inches.

7. The document processing device of claim 6, wherein the document processing device further comprises a transport mechanism configured to transport documents along the direction of motion of the transport path in a wide-edge leading manner at a rate of at least about 1000 documents per minute.

8. The document processing device of claim 7, wherein the documents are U.S. currency bills; the document processing device having a footprint of less than about 1.5 square feet and a weight of less than about 25 pounds.

9. The document processing device of claim 1, further comprising a transport mechanism configured to transport the document along the transport path in the direction of motion from an input receptacle to one or more output receptacles, the transport mechanism being configured to constrain the transported document within the depth of field of the first and the second gradient index lens arrays.

10. The document processing device of claim 1, wherein the document processing device further comprises a transport mechanism configured to transport the document along the direction of motion of the transport path in a wide-edge leading manner.

11. The document processing device of claim 10, wherein the document is a U.S. currency bill, and wherein the document processing device has a footprint of less than about 1.5 square feet and a weight of less than about 25 pounds.

12. The document processing device of claim 10, further comprising a controller operatively coupled with the transport mechanism, the first sensor arrangement, and the second sensor arrangement, the controller being configured to control operation of the transport mechanism, the first sensor arrangement, and the second sensor arrangement.

13. The document processing device of claim 1, wherein the document processing device further comprises a transport mechanism configured to transport documents along the direction of motion of the transport path in a wide-edge leading manner at a rate of at least about 600 documents per minute.

14. The document processing device of claim 1, wherein the document processing device further comprises a transport mechanism configured to transport documents along the direction of motion of the transport path in a wide-edge leading manner at a rate of at least about 1000 documents per minute.

15. The document processing device of claim 1, wherein the document processing device further comprises a transport mechanism configured to transport documents along the direction of motion of the transport path in a wide-edge leading manner at a rate of at least about 1500 documents per minute.

16. The document processing device of claim 1, wherein the document processing device has a footprint of less than about 2 square feet.

17. The document processing device of claim 1, wherein the document processing device has a weight of less than about 35 pounds.

18. A document processing device, comprising:

a first sensor arrangement positioned along a first side of a transport path, the first sensor arrangement comprising:
- i) a first cover having a first surface and a second surface;
- ii) a first light source and a second light source;
- iii) a first lens and a second lens, the first lens configured to collect light emitted from the first light source and to illuminate at least a portion of a first surface of a document being transported in a direction of motion along the transport path; the second lens configured to collect light emitted from the second light source and to illuminate at least a portion of the first surface of the document; and
- iv) a first gradient index lens array positioned to collect light reflected from the first surface of the document and to transmit at least a portion of the collected reflected light onto a first photodetector array; and a second sensor arrangement positioned along a second opposing side of the transport path, the second sensor arrangement comprising:
- i) a second cover having a first surface and a second surface, the first surface of the second covering being spaced across the transport path from the first surface of the first cover by a distance G;
- ii) a third light source and a fourth light source;
- iii) a third lens and a fourth lens, the third lens configured to collect light emitted from the third light source and to illuminate at least a portion of a second surface of the document; the fourth lens configured to collect light emitted from the fourth light source and to illuminate at least a portion of the second surface of the document; and
- iv) a second gradient index lens array configured to collect light reflected from the second surface of the document and to transmit at least a portion of the received reflected light onto a second photodetector array, wherein, the first sensor arrangement and the second sensor arrangement are separated along the direction of motion of the transport path by a distance between about 0.2 inches and about 1.0 inch; and wherein, the first gradient index lens array and the first photodetector array are configured such that the first gradient index lens array has a first shifted focal plane, the first shifted focal plane being located at about one-half of the distance G from the first surface of the first cover; and wherein the second gradient index lens array and the second photodetector array are configured such that the second gradient index lens array has a second shifted focal plane, the second shifted focal plane being located at about one-half of the distance G from the first surface of the second cover; and wherein, the first and the second photodetector arrays generate one or more electrical signals from which visually readable images of the first surface and of the second surface of the document can be reproduced having a resolution such that alphanumeric characters can be extracted therefrom.

19. The document processing device of claim 18, wherein the first and the second gradient index lens arrays each have a depth of field of at least about 0.03 inches, the depth of field being equal to or greater than the distance G.

20. The document processing device of claim 19, wherein the depth of field is between about 0.03 inches and about 0.09 inches.

21. The document processing device of claim 18, wherein the first shifted focal plane is between about 0.015 inches and about 0.05 inches from the first surface of the first cover, and wherein the second shifted focal plane is between about 0.015 inches and about 0.05 inches from the first surface of the second cover.

22. The document processing device of claim 18, wherein the first and the second focal planes are located at about a median distance between the first surface of the first cover and the first surface of the second cover.

* * * * *